US012598125B2

(12) United States Patent
Singh

(10) Patent No.: US 12,598,125 B2
(45) Date of Patent: Apr. 7, 2026

(54) RAN INTELLIGENT CONTROLLER MESSAGE TRACING AND QUERY SERVICE

(71) Applicant: VMware LLC, Palo Alto, CA (US)

(72) Inventor: Amit Singh, Woodside, CA (US)

(73) Assignee: VMware LLC, Palo Alto, CA (US)

( * ) Notice: Subject to any disclaimer, the term of this patent is extended or adjusted under 35 U.S.C. 154(b) by 343 days.

(21) Appl. No.: 18/378,927

(22) Filed: Oct. 11, 2023

(65) Prior Publication Data

US 2025/0126039 A1 Apr. 17, 2025

(51) Int. Cl.
*H04L 43/10* (2022.01)
*H04W 24/08* (2009.01)

(52) U.S. Cl.
CPC ............. *H04L 43/10* (2013.01); *H04W 24/08* (2013.01)

(58) Field of Classification Search
None
See application file for complete search history.

(56) References Cited

U.S. PATENT DOCUMENTS

2017/0329696 A1* 11/2017 Bitoun ................ G06F 11/3688
2021/0144091 A1* 5/2021 C H ..................... G06F 9/45558

* cited by examiner

*Primary Examiner* — Angela Nguyen
(74) *Attorney, Agent, or Firm* — Quarles & Brady LLP

(57) ABSTRACT

Some embodiments of the invention provide a method for performing packet tracing in a RAN. The method receives a trace request that includes a tracing specification for performing a trace operation for a subset of messages exchanged between a base station component and a RAN application via a RIC that operates as an interface between the base station component and the RAN application, the trace operation for collecting state data associated with the RIC. Based on the tracing specification, the method performs the trace operation for the subset of messages. The method receives a set of trace information that was collected during the trace operation and that includes state data associated with the RIC. The method processes the set of trace information to generate multiple sets of state data associated with the RIC for use in responding to queries for state data associated with the RIC.

24 Claims, 40 Drawing Sheets

*Figure 3*

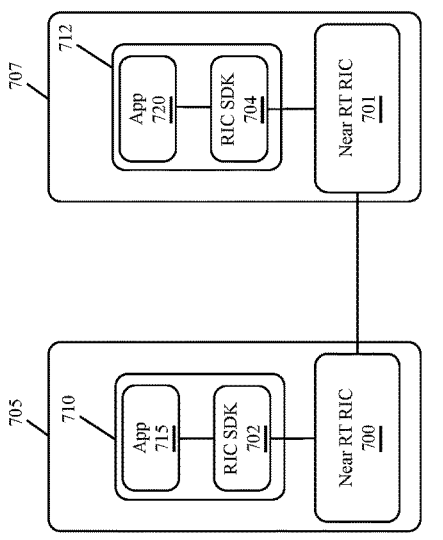
*Figure 7*
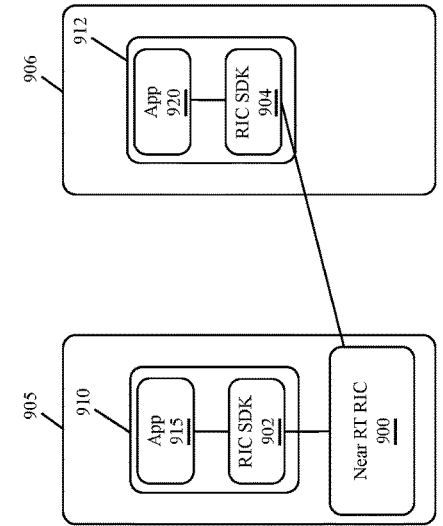
*Figure 9*
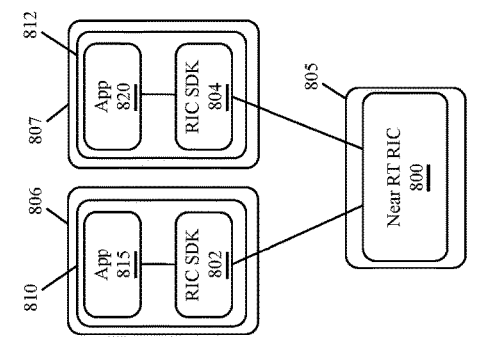
*Figure 6*
*Figure 8*

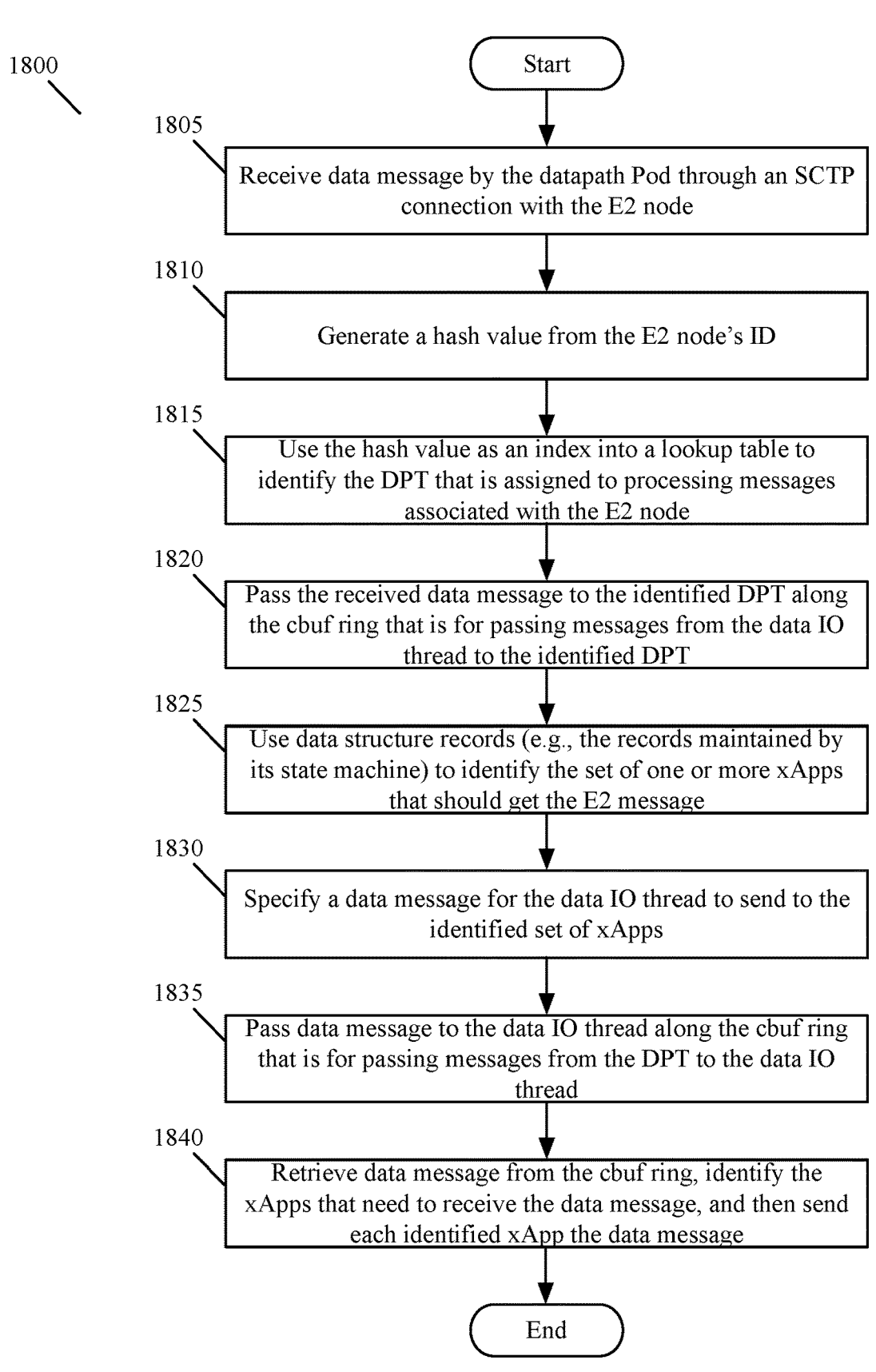

1800

Start

1805 — Receive data message by the datapath Pod through an SCTP connection with the E2 node 1810 — Generate a hash value from the E2 node's ID 1815 — Use the hash value as an index into a lookup table to identify the DPT that is assigned to processing messages associated with the E2 node 1820 — Pass the received data message to the identified DPT along the cbuf ring that is for passing messages from the data IO thread to the identified DPT 1825 — Use data structure records (e.g., the records maintained by its state machine) to identify the set of one or more xApps that should get the E2 message 1830 — Specify a data message for the data IO thread to send to the identified set of xApps 1835 — Pass data message to the data IO thread along the cbuf ring that is for passing messages from the DPT to the data IO thread 1840 — Retrieve data message from the cbuf ring, identify the xApps that need to receive the data message, and then send each identified xApp the data message

End

*Figure 18*

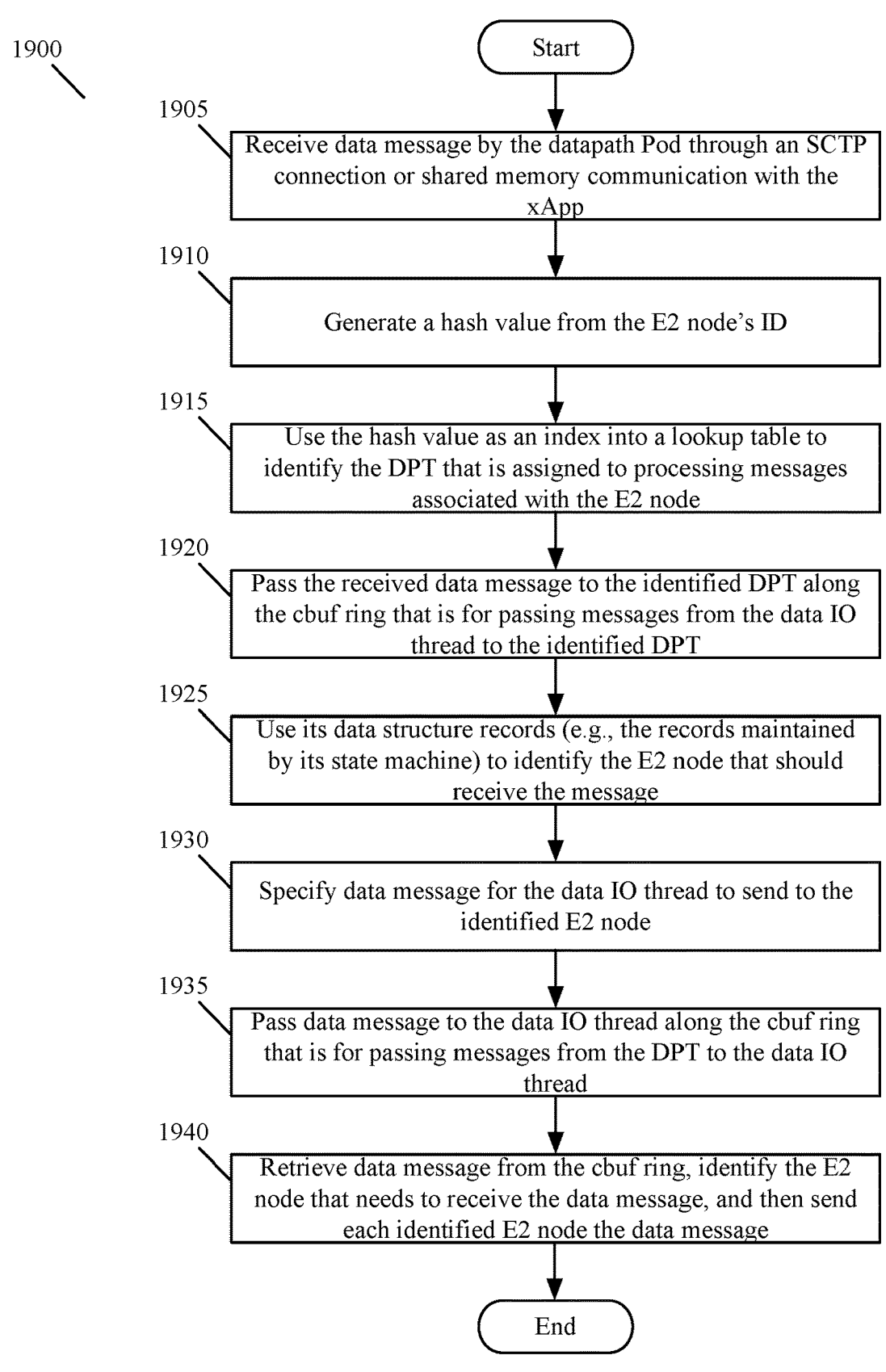

1900

1905

Start

Receive data message by the datapath Pod through an SCTP connection or shared memory communication with the xApp

1910

Generate a hash value from the E2 node's ID

1915

Use the hash value as an index into a lookup table to identify the DPT that is assigned to processing messages associated with the E2 node

1920

Pass the received data message to the identified DPT along the cbuf ring that is for passing messages from the data IO thread to the identified DPT

1925

Use its data structure records (e.g., the records maintained by its state machine) to identify the E2 node that should receive the message

1930

Specify data message for the data IO thread to send to the identified E2 node

1935

Pass data message to the data IO thread along the cbuf ring that is for passing messages from the DPT to the data IO thread

1940

Retrieve data message from the cbuf ring, identify the E2 node that needs to receive the data message, and then send each identified E2 node the data message End

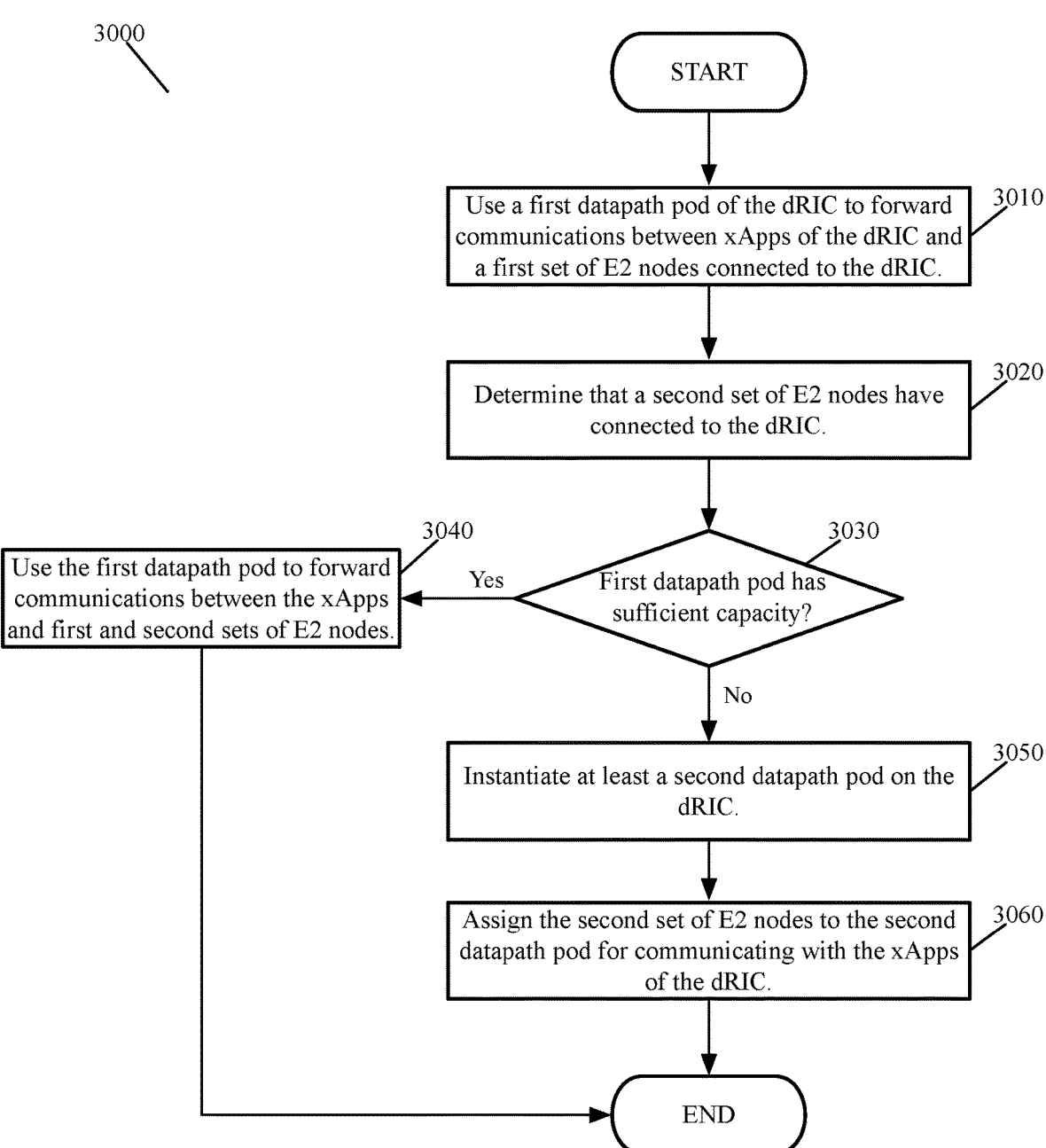

3000

START

Use a first datapath pod of the dRIC to forward communications between xApps of the dRIC and a first set of E2 nodes connected to the dRIC.    3010

Determine that a second set of E2 nodes have connected to the dRIC.    3020

3040    First datapath pod has sufficient capacity?    3030

Yes → Use the first datapath pod to forward communications between the xApps and first and second sets of E2 nodes.

No

Instantiate at least a second datapath pod on the dRIC.    3050

Assign the second set of E2 nodes to the second datapath pod for communicating with the xApps of the dRIC.    3060

END

*Figure 30*

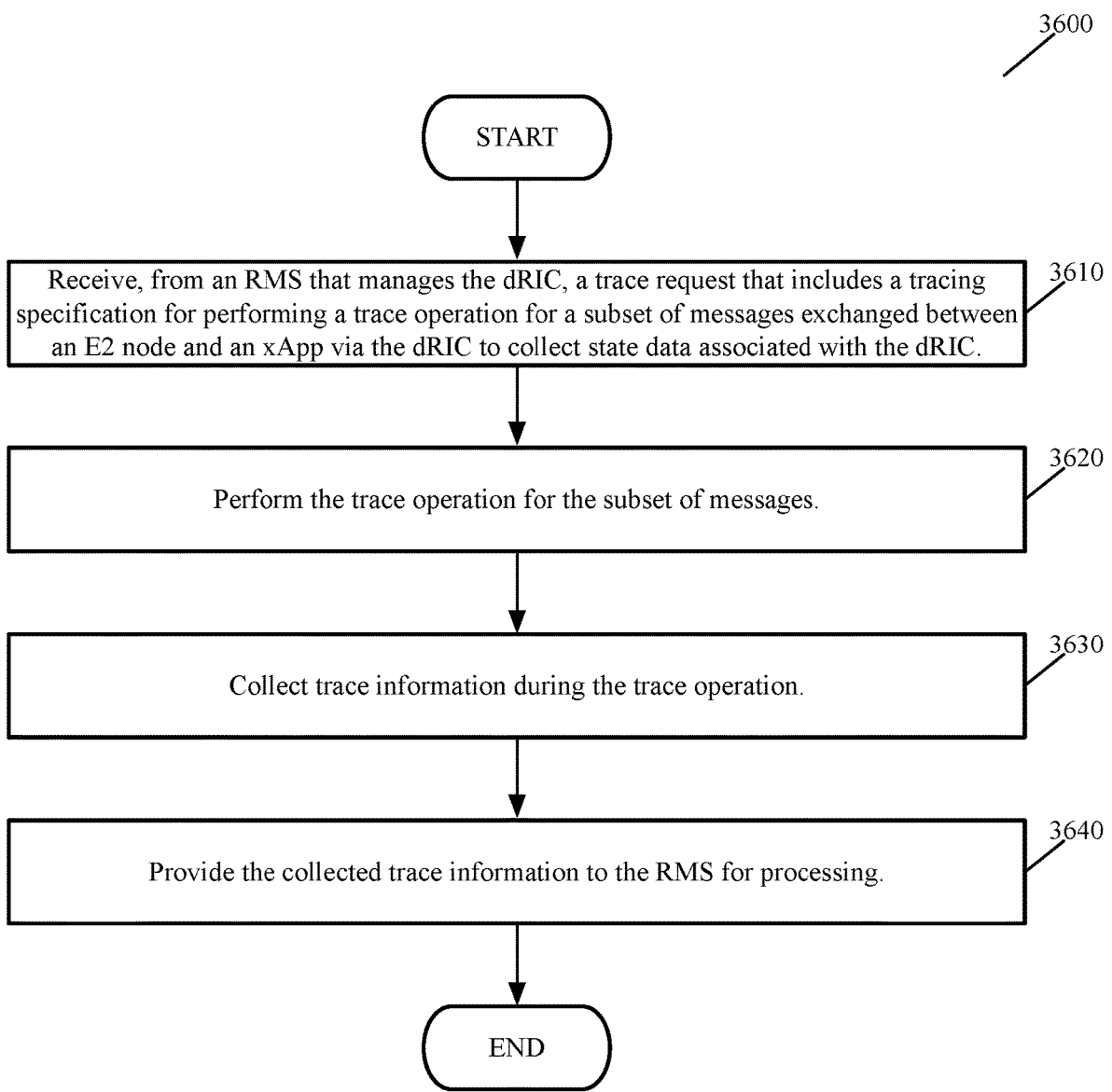

3600

START

Receive, from an RMS that manages the dRIC, a trace request that includes a tracing specification for performing a trace operation for a subset of messages exchanged between an E2 node and an xApp via the dRIC to collect state data associated with the dRIC.    3610

Perform the trace operation for the subset of messages.    3620

Collect trace information during the trace operation.    3630

Provide the collected trace information to the RMS for processing.    3640

END

*Figure 36*

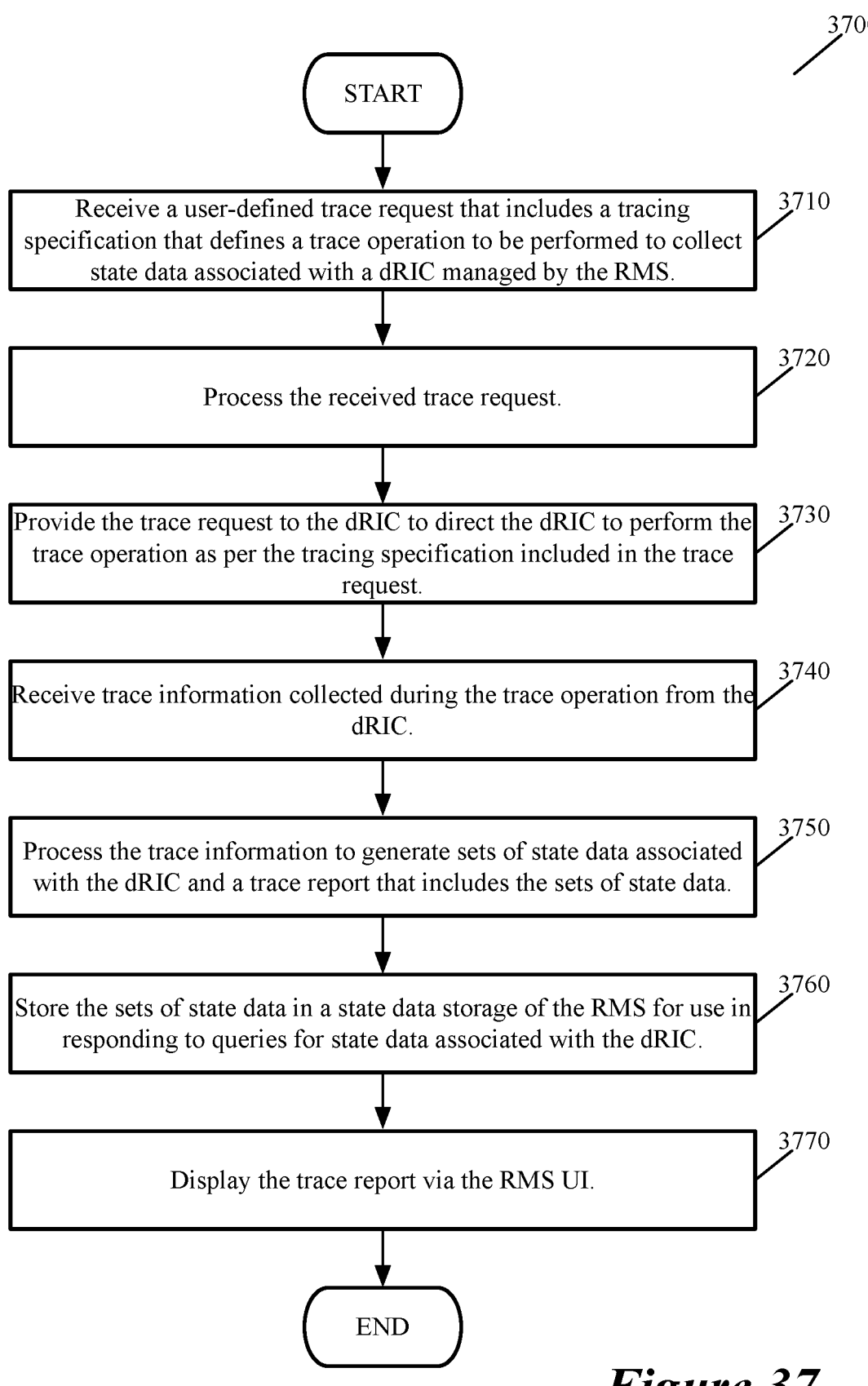

3700

START

Receive a user-defined trace request that includes a tracing specification that defines a trace operation to be performed to collect state data associated with a dRIC managed by the RMS.       3710

Process the received trace request.       3720

Provide the trace request to the dRIC to direct the dRIC to perform the trace operation as per the tracing specification included in the trace request.       3730

Receive trace information collected during the trace operation from the dRIC.       3740

Process the trace information to generate sets of state data associated with the dRIC and a trace report that includes the sets of state data.       3750

Store the sets of state data in a state data storage of the RMS for use in responding to queries for state data associated with the dRIC.       3760

Display the trace report via the RMS UI.       3770

END

```
Apr 13 15:29:55 905940   DEBUG     DRIC_E2NIO    E2T_DATA_01 len 115 Decoded E2AP Msg {
  initiatingMessage {
    procedureCode = 1
    criticality = reject
    value {
      e2setup {
        protocolIEs[0] {
          id = 3
          criticality = reject
          value {
            GlobalE2node-ID {
              gNB {
                global_gNB_ID {
                  plmn_id = 0xfcfcfc
                  gnb_id {
                    gnb-ID = { 32, 0xec 0xec 0xec 0xec }
                  }
                }
              }
            }
          }
        }
        protocolIEs[1] {
          id = 49
          criticality = reject
          value {
            TransactionID = 14840047
          }
        }
        protocolIEs[2] {
          id = 10
          criticality = reject
          value {
            RANfunctions-List[0] {
              id = 8
              criticality = reject
              value {
                RANfunction-Item {
                  ranFunctionID = 100
                  ranFunctionDefinition = 0xffffffffffffffffffffffffffffffffffffffffff
                  ranFunctionRevision = 1
                  ranFunctionOID = 'DEMO'
                }
              }
            }
          }
        }
      }
```

*Figure 40A*

4002

```
protocolIEs[3] {
        id = 50
        criticality = reject
        value {
          E2nodeComponentConfigAddition-List[0] {
            id = 51
            criticality = reject
            value {
              E2nodeComponentConfigAddition-Item {
                e2nodeComponentInterfaceType = xn
                e2nodeComponentID {
                  e2nodeComponentInterfaceTypeXn {
                    global_NG_RAN_Node_ID {
                      gNB {
                        plmn_id = 0x000000
                        gnb_id {
                          gnb-ID = { 32, 0x00 0x00 0x00 0x00 }
                        }
                      }
                    }
                  }
                }
                e2nodeComponentConfiguration {
                  e2nodeComponentRequestPart = 0x800000dc127f00008000
                  e2nodeComponentResponsePart = 0x800000dc127f00008000
                }
              }
            }
          }
        }
}
```

|  | E2 Setup | E2 Setup Succ | E2 Setup Fail |
|---|---|---|---|
| Msg Type | M | M | M |
| Transaction Id | M | M | M |
| Global E2node Id | M | M | |
| Ran Func Added List (Id, Defn, Revision, OID) | M | | |
| Comp Cfg (Interface Type, Req/Resp) | M | | |
| Comp Cfg Ack (Intf Type, Comp Id, Ack) | | M | |
| Ran Function Accept list (RAN Func Id & Revision) | | M | |
| Cause | | | M |

| | Subs Req | Subs Resp | Subs Fail | Subs Del Request | Subs Del Response | Subs Del Failure | Subs Del Required |
|---|---|---|---|---|---|---|---|
| Msg Type | M | M | M | M | M | M | M |
| RAN Function Id | M | M | M | M | M | M | M |
| RIC Req Id/Inst Id | M | M | M | M | M | M | M |
| Subs Details Trigger Event Defn | M | | | | | | |
| Sub Details - Action List (Id, Type) | M | | | | | | |
| Action Admit List (Action Id) | | M | | | | | |
| Cause | | | M | | | M | M |

|  | RIC Indication | Control Request | Control Ack | Control Failure |
|---|---|---|---|---|
| Msg Type | M | M | M | M |
| RAN Function Id | M | M | M | M |
| RIC Req Id/Inst Id | M | M | M | M |
| Action Id | M | | | |
| Indication Type | M | | | |
| Indication Header | M | | | |
| Indication Message | M | | | |
| Control Header | | M | | |
| Control Message | | M | | |
| Cause | | | | M |

4400

| Msg Type | Component Config Update | Component Config Update Ack | E2 Error Indication |
|---|---|---|---|
| | M | M | M |
| Transaction Id | M | M | |
| Comp Cfg Add List (if exists) (Interface Type, Req/Resp) | M | | |
| Comp Cfg Update List (if exists) (Interface Type, Req/Resp) | M | | |
| Comp Cfg Removal List (if exists) (Interface Type, Req/Resp) | M | | |
| Comp Cfg Add List Ack (Intf Type, Comp Id, Ack) | | M | |
| Comp Cfg Update List Ack (Intf Type, Ack) | | M | |
| Comp Cfg Removal List Ack (Intf Type, Comp Id, Ack) | | M | |

*Figure 44*

RAN INTELLIGENT CONTROLLER MESSAGE TRACING AND QUERY SERVICE

BACKGROUND

Today, dRIC (distribute RAN intelligent controller) platforms operating in RANs (radio access network) have long lived sessions between xApps and E2 nodes. The state information between these continuously goes through state changes as transactions occur. While some information can be learned through various means such as log files, these log files, particularly older log files, can be lost during log rotations. As such, it is desirable to have the ability to glean current state of the dRIC platform through other means.

BRIEF SUMMARY

Some embodiments of the invention provide a method for performing packet tracing in a RAN (radio access network). The method receives a trace request that includes a tracing specification for performing a trace operation for a subset of messages exchanged between a particular base station component and a particular RAN application via a particular RIC (RAN intelligent controller) (e.g., a dRIC (distributed RIC)) that operates as an interface between the particular base station component (e.g., an E2 node) and the particular RAN application (e.g., an xApp), the trace operation for collecting state data associated with the particular RIC.

Based on the tracing specification received as part of the trace request, the method performs the trace operation for the subset of messages exchanged between the particular base station component and the particular RAN application. The method receives a set of trace information that was collected during the trace operations for the subset of messages and that includes state data associated with the particular RIC. The method processes the set of trace information to generate multiple sets of state data associated with the particular RIC for use in responding to queries for state data associated with the particular RIC.

In some embodiments, the tracing specification includes an identifier of the particular base station component and/or an identifier of the particular RAN application, as well as a specification of the subset of messages for which the trace operation should be performed. The subset of messages, in some embodiments, are a subset of E2AP messages sent to and/or from the particular base station component. In some embodiments, multiple types of E2AP messages are sent to and from the particular base station component, and the subset includes a particular type of E2AP message. In some embodiments, each E2AP message type falls into a particular category of E2AP message types. Examples of these types include base station component setup messages (e.g., E2Setup), RAN application subscription messages (e.g., subscription requests), control messages (e.g., control requests), and configuration messages (e.g., update configuration requests). Each tracing specification, in some embodiments, can specify multiple types of E2AP messages for the trace operation.

The tracing specification of some embodiments also includes identifiers for a particular set of RIC state components that are of interest for the trace operation and for which state data should be collected. The particular RIC includes multiple state components, in some embodiments, such as the base station components and RAN applications provisioned and connected to the particular RIC, subscription information for each RAN application (i.e., the base station components to which each RAN application subscribes), outstanding timers, base station components to which a RAN application has outstanding transactions, RAN applications to which a base station component is serving indications, and horizontal scaling information (e.g., how base station components and RAN applications are distributed across load distributor IO threads of the particular RIC). In some embodiments, the trace request also specifies a duration of time for which the tracing operation should be performed (e.g., for how many seconds the tracing operation should be performed).

In some embodiments, the method is performed by a RIC management system (RMS) that manages the particular RIC. The trace request, in some embodiments, is received through a user interface (UI) provided by the RMS, or through an API (application programming interface) of the RMS. In some embodiments, in addition to the multiple sets of state data, the RMS also processes the set of trace information to generate a trace report specifying the set of state data in response to the trace request. The RMS also provides the generated trace report for display through the RMS UI, in some embodiments.

The RMS of some embodiments includes a query service that is invoked when the RMS receives a particular query command for a particular set of state data from the multiple sets of state data. In some embodiments, the particular RIC includes multiple state components, as mentioned above, and each query command is one of multiple query commands each defined for one of the multiple state components, according to some embodiments. Each query command, in some embodiments, is constructed to limit information in usable and consumable chunks. In some embodiments, the query commands are received by the RMS through either the RMS UI or the RMS API, and responded to, in some embodiments, through the RMS UI or the RMS API.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 3 illustrates another view of the O-RAN architecture of some embodiments, with a more in-depth view of the near real-time RIC.

FIG. 6 illustrates a RIC that executes on one host computer along with two machines on which two control plane applications execute.

FIG. 7 illustrates two RICs that execute on two host computer along with two machines on which two control plane applications and two RIC SDKs execute.

FIG. 8 illustrates a RIC that executes on a first host computer to connect two control plane applications that execute on two machines operating on two other host computers.

FIG. 9 illustrates a RIC that executes on a first host computer to connect two control plane applications that execute on two machines, one of which operates on the first host computer while the other operates on another host computer.

FIG. 18 illustrates a process that the data IO thread and a DPT perform in some embodiments to process a data message from the E2 node that one or more xApps should receive.

FIG. 19 illustrates a process that the data IO thread and a DPT perform in some embodiments to process a data message from an xApp that should be sent to an E2 node.

FIG. 30 conceptually illustrates a process performed in some embodiments to horizontally scale datapath pods of a dRIC.

FIG. 36 illustrates a process performed in some embodiments to perform a tracing operation.

FIG. 37 illustrates a process performed in some embodiments by an RMS that manages at least one dRIC in a RAN in response to a user-defined trace request received by the RMS.

FIGS. 40A-40B illustrate an example of E2 setup message in some embodiments.

FIG. 41 illustrates examples of E2Setup E2AP protocol messages and their mandatory fields.

FIG. 42 illustrates examples of subscription-related E2AP protocol messages and their mandatory fields.

FIG. 44 illustrates examples of component configuration and E2 error indication E2AP protocol messages and their mandatory fields.

DETAILED DESCRIPTION

Figure 1:
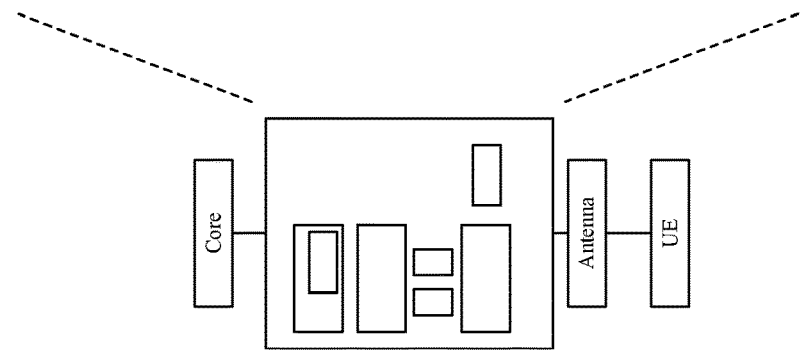
FIG. 1 illustrates an example of O-RAN architecture according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for performing packet tracing in a RAN (radio access network). The method receives a trace request that includes a tracing specification for performing a trace operation for a subset of messages exchanged between a particular base station component and a particular RAN application via a particular RIC (RAN intelligent controller) (e.g., a dRIC (distributed RIC)) that operates as an interface between the particular base station component (e.g., an E2 node) and the particular RAN application (e.g., an xApp), the trace operation for collecting state data associated with the particular RIC.

Based on the tracing specification received as part of the trace request, the method performs the trace operation for the subset of messages exchanged between the particular base station component and the particular RAN application. The method receives a set of trace information that was collected during the trace operations for the subset of messages and that includes state data associated with the particular RIC. The method processes the set of trace information to generate multiple sets of state data associated with the particular RIC for use in responding to queries for state data associated with the particular RIC.

In some embodiments, the tracing specification includes an identifier of the particular base station component and/or an identifier of the particular RAN application, as well as a specification of the subset of messages for which the trace operation should be performed. The subset of messages, in some embodiments, are a subset of E2AP messages sent to and/or from the particular base station component. In some embodiments, multiple types of E2AP messages are sent to and from the particular base station component, and the subset includes a particular type of E2AP message. In some embodiments, each E2AP message type falls into a particular category of E2AP message types. Examples of these types include base station component setup messages (e.g., E2Setup), RAN application subscription messages (e.g., subscription requests), control messages (e.g., control requests), and configuration messages (e.g., update configuration requests). Each tracing specification, in some embodiments, can specify multiple types of E2AP messages for the trace operation.

The tracing specification of some embodiments also includes identifiers for a particular set of RIC state components that are of interest for the trace operation and for which state data should be collected. The particular RIC includes multiple state components, in some embodiments, such as the base station components and RAN applications provisioned and connected to the particular RIC, subscription information for each RAN application (i.e., the base station components to which each RAN application subscribes), outstanding timers, base station components to which a RAN application has outstanding transactions, RAN applications to which a base station component is serving indications, and horizontal scaling information (e.g., how base station components and RAN applications are distributed across load distributor IO threads of the particular RIC). In some embodiments, the trace request also specifies a duration of time for which the tracing operation should be performed (e.g., for how many seconds the tracing operation should be performed).

In some embodiments, the method is performed by a RIC management system (RMS) that manages the particular RIC. The trace request, in some embodiments, is received through a user interface (UI) provided by the RMS, or through an API (application programming interface) of the RMS. In some embodiments, in addition to the multiple sets of state data, the RMS also processes the set of trace information to generate a trace report specifying the set of state data in response to the trace request. The RMS also provides the generated trace report for display through the RMS UI, in some embodiments.

The RMS of some embodiments includes a query service that is invoked when the RMS receives a particular query command for a particular set of state data from the multiple sets of state data. In some embodiments, the particular RIC includes multiple state components, as mentioned above, and each query command is one of multiple query commands each defined for one of the multiple state components, according to some embodiments. Each query command, in some embodiments, is constructed to limit information in usable and consumable chunks. In some embodiments, the query commands are received by the RMS through either the RMS UI or the RMS API, and responded to, in some embodiments, through the RMS UI or the RMS API.

RICs, in some embodiments, include distributed RICs (dRICs) and centralized RICs (cRICs). The dRICs are real-time or near-real-time RICs, while the cRICs are non-real-time RICs, according to some embodiments. Each RIC serves as a platform on which RAN applications (e.g., xApps for dRICs or rApps for cRICs) execute. The RAN applications, in some embodiments, are provided by third-party suppliers that are different from the RIC vendors. The RICs also serve as a communication interface between the RAN applications executed by the RICs and E2 nodes connected to the RICs, according to some embodiments.

The base station components, in some embodiments, are E2 nodes, such as the central unit control plane (CU-CP), the central unit user plane (CU-UP), and distributed units (DUs). The CU-CP hosts RRS and the control plane aspect of the PDCP (Packet Data Convergence Protocol) protocol. The CU-CP also terminates the E1 interface connected with the CU-UP, and the F1-C interface connected with the DU. The CU-UP hosts the user plane aspect of the PDCP and the SDAP (Service Data Adaptation Protocols). Additionally, the CU-UP terminates the E1 interface connected with the CU-CP and the F1-U interface connected with the DU. In some embodiments, when the RAN is an O-RAN (open RAN), the CUs are O-CUs (open CUs) and the DUs are O-DUs (open DUs). An O-RAN is a standard for allowing interoperability of RAN elements and interfaces.

Each E2 node performs a set of RAN functions, in some embodiments. The DU is responsible for the lower layers of the baseband processing up through the PDCP layer of the protocol stack. In some embodiments, the set of RAN functions performed by DUs include real-time layer 1 (L1) functions and lower L2 functions (e.g., data link layer functions and scheduling functions). The set of RAN functions performed by the CU-CP and CU-UP, in some embodiments, includes non-real-time higher layer 2 (L2) functions.

The particular RIC, in some embodiments, is a dRIC. A dRIC is a stateful application that, in some embodiments, includes several state machines. Each dRIC, in some embodiments, interfaces with thousands of E2 nodes and hundreds of xApps. Also, the dRIC is the central point of observability where sessions and conversations between E2 nodes and xApps converge (i.e., the dRIC provides a communications interface between the E2 nodes and xApps).

Some embodiments of the invention include a set of prerequisites. Examples of such prerequisites of some embodiments include protocol versions match (e.g., E2AP-2.0.1, E2SM-RC-v1.1, E2SM-KPM-v2.1, etc.); familiarity with extracting, viewing, and filtering logs from Pods; capability to turn on/off DEBUG mode (e.g., for the dRIC E2T control Pod, xApp SDK, xApp, etc.); and cluster deployment.

Today, there is a push to have the Radio Access Network (RAN) of a telecommunication network (e.g., a cellular network) implemented as O-RAN, a standard for allowing interoperability for RAN elements and interfaces. FIG. 1 illustrates an example of O-RAN architecture 100, according to some embodiments. The O-RAN architecture 100 includes a service management and orchestration framework (SMO) 110 with a non-real-time RIC 105, a near real-time RAN intelligent controller (RIC) 115, open control plane central unit (O-CU-CP) 120, open user plane central unit (O-CU-UP) 125, open distributed unit (O-DU) 130, open radio unit (0-RU) 135, and the O-Cloud 140. The O-CU-CP 120, the O-CU-UP 125, and the O-DU 130 may be collectively referred to as the managed functions 120-130 below.

As defined in the standard, the SMO 110 in some embodiments includes an integration fabric that allows the SMO to connect to and manage the RIC 115, the managed functions 120-130, and the O-Cloud 140 via the open interfaces 150. Unlike these elements, the O-RU 135 is not managed by the SMO 110, and is instead managed by the O-DU 130, as indicated by the dashed line 160, in some embodiments. In some embodiments, the O-RU 135 processes and sends radio frequencies to the O-DU 130.

In some embodiments, the managed functions 120-130 are logical nodes that each host a set of protocols. According to the O-RAN standard, for example, the O-CU-CP 120, in some embodiments, include protocols such as radio resource control (RRC) and the control plane portion of packet data convergence protocol (PDCP), while the O-CU-UP 125 includes protocols such as service data adaptation protocol (SDAP), and the user plane portion of packet data convergence protocol (PDCP).

The two RICs are each adapted to specific control loop and latency requirements. The near real-time RIC 115 provides programmatic control of open centralized units (O-CUs) and open distributed units (O-DUs) on time cycles of 10 ms to 1 second. The non-real-time RIC (non-RT RIC) 105, on the other hand, provides higher layer policies that can be implemented in the RAN either via the near-RT RIC or via a direct connection to RAN nodes. The non-RT RIC is used for control loops of more than 1 second. Each RIC 105 or 115 serves as a platform on which RAN control applications execute. These applications can be developed by third-party suppliers that are different from the RIC vendors. These applications are referred to as "xApps" (for the near-RT RIC 115) and "rApps" (for the non-RT RIC). In some embodiments, these applications are referred to more generally as RAN applications.

The near real-time RIC 115, in some embodiments, is a logical aggregation of several functions that use data collection and communications over the interfaces 155 in order to control the managed functions 120-130. In some embodiments, the non-real-time RIC 105 uses machine learning and model training in order to manage and optimize the managed functions 120-130. The near RT RIC in some of these embodiments also uses machine learning.

In some embodiments, the O-Cloud 140 is responsible for creating and hosting virtual network functions (VNFs) for use by the RIC 115 and the managed functions 120-130. In some embodiments, the DU is in charge of per-slot decisions of user scheduling and includes RAN scheduler that performs MAC control assistance and user-level tracing. In order to increase computing power available in the cloud (i.e., compared to base stations that typically execute the RAN functions), the RIC is implemented in one or more public and/or private cloud datacenters and implements an improved cloudified RAN scheduler in the cloud, thereby offloading these MAC control assistance and user-level tracing functions from the DU to the RIC. The interfaces 155 in some embodiments enable the RAN to provide inputs to the functions at the RIC, and, at least in some embodiments, receive outputs that have been computed by these functions at the RIC.

Figure 2:
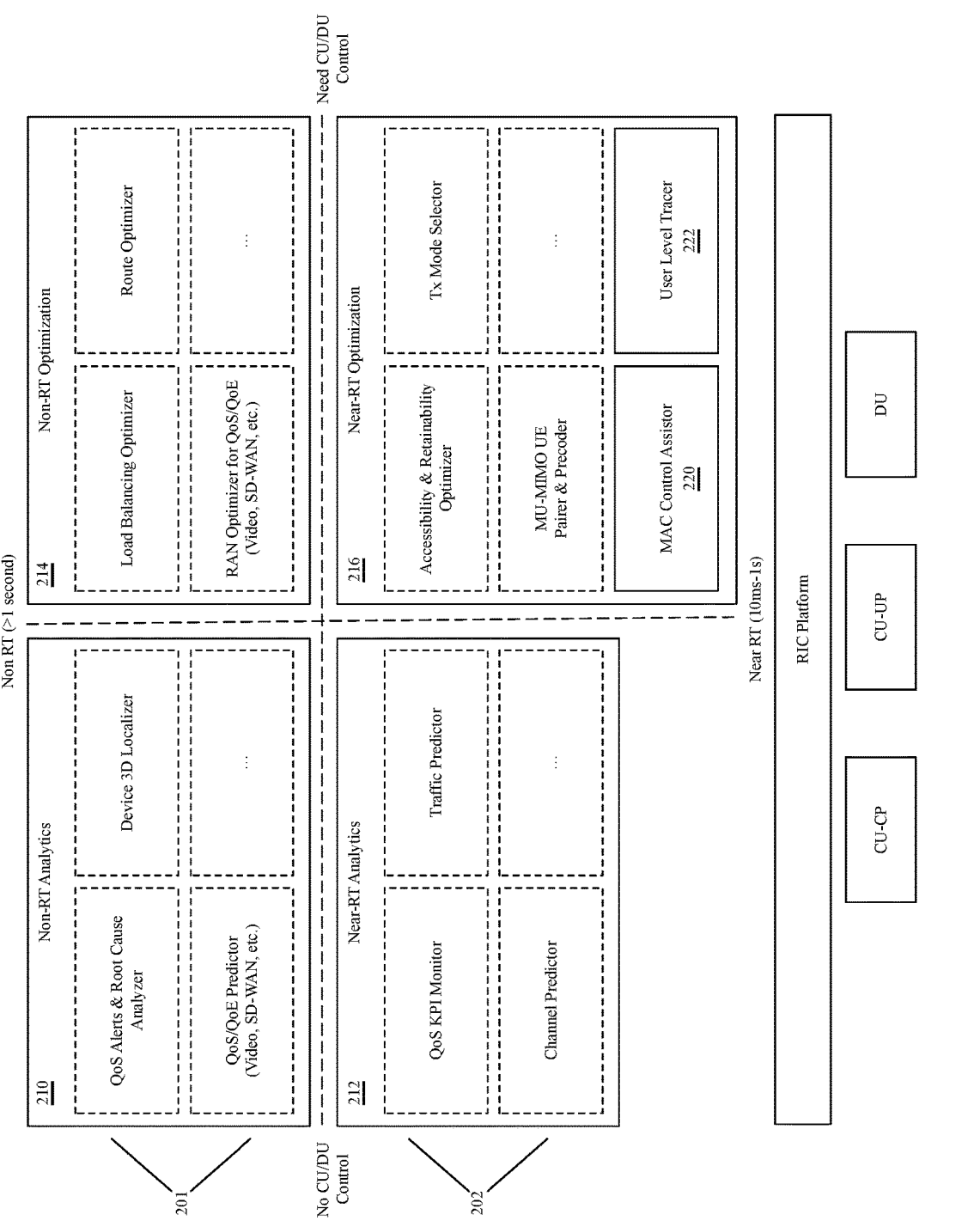
FIG. 2 illustrates an in-depth view of the components of both a non-real-time RIC and a near real-time RIC according to some embodiments.

FIG. 2 illustrates an in-depth view of the components of both a non-real-time RIC 201 and a near real-time RIC 202. Each of the RICs 201 and 202 includes a respective set of analytics functions 210 and 212, and a respective set of optimization functions 214 and 216, which are each illustrated with dashed lines to indicate they are existing components. In addition to these existing components, the near real-time optimization functions 216 includes two new components, the MAC control assistor 220 and user-level tracer 222, illustrated with solid lines to visually differentiate them from the existing components. In some embodiments, these components are part of a larger MIMO component (e.g., along with the MU-MIMO UE pairer and precoder).

In some embodiments, the MAC control assistor 220 can include various functions such as (1) User Equipment (UE)-specific beamforming weight calculation based on UL SRS channel signal reception, (2) UE Radio Frequency (RF) condition prediction, and (3) Multi-User, Multiple Input, Multiple Output (MU-MIMO) pairing suggestion for the MAC scheduler based on the UE-specific beams. For each of these functions, some embodiments expose a report interface (that provides input data for the function to the RIC from the DU) and a control interface (that provides output data for the function to the DU from the RIC).

The user-level tracer 222, in some embodiments, produces L1/L2/L3 level information related to user configuration and traffic performance. This tracing data can be used as inputs to various control algorithms, including the MAC scheduler, parameter setting, etc. The user-level tracer 222 can include tracing operations that can (i) track user behavior in a cell, (ii) track user RF condition, (iii) track user data traffic performance in different layers (MAC, Radio Link Control (RLC), Packet Data Convergence Protocol (PDCP)), and (iv) track user RF resource consumption.

FIG. 3 illustrates another view of the O-RAN architecture of some embodiments, with a more in-depth view of the near real-time RIC. The architecture 300 includes an SMO 305 with a non-real-time RIC 310, a distributed near real-time RIC 315, and E2 nodes 320 (e.g., O-DU and/or O-CU nodes). The distributed near real-time RIC 315 includes messaging infrastructure 340, a set of services (e.g., 350, 352, 354, and 356), a shared data layer 360, a database 370, and a set of termination interfaces (e.g., 380, 382, and 384). As shown, a set of embedded apps (e.g., 330, 332, and 334) uses this distributed near RT RIC. As further described below, the distributed near RT RIC 315 is implemented by multiple RICs executing on multiple host computers in some embodiments.

As shown, the set of services include conflict mitigation services 350, app subscription management services 352, management services 354, and security services 356. Additionally, the set of termination interfaces include O1 termination interface 380 connecting the SMO to the near real-time RIC, A1 termination interface 382 connecting the non-real-time RIC to the near real-time RIC, and E2 termination interface 384 connecting the E2 nodes to the near real-time RIC. Each of the apps, in some embodiments, is representative of the various functions of the RIC that use data sent from the E2 nodes 320.

In some embodiments, the objective of the framework 300 is to offload near real-time functions that are computation-intensive and provide results back to the O-DU (e.g., via the E2 interface with E2 nodes 320). The results, in some embodiments, can be used to assist or enhance the real-time decision in the MAC layer. Three example use-cases for the MAC control assistance framework, each example specific to a different component of the MAC control assistor (e.g., the UE-specific BFWC, the UE RF condition predictor, and the MU-MIMO pairing suggestor), and one use-case example for the user-level tracer, will be described below.

The first example use-case is specific to the UE-specific beamforming weight calculation based on UL SRS signal reception component of the MAC control assistance framework. In some embodiments of this use-case, the input metrics can include multiple options based on UL SRS, such as raw SRS received data, and an SRS channel responses matrix from a channel estimate.

The algorithm for producing output metrics, in some embodiments, evaluates the optimal beam-forming weights to reach the user. Some embodiments use traditional signal processing algorithms that are based on channel models. Alternatively, or conjunctively, machine-learning based algorithms that utilize raw data inputs are used, which require feedback from the DU in the E2 nodes 320.

In some embodiments, the output metrics resulting from the algorithm include a beam-form weight (BFW) matrix for the user. In some embodiments, the BFW could also be mapped to a beam index from a pre-designed beam set. The DU in some embodiments uses the matrix to control the MIMO antenna array gain/phasing in the RU (e.g., the O-RU 135 in the architecture 100) for user data transmission and reception.

The second use-case example is specific to the UE RF condition predictor component of the MAC control assistance framework. For this second use-case, the input metrics include at least a channel report from the UE, such as Wideband or Subband CQI/PMMIRI for DL, or SRS for UL, according to some embodiments. The input metrics of some embodiments can also opt to include supportive information such as UE distance, UE positioning, etc.

In some embodiments, the app algorithm for this second use-case is meant to predict the UE's RF condition based on the observation. Some embodiments utilize traditional signal processing algorithms based on channel and mobility models. Alternatively, or conjunctively, some embodiments also use machine learning based algorithms using data inputs and potentially other factors, such as site layout (which requires feedback from the DU).

The output metrics for this use-case, in some embodiments, include the predicted channel condition of the user for the next scheduling window, as well as predicted downlink and uplink SINR, a precoding matrix (e.g., if applicable), and SU-MIMO layers. In some embodiments, these output metrics are used by the DU for the user link adaptation on PDCCH/PDSCH/PUSCH transmissions.

The third use-case example is specific to the MU-MIMO pairing suggestor to MAC scheduler component. The input metrics for this example use case, in some embodiments, include at least the UE-specific BFW matrix and the UE RF condition estimate. Some embodiments may also include supportive metrics such as user data demand, etc., as input metrics in addition to the UE-specific BFW matrix and the UE RF condition estimate.

The app algorithm for this use-case, in some embodiments, is meant to identify users that can be paired for MU-MIMO operations. For example, some embodiments of the third use-case use traditional signal processing algorithms based on information theory and cross-channel covariance evaluation. Alternatively, or conjunctively, some embodiments use machine learning based algorithms using the data inputs, which again requires feedback from the DU.

In some embodiments, the output metrics of this third use-case can include UE pairing suggestions and an impact assessment on SINR and SU-MIMO layers. Additionally, the DU in some embodiments uses the output metrics to select users for RF scheduling, and to determine the transmission efficiencies.

An example use-case for the user-level tracer can include QoS scheduling optimization with the goal of adjusting a user's scheduling priority for an RF resource to optimize the service quality. The input for some embodiments of this use-case can include a service quality target from a user subscription. In some embodiments, the user-level tracing includes (1) tracking the user RF condition, (2) tracking the user data traffic performance in different layers (e.g., MAC/RLC/PDCP), and (3) tracking the user RF resource consumption.

In some embodiments, the app algorithm is based on the QoS target and observed user traffic performance, and can be used to determine that a user's resource allocation is insufficient. The algorithm format, in some embodiments, can be logic-based or machine learning-based. In some embodiments, the output can include a recommendation issued to the MAC scheduler to adjust the traffic priority or link adaptation in order to improve performance.

On each machine (e.g., each VM or Pod) that executes a control plane application, some embodiments configure a RIC SDK to serve as an interface between the control plane application on the machine and a set of one or more elements of the RAN. In some embodiments, the RIC SDK provides a set of connectivity APIs (e.g., a framework) through which applications can communicate with the distributed near real-time (RT) RIC implemented by two or more near real-time RICs. Examples of such applications include xApps, and other control plane and edge applications in some embodiments. In O-RAN, xApps perform control plane, monitoring and data processing operations. The discussion below regarding FIGS. 4 and 6-H refers to control plane applications (e.g., 415, 615, 620, 715, 720, etc.). These control plane applications are xApps in an O-RAN system in some embodiments.

Figure 4:
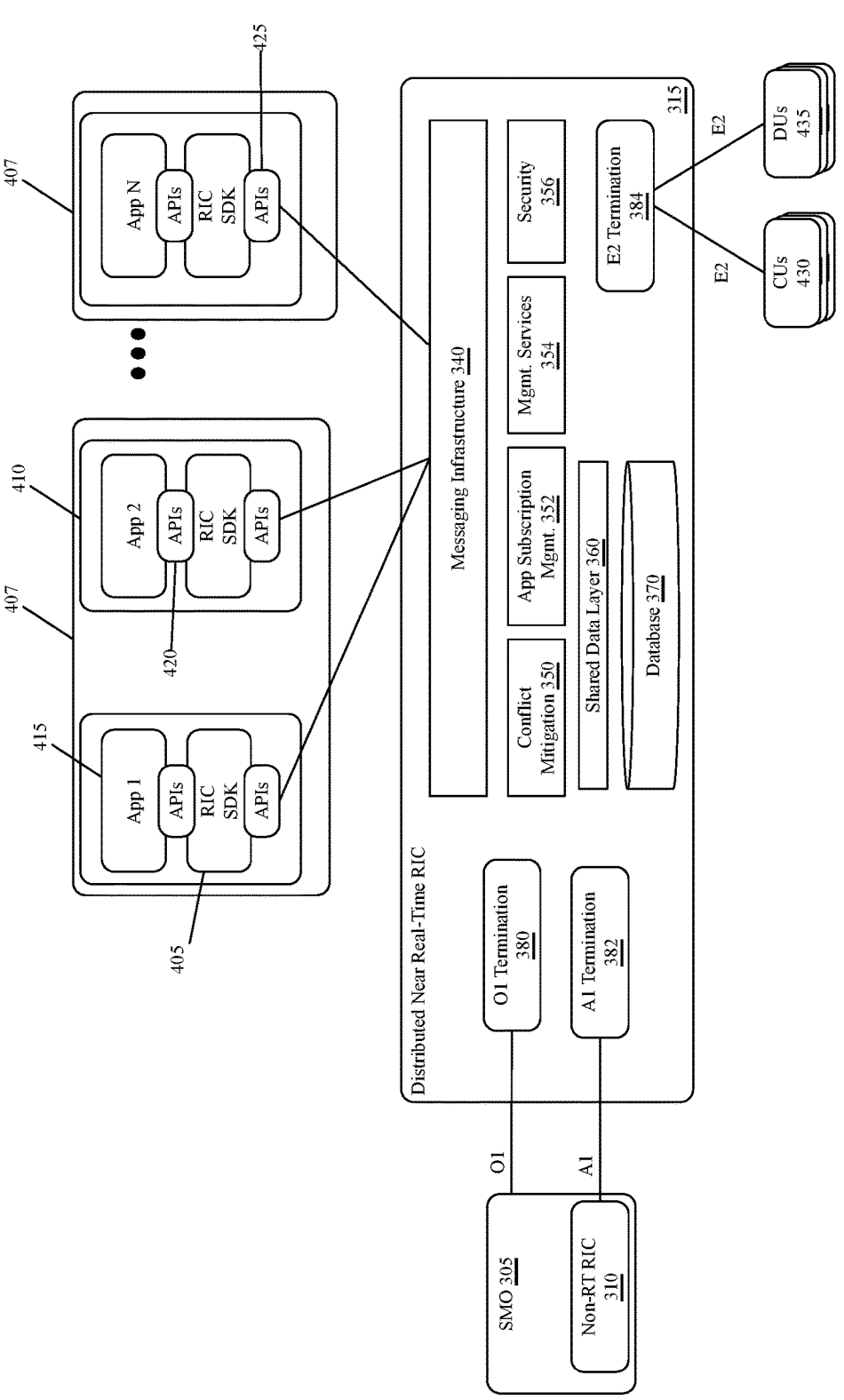
FIG. 4 illustrates deployment of RIC SDKs on machines that execute control plane applications in some embodiments.

FIG. 4 illustrates deployment of RIC SDKs 405 on machines 410 that execute control plane applications 415 in some embodiments. As shown, one or more machines 410 execute on each of several host computers 407 in one or more datacenters. In some embodiments, the RIC SDK 405 on each machine 410 includes a set of network connectivity processes that establish network connections to the set of RAN elements (e.g., E2 nodes 320, shared data layer 360, management services 354, SMO 305, etc.) for the control plane application. The RIC SDK processes allow the control plane application on their machine to forego performing network connectivity operations. In some embodiments, the set of network connectivity processes of each RIC SDK of each machine establishes and maintains network connections between the machine and the set of RAN elements used by the control plane application of the machine, and handles data packet transport to and from the set of RAN elements for the control plane application.

The control plane application on each machine communicates with the set of RAN elements through high-level APIs 420 that the RIC SDK converts into low-level APIs 425. In some embodiments, at least a subset of the low-level API calls 425 are specified by a standard specifying body. Also, in some embodiments, the high-level APIs 420 are made in a high-level programming language (e.g., C++), while the low-level API calls comprise low-level calls that establish and maintain network connections and pass data packets through these connections.

The set of RAN elements that the RIC SDK connects with the control plane application on its machine in some embodiments include RAN elements that are produced and/or developed by different RAN vendors and/or developers. These RAN elements include CUs 430 and DUs 435 of the RAN in some embodiments. Also, this SDK communicates with the CUs and DUs through the low-level, standard-specified E2 interface, while the control plane application on the machine uses high-level API calls to communicate with the CUs and DUs through the RIC SDK. In some embodiments, the high-level API calls specifying E2 interface operations at a high-level application layer that do not include low-level transport or network operations.

Figure 5:
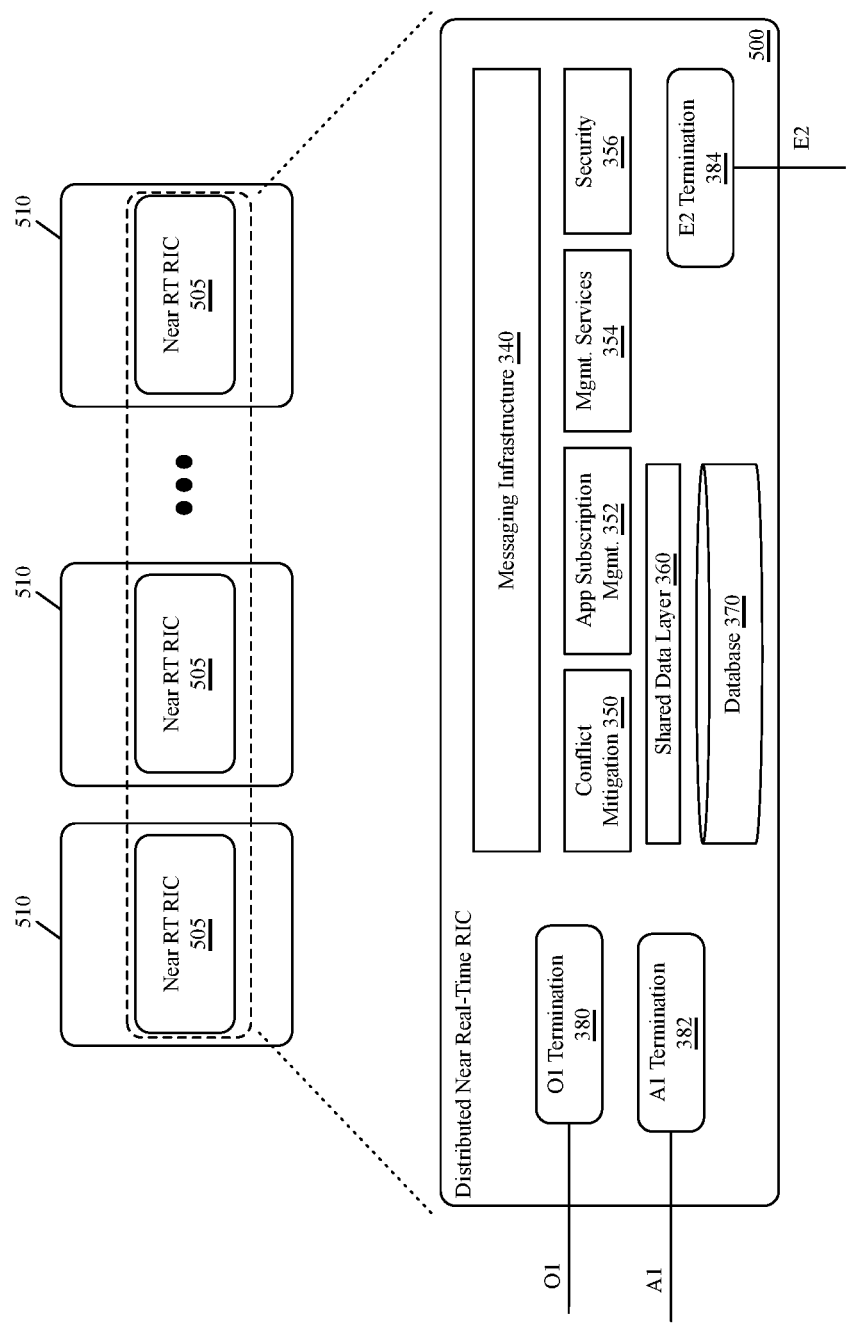
FIG. 5 illustrates that some embodiments deploy several RICs to execute on several host computers to implement a distributed near RT RIC that includes the RIC components illustrated in FIGS. 3 and 4.

Conjunctively, or alternatively, the set of RAN elements that the RIC SDK connects with the control plane application 415 on its machine 410 include network elements of the RIC. Again, these network elements in some embodiments include RAN elements that are produced and/or developed by different RAN vendors and/or developers. These RIC elements in some embodiments include shared data layer (SDL) 360, datapath input/output (I/O) elements, and application and management services 352 and 354 in some embodiments. FIG. 5 illustrates that some embodiments deploy several near RT RICs 505 to execute on several host computers to implement a distributed near RT RIC 500 that includes the RIC components illustrated in FIGS. 3 and 4. In some embodiments, one RIC 505 executes on each host computer that also executes a control plane application 415. In other embodiments, a control plane application 415 can execute on a host computer that does not execute a RIC. For instance, in some embodiments, one or more control plane applications execute on one or more host computers that have graphics processing units (GPUs), while RICs do not execute on such host computers as they do not need the processing power of the GPUs.

Through the distributed near RT RIC, the RIC SDK also connects its control plane application to other control plane applications executing on other machines. In other words, the RIC SDK and the distributed near RT RIC in some embodiments serve as communication interface between the control plane applications. In some embodiments, the different control plane applications are developed by different application developers that use the common set of RIC APIs to communicate with each other through the distributed near RT RIC. In some of these embodiments, the distributed near RT RIC adds one or more parameters to the API calls as it forwards the API calls from one control application to the other control application.

FIGS. 6-9 illustrate several examples of RIC architectures in which the RIC SDK and the distributed near RT RIC establish the communication interface between control plane applications. These architectures are mutually exclusive in some embodiments, while in other embodiments two or more of these architectures are used conjunctively. FIG. 6 illustrates a RIC 600 that executes on one host computer 605 along with two machines 610 and 612 on which two control plane applications 615 and 620 execute. Through the RIC SDKs 602 and 604 executing on the machines 610 and 612, the RIC 600 receives API calls from the CP application 615 and forwards the API calls to the CP application 620, and passes responses to these API calls from the second CP application 620 to the first CP application 615. It also passes API calls from the second CP application 620 to the first CP application 615, and responses from the first CP application 615 to the second CP application 620.

FIG. 7 illustrates two RICs 700 and 701 that execute on two host computer 705 and 707 along with two machines 710 and 712 on which two control plane applications 715 and 720 and two RIC SDKs 702 and 704 execute. As shown, API calls from the first CP application 715 to the second CP application 720 are forwarded through the first RIC SDK 702, the first RIC 700, the second RIC 701 and the second RIC SDK 704. The second CP application's responses to these API calls to the first CP application 715 traverse the reverse path, from the second RIC SDK 704, the second RIC 701, the first RIC 700, and the first RIC SDK 702.

The API calls from second CP application 720 to the first CP application 715 are forwarded through the second RIC SDK 704, the second RIC 701, the first RIC 700, and the first RIC SDK 702, while responses to these API calls from the first CP application 715 to the second CP application 720 are forwarded through the first RIC SDK 702, the first RIC 700, the second RIC 701 and the second RIC SDK 704.

FIG. 8 illustrates a RIC 800 that executes on first host computer 805 to connect two control plane applications 815 and 820 that execute on two machines 810 and 812 operating on two other host computers 806 and 807. Through the RIC SDKs 802 and 804 executing on the machines 810 and 812, the RIC 800 receives API calls from the CP application 815 and forwards the API calls to the CP application 820, and passes responses to these API calls from the second CP application 820 to the first CP application 815. It also passes API calls from the second CP application 820 to the first CP application 815, and responses from the first CP application 815 to the second CP application 820.

FIG. 9 illustrates a RIC 900 that executes on first host computer 905 to connect two control plane applications 915 and 920 that execute on two machines 910 and 912 one of which operates on host computer 905 while the other operates on host computer 906. Through the RIC SDKs 902 and 904 executing on the machines 910 and 912, the RIC 900 receives API calls from the CP application 915 and forwards the API calls to the CP application 920, and passes responses to these API calls from the second CP application 920 to the first CP application 915. Through these SDKs 902 and 904, the RIC 900 also passes API calls from the second CP application 920 to the first CP application 915, and responses from the first CP application 915 to the second CP application 920.

Figure 10:
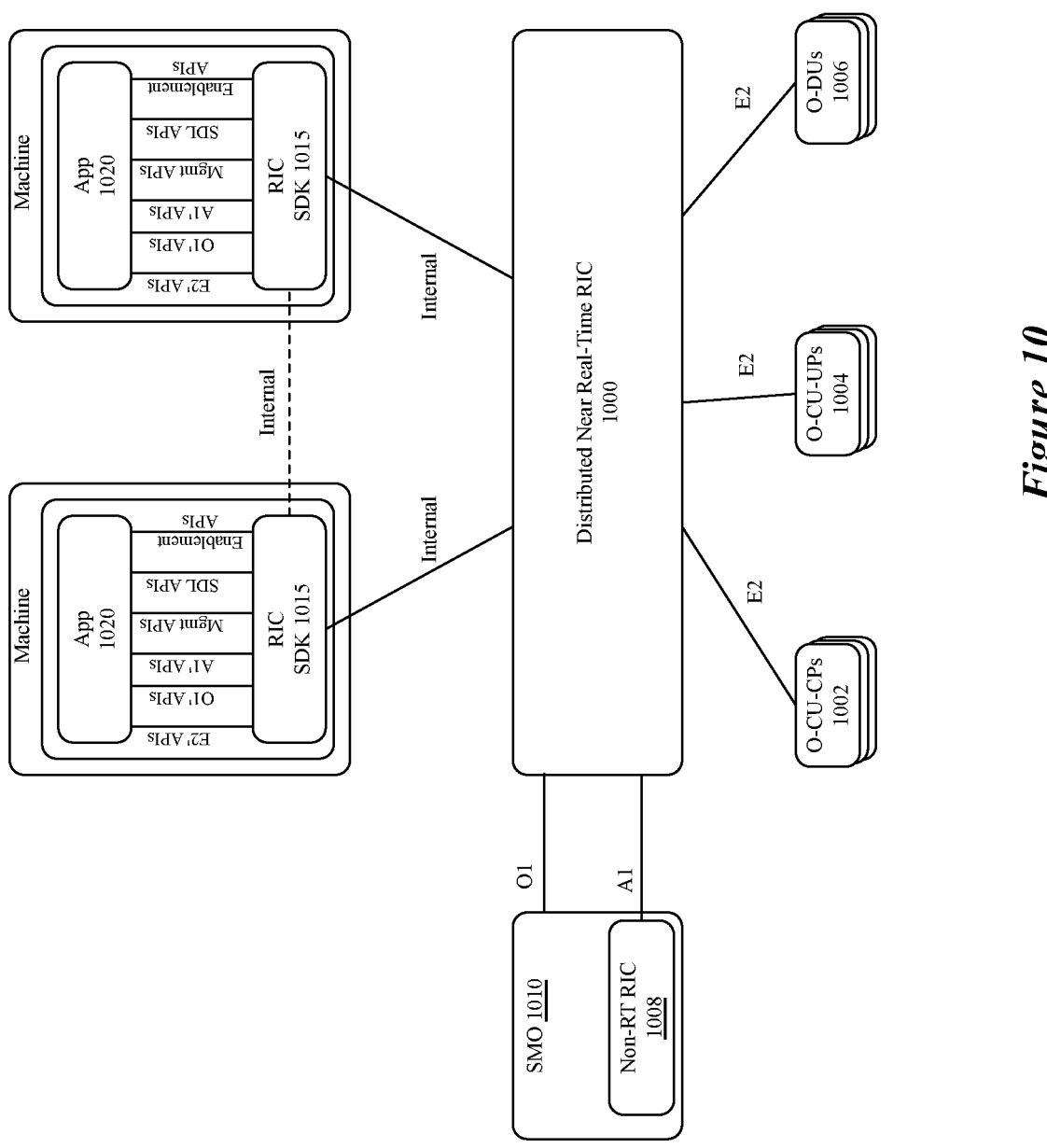
FIG. 10 illustrates examples of the different standard specified APIs that the distributed near RT RIC platform of some embodiments supports.

FIG. 10 illustrates examples of the different standard specified APIs that the distributed near RT RIC platform of some embodiments supports. As shown, the distributed near RT RIC platform 1000 in some embodiments uses the E2, O1, and A1 interfaces specified by the O-RAN standard specifying body. It uses the E2 APIs to communicate with the E2 O-RAN nodes, such as the O-CU-CPs 1002, O-CU-UPs 1004, and O-DUs 1006. It also uses the A1 APIs to communicate with the non-real-time RIC platform 1008, and uses the O1 APIs to communicate the SMO 1010.

For each of these E2, A1, and O1 APIs, the RIC SDKs 1015 provide high-level counterpart APIs for the control plane applications 1020 that use the RIC SDKs and the distributed near RT RIC platform to communicate with the E2 nodes 1002-1006, the non-real-time RIC platform 1008 and the SMO 1010. FIG. 10 designates these high-level counterpart APIs for the E2, O1, and A1 interfaces with a prime sign as the E2' API calls, O1' API calls and A1' API calls. These high-level counterpart APIs are not specified by a standard body, but are APIs that the RIC SDK and/or distributed near RT RIC convert into standard specified API calls.

FIG. 10 also shows several internal-RIC APIs for allowing the control plane applications 1020 to communicate with each other through the RIC SDKs and the distributed near RT RIC, and to communicate with one or more elements of the distributed near RT RIC (e.g., shared data layer (SDL)

360, datapath input/output (I/O) elements, and application and management services 352 and 354).

Enablement APIs are the APIs that are used in some embodiments to allow the control plane applications 1020 to communicate with each other. As described above by reference to FIGS. 6-9, these APIs are passed through the distributed near RT RIC in some embodiments. In other embodiments, these APIs allow the RIC SDKs of the control plane applications to directly communicate with each other without traversing through any other components of the distributed near RT RIC. For this reason, FIG. 10 includes a dashed bi-directional arrow between the RIC SDKs 1015 of the two control plane applications 1020 to indicate that in some embodiments the RIC SDKs 1015 of these applications communicate directly with each other.

The enablement APIs in some embodiments include registration APIs, service discovery APIs as well as inter-app communication APIs. Registration APIs are used by the applications 1020 (e.g., xApps) to introduce themselves to other applications 1020 by providing their network identifiers (e.g., their network address and available L4 ports) and providing their functionality (e.g., performing channel prediction). Service discovery APIs allow control plane applications 1020 (e.g., xApps) to query the service directory (e.g., of the distributed near RT RIC) for other control plane applications (e.g., other xApps) that provide a particular service. The inter-app communication APIs allow the control plane applications to communicate with each other to pass along data and/or request certain operations.

Some embodiments deploy an SDL cache on the same host computer as a control plane application, and use this cache to process at least a subset of the SDL storage access requests of the control plane application. In some embodiments, the control plane application and the SDL cache operate on a machine that executes on the host computer. In other embodiments, the SDL cache operates on the same host computer but outside of the machine on which the control plane application executes. In some of these embodiments, multiple control plane applications executing on the same host computer use a common SDL cache on that host computer.

The SDL cache is part of a RIC that executes on the same host computer as the control plane application in some embodiments. In other embodiments, the SDL cache is part of the RIC SDK that executes on the same machine as the control plane application. In either of these embodiments, a synchronizing process of the RIC or the RIC SDK synchronizes the data stored in the SDL cache with the data stored in the SDL storage.

In some embodiments, the SDL storage operates on a different host computer than the host computer on which the control plane application executes, while in other embodiments at least a portion of the SDL storage operates on the same host computer on which the control plane application executes. Also, in some embodiments, the RIC or the RIC SDK forwards SDL access requests from the control plane application to the SDL storage when the RIC SDK cannot process the SDL access requests through the SDL cache. For instance, the RIC or the RIC SDK cannot process SDL access requests through the SDL cache when the SDL cache does not store data requested by the control plane application.

Some embodiments provide various methods for offloading operations in an O-RAN (Open Radio Access Network) onto control plane (CP) or edge applications that execute on host computers with hardware accelerators in software defined datacenters (SDDCs). For instance, at the CP or edge application operating on a machine executing on a host computer with a hardware accelerator, the method of some embodiments receives data, from an O-RAN E2 unit, for which it has to perform an operation. The method uses a driver of the machine to communicate directly with the hardware accelerator to direct the hardware accelerator to perform a set of computations associated with the operation. This driver allows the communication with the hardware accelerator to bypass an intervening set of drivers executing on the host computer between the machine's driver and the hardware accelerator. Through this driver, the application in some embodiments receives the computation results, which it then provides to one or more O-RAN components (e.g., to the E2 unit that provided the data, to another E2 unit or to another xApp).

In some embodiments, a Pod is a small deployable unit of computing that can be created and managed in Kubernetes. A Pod includes a group of one or more containers with shared storage and network resources, and a specification for how to run the containers. In some embodiments, a Pod's contents are always co-located and co-scheduled, and run in a shared context. A Pod models an application-specific logical host computer; it contains one or more application containers that are communicate with each other. In some embodiments, the shared context of a Pod is a set of an operating system namespaces (e.g., Linux cgroups). Within a Pod's context, the individual applications may have further sub-isolations applied.

One of ordinary skill will realize that the passthrough access for the O-RAN control or edge application is used in other deployment settings in other embodiments. For instance, instead of operating on Pods, the applications in other embodiments operate on containers. These embodiments then use the hardware accelerator drivers of their Pods or VMs to have passthrough access to the hardware accelerators for the control or edge application. In some of these embodiments, the control or edge application communicates with the hardware accelerator through its associated RIC SDK, and communicates with other O-RAN components (to receive data and to provide results of its processing of the data) through its associated RIC SDK and the distributed near RT RIC connecting the O-RAN components and the application.

Direct, passthrough access to hardware accelerators is quite beneficial for O-RANs. The RIC is all about decoupling the intelligence that used to be embedded within the RAN software (CU and DU) and moving it to the cloud. One benefit of this is to use more advanced computing in the cloud for the xApp and edge operations (e.g., for ML, deep learning, reinforcement learning for control algorithms, etc.). A DU close to a cell site typically cannot run advance computations because it would not be economically feasible to put GPUs at each cell site as network cap X will be very high.

By using the hardware accelerator (GPU, FPGAs, eASICs, ASICs) in the SDDC, some embodiments run complex control algorithms in the cloud. Examples of such xApps include Massive MIMO beam forming and Multi-user (MU) MIMO user pairing, which were described above. Generally, any xApp whose computations can benefit from massive parallelization would gain the benefit of GPU or other accelerators. The use of ASICs is beneficial for channel decoding/encoding (turbo encoding, LDPC encoding, etc.). In some embodiments, the RIC is typically on the same worker VM as xApps. However, in other embodiments, the RICs executes on a different host computer so that more xApps that need GPUs and other hardware accelerators can run on the hosts with the GPUs and/or other hardware accelerators.

Some embodiments have the hardware accelerator drivers of the O-RAN control or edge applications communicate with virtualized hardware accelerators that are offered by an intervening virtualization application (e.g., hypervisor) that executes on the same host computer as the application. For instance, the method of some embodiments deploys a virtualization application on a host computer for sharing resources of the host computer among several machines executing on the host computer. This computer has a first set of one or more physical hardware accelerators.

The method deploys several applications on several machines to perform several O-RAN related operations for a set of O-RAN components. Through the virtualization application, the method defines a second set of two or more virtual hardware accelerators that are mapped to the first set of physical hardware accelerators by the virtualization application. The method assigns different virtual hardware accelerators to different applications. The method also configures the applications to use their assigned virtual hardware accelerators to perform their operations.

In some embodiments, the deployed machines are Pods, and the applications are deployed to execute on the Pods. At least two Pods execute on one VM that executes above the virtualization application. This VM includes a hardware accelerator driver that is configured to communicate with two different virtual hardware accelerators for the two applications executing on the two Pods. In other embodiments, multiple Pods execute on one VM that executes above the virtualization application, and each Pod has a hardware accelerator driver that is configured to communicate with a virtual hardware accelerator that is assigned to that driver.

To provide a low latency near RT RIC, some embodiments separate the RIC's functions into several different components that operate on different machines (e.g., execute on VMs or Pods) operating on the same host computer or different host computers. Some embodiments also provide high speed interfaces between these machines. Some or all of these interfaces operate in non-blocking, lockless manner in order to ensure that critical near RT RIC operations (e.g., datapath processes) are not delayed due to multiple requests causing one or more components to stall. In addition, each of these RIC components also has an internal architecture that is designed to operate in a non-blocking manner so that no one process of a component can block the operation of another process of the component. All of these low latency features allow the near RT RIC to serve as a high speed IO between the E2 nodes and the xApps.

Figure 11:
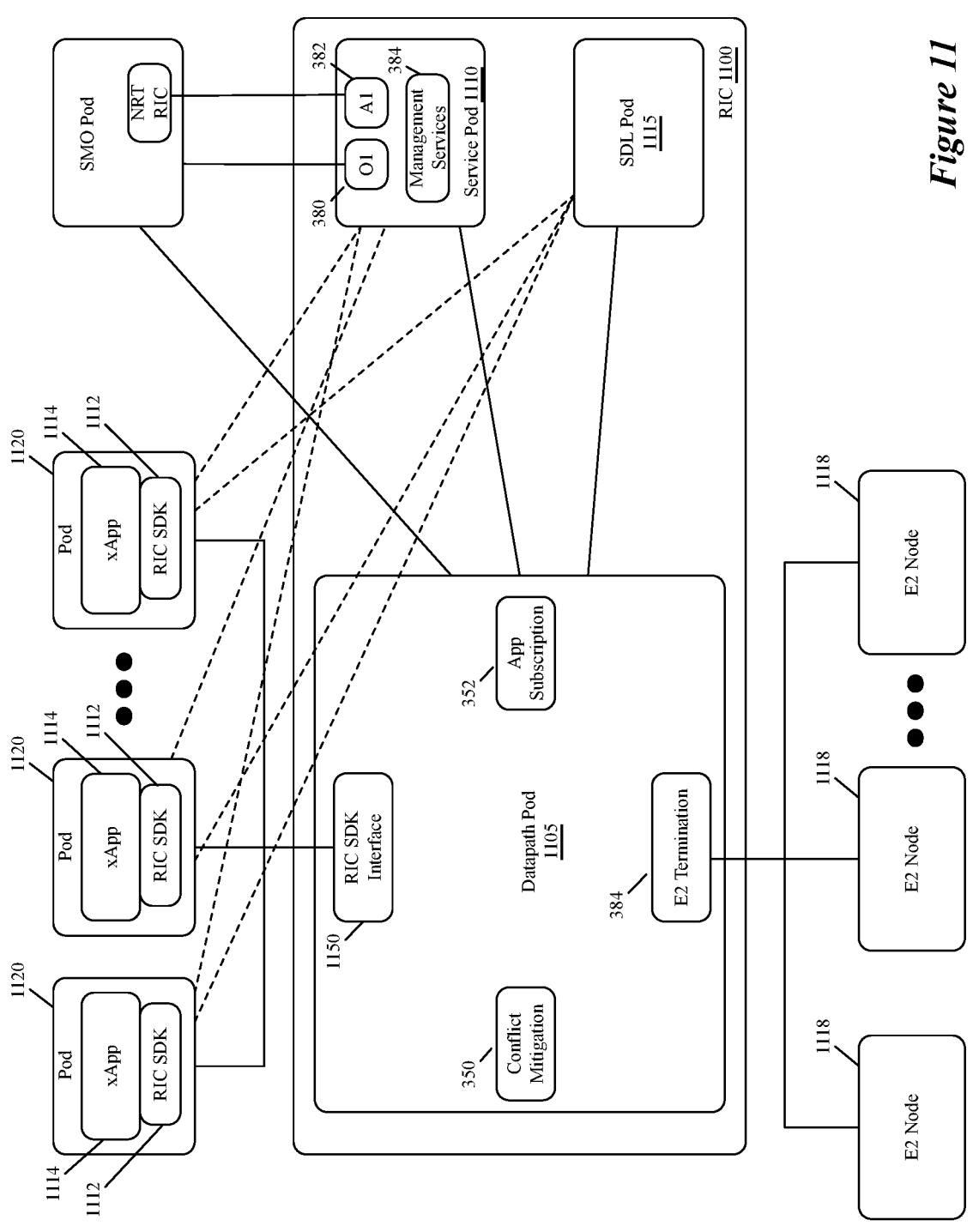
FIG. 11 illustrates an example of a near RT RIC with several components operating on several different machines.

FIG. 11 illustrates an example of a near RT RIC 1100 with several components operating on several different machines. In this example, the near RT RIC is divided into three Pods, which are a datapath Pod 1105, a service Pod 1110, and an SDL Pod 1115. In some embodiments, this RIC (1) handles E2AP messages between the E2 nodes 1118 and the xApps 1120, (2) manages connections with the E2 nodes 1118, (3) processes xApp subscriptions to E2 nodes, and (4) handles xApp liveness operations. The RIC 1100 provides reliable low-latency messaging between its various components, between the E2 nodes and xApps, and between E2 nodes/xApps and the RIC components. Part of the RIC's low latency architecture is attributable to using different Pods to implement the data IO, service and SDL operations, so that different resource allocations and management operations can be provided to each of these Pods based on its respective needs of the operations that they perform in several different Pods.

Each of the three RIC Pods 1105, 1110, and 1115 communicates with one or more xApp Pods 1120. In some embodiments, each Pod (1105, 1110, 1115 or 1120) is allocated hardware resources (e.g., CPUs, memory, disk storage, network IO, etc.) per the Pod's unique needs (i.e., per the datapath, service and storage operations performed by each Pod). Also, in some embodiments, each Pod has its own high availability and lifecycle update configuration that matches the unique needs of each Pod.

The service Pod 1110 performs xApp onboarding, registration, FCAPS (fault, configure, accounting, performance, security), and other services in some embodiments. For instance, in some embodiments, the service Pod 1110 provides the management services 354 of the near RT RIC, and performs the O1 termination 380 and the A1 termination 382 to the SMO and its associated non-RT RIC. In some embodiments, each of these components 354, 380 and 382 operate on a separate container in the service Pod 1110, while in other embodiments two or more of these components operate on one container in the service Pod 1110.

As mentioned above, the A1 Interface is between the near-RT RIC and the non-RT RIC in some embodiments. Through this interface, the near RT RIC relays relevant network information as reported by E2 nodes (e.g., CUs and DUs), and the non-RT RIC provides control commands for the E2 nodes (e.g., for control use-cases operation in non-RT granularities). The O1 Interface is between the near-RT RIC and the SMO, and in some embodiments is used for discovery, configuration, resource management and auto-scaling, life-cycle management, and fault tolerance.

The RIC management services 354 in some embodiments include services that the near RT RIC provides to the xApps and to the other RIC components. Examples of the services provided to the xApps include xApp service registry/directory (which the xApps can use to identify other xApps associated with the distributed near RT RIC and the operations performed by these other xApps), and FCAP operations, such as metric collection, policy provisioning and configuration. In some embodiments, the xApps can query the service registry/directory to identify other xApps or other xApps that perform particular services, and can register to receive notifications regarding xApps and their capabilities when the xApps are added to the directory.

Examples of FCAP operations performed by the service Pod 1110 for the xApp include fault operations involving collecting metrics that monitor CPU and memory utilizations to analyze to raise alerts, configuration operations to configure or re-configure the xApps, accounting operations to collect data needed for accounting and performance operations to collect metrics from xApps to analyze to quantify the xApp performance.

For the other RIC components (e.g., the datapath Pod 1105 and the SDL Pod 1115), the service Pod 1110 performs services as well, such as metric collection, policy provisioning and configuration. The service Pod 1110 can be viewed as a local controller that performs operations at the direction of a central controller, which is the SMO. Through the SMO, the service Pod 1110 would receive configuration and policies to distribute to the xApps and the other RIC components. Also, to the SMO, the service Pod 1110 provides metrics, logs and trace data collected from the xApps and/or RIC components (e.g., the datapath Pod and the SDL Pod). In some embodiments, the service Pod can be scaled (e.g., replicated) and backed up independently of the other Pods.

In some embodiments, the service Pod has a data cache that is a cache for a time series database of the SMO. In this cache, the service Pod stores stats, logs, trace data and other metrics that it collects from the xApps and one or more RIC components before uploading this data to the SMO database.

The SDL Pod 1115 implements the SDL 360 and its associated database 370. As further described below, the SDL Pod 1115 in some embodiments also executes one or more service containers to execute one or more preprocessing or post-processing services on the data stored in the SDL. Like the service Pod, the SDL Pod in some embodiments can be scaled (e.g., replicated) and backed up independently of the other Pods.

The datapath Pod 1105 includes several important near RT RIC components. These are the E2 termination 384, the conflict mitigation 350, the application subscription management 352, and the RIC SDK interface 1150. In the discussion below, the datapath Pod is at times referred to as dric-control (e.g., dRIC control pod) given the control operations of the datapath Pod, or E2 termination interface (E2T) given that from the RAN application perspective (e.g., xApp perspective), the datapath Pod is an interface to the E2 nodes. Also, as further described below, some or all of the datapath services in some embodiments are embedded in a datapath thread and a control thread of the datapath Pod. In other embodiments, the datapath services are embedded in a data IO thread, multiple data processing threads and a control thread.

A thread is a component of a process that executes on a computer. The process can be an application or part of a larger application. A thread is a sequence of programmed instructions that can be managed independently of other threads of the process. Multiple threads of a given process can execute concurrently (e.g., by using multithreading capabilities of a multi-core processor) while sharing the memory allocated to the process. Multithreading is a programming and execution model that allows multiple threads to exist within the context of one process. These threads share the process's resources, but are able to execute independently.

The control thread in some embodiments is the interface with the service Pod and SDL Pod for the datapath threads, while in other embodiments it is the interface to just the service Pod for the datapath threads (as the datapath threads can communicate directly with the SDL Pod). The control thread in either of these approaches performs the slower, control related operations of the datapath, while the one or more datapath threads perform the faster IO operations of the datapath. The control thread in some embodiments interfaces with the service Pod to receive configuration data for configuring its own operations as well as the operations of the datapath thread.

The embodiments that separate the datapath thread into a data IO thread and multiple data processing threads further optimize the data IO by pushing the more computationally intensive operations of the datapath thread into multiple datapath processing threads, which then allows the less computationally intensive operations to run in the data IO thread. Both of these optimizations are meant to ensure a fast datapath IO (one that does not experience unwanted latencies) so that the near RT RIC can serve as a high speed interface between E2 nodes 1118 and xApps 1120.

As mentioned above, the Pods 1105, 1110 and 1115 communicate through high speed inter Pod interfaces. In some embodiments, the Pod-to-Pod connections are established through SCTP (streaming control transport protocol) or through even higher speed shared memory (shmem) connections. In some embodiments, the shared memory connections are employed only between a pair of Pods that executes on the same host computer. Examples of such pairs of Pod include (1) a datapath Pod and an SDL Pod, (2) a datapath Pod and a service Pod, (3) a service Pod and an SDL Pod, (4) an xApp Pod and a datapath Pod, (5) an xApp Pod and an SDL Pod, etc. The shared memory is lockless and access to it is non-blocking in some embodiments. Other embodiments use slower interfaces (e.g., gRPC) between the service Pod 1110 and the other Pods 1105, 1115, and 1120 as the service Pod is not as critical a Pod as the other Pods.

Figures 12, 13, 14:
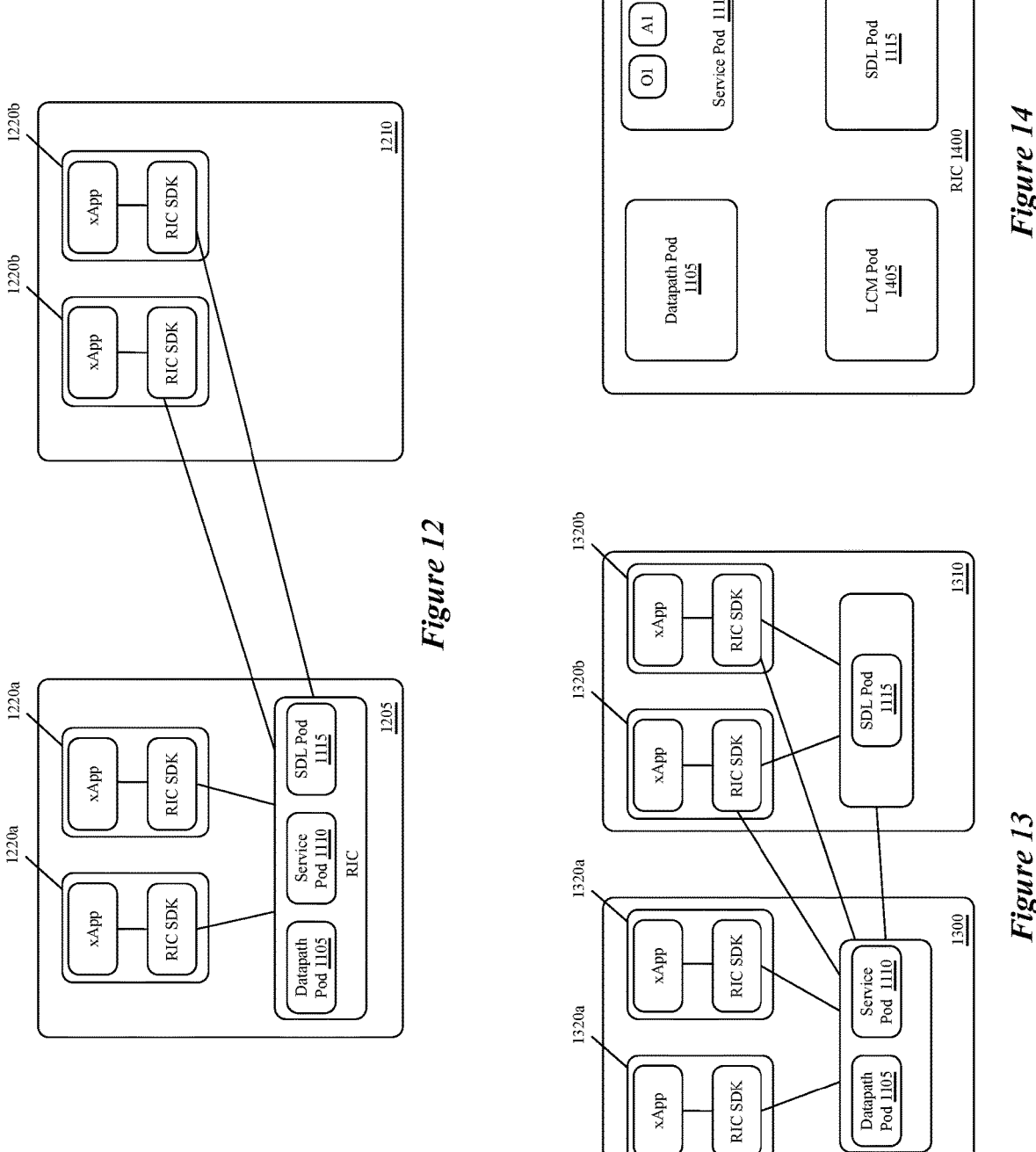
FIGS. 12 and 13 illustrates different examples for deploying the components of the near RT RIC of FIG. 11.
FIGS. 14 and 15 illustrate other examples of a near RT RIC.

The different Pods (e.g., 1105, 1110 and 1115) of a near RT RIC in some embodiments can execute on the same host computer or can execute on two or more host computers. In other embodiments, one or more of the Pods (e.g., the service Pod 1110) always operates on a separate host computer than the other Pods (e.g., the datapath Pod 1105 and the SDL Pod 1115). Also, in some embodiments, the Pods 1105, 1110 and 1115 operate on one host computer 1205 along with one or more xApp Pods 1220a, while other xApp Pods 1220b operate on other host computers 1210, as shown in FIG. 12. In other embodiments, two of the Pods 1105, 1110 and 1115 operate on one host computer along with one or more xApp Pods, while the other one of the Pods 1105, 1110 and 1115 operates on another host computer along with one or more xApp Pods.

For instance, FIG. 13 illustrates the datapath Pod 1105 and service Pod 1110 executing on a host computer 1300 along with two xApp Pods 1320a, while the SDL Pod 1115 executes on a host computer 1310 along with two xApp Pods 1320b. In some embodiments, Pods that require hardware accelerators are placed on host computers with such hardware resources, while Pods that do not require these accelerators are put on host computers without these accelerators, as mentioned above. In some embodiments, SDL Pods and xApp Pods use hardware accelerators, while the datapath Pod and service Pods do not. Various examples of Pods that can benefit from hardware accelerators and bypass paths to these accelerators are described above and further described below.

Also, although several near RT RICs are described above and below as being implemented with Pods, the near RT RICs in other embodiments employ VMs to implement the RIC components. Moreover, even in the embodiments that implement the different RIC components with Pods, some or all of the Pods operate on VMs, such as lightweight VM (e.g., Photon VMs provided by VMware, Inc.).

In addition to using fast communication interfaces between the Pods, some or all of the Pods use non-blocking, lockless communication protocols and architectures in some embodiments. For instance, the datapath Pod 1105 uses non-blocking, lockless communication between threads and processes that make up this Pod. Datapath Pod 1105 also uses non-blocking, lockless communication when communicating with the service Pod 1110, the SDL Pod 1115 or the xApp Pods 1120. Non-blocking communication ensures that no first component that sends a request to a second component can stall the operations of the second component when the second component is processing too many requests. In such cases, the second component will direct the first component to resend its request at a later time. The datapath Pod employs lockless communication in that it uses single thread processing that does not employ thread handoffs. Hence, no portion of memory has to be locked to ensure that another process thread does not modify it in an interim time period.

The communication interface between the RIC SDK interface 1150 of the datapath Pod 1105 and the RIC SDK 1112 of an xApp Pod 1120 is also novel in some embodiments. In some embodiments, this interface parses the header of E2AP messages received from E2 nodes, stores some or all of the parsed components in a new encapsulating header that encapsulates the E2SM payload of the E2AP message along with some or all of the original E2AP header. In doing this encapsulation, the SDK interface 1150 in some embodiments performs certain optimizations, such as efficiently performing data packing to reduce message size overhead for communications from one Pod to another (e.g., reduces the size of the E2 Global ID value, etc.). These optimizations improve the efficiency of the near RT RIC datapath Pod and xApp Pod communication.

The near RT RIC in other embodiments has one or more other Pods. For instance, FIG. 14 illustrates a near RT RIC 1400 that in addition to the Pods 1105, 1110, and 1115, also includes a lifecycle management (LCM) Pod 1405. The LCM Pod is a specialized service Pod responsible for upgrading each of the other Pods 1105, 1110 and 1115 of the near RT RIC 1400. Separating the lifecycle management from the service Pod 1110 allows the service Pod 1110 to be upgraded more easily.

In some embodiments, the LCM Pod 1405 uses different upgrade methodology to upgrade the different Pods. For instance, the LCM Pod in some embodiments replicates the SDL data store and seamlessly transitions from an active data store to another standby datastore in order to perform a hitless upgrade of the SDL. On the other hand, to upgrade the datapath Pod, the LCM Pod's procedure is more involved, as it configures the active and standby datapath Pods to be dual-homed connections for each E2 node and each xApp, and configures the active datapath Pod to replicate state with the standby datapath.

Figure 15:
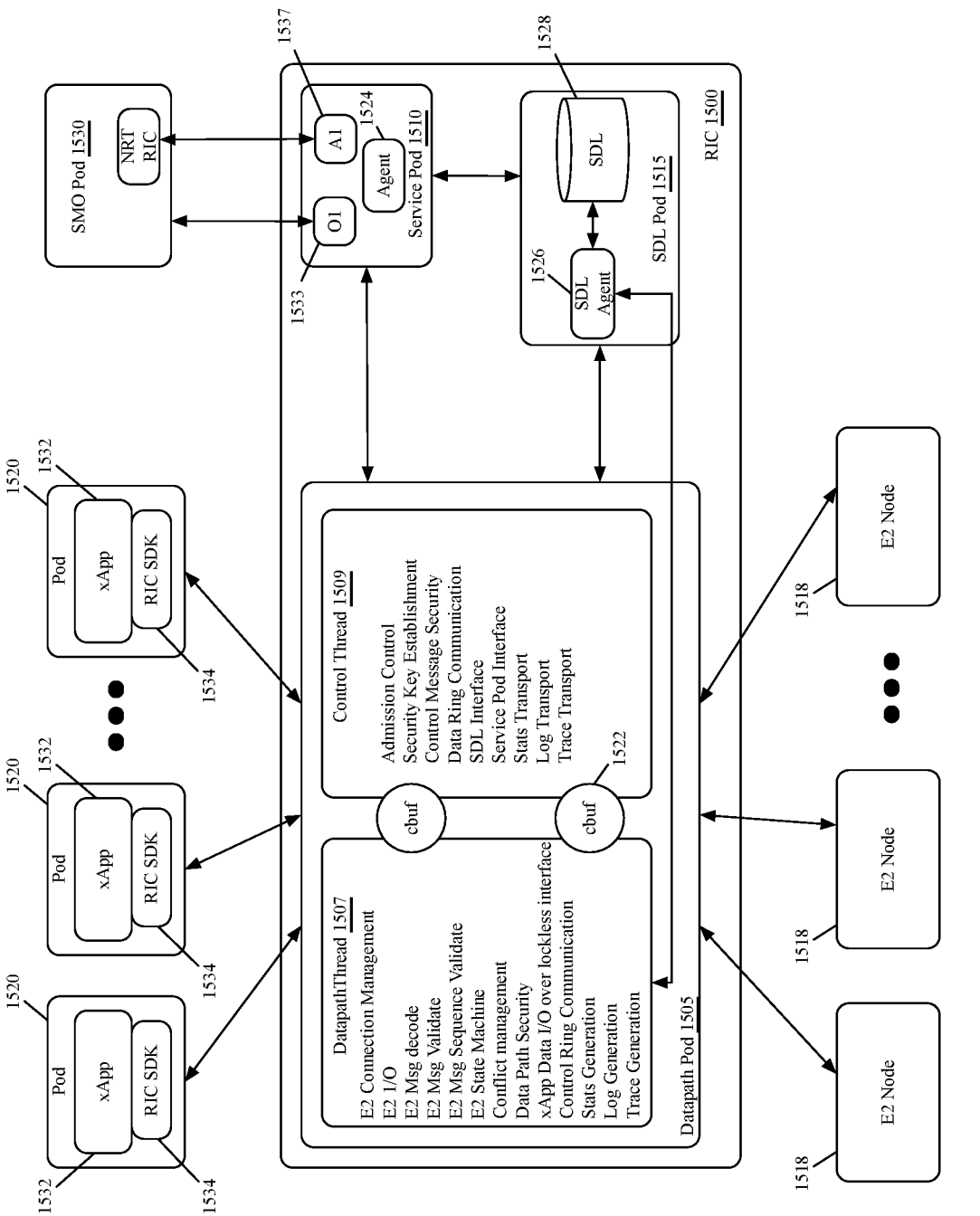

FIG. 15 presents a more detailed view of a near RT RIC 1500 for some embodiments. As shown, the near RT RIC 1500 includes a datapath Pod 1505, a service Pod 1510 and an SDL Pod 1515. The SDL Pod 1515 includes an SDL agent 1526 and the shared SDL storage 1528 of the RIC 1500, while the service Pod 1510 includes a service agent 1524 along with the O1 and A1 termination interfaces 1535 and 1537. The datapath Pod 1505 includes a datapath thread 1507 and a control thread 1509.

The datapath thread 1507 provides a fast datapath IO of the near RT RIC between the E2 nodes 1518 and the xApps 1532. The data plane capabilities of the RIC in some embodiments can be scaled up by implementing the RIC datapath IO with one control thread and multiple datapath threads that share the load for the datapath processing of the datapath Pod. Several such implementations will be further described below. The control thread 1509 performs several control operations associated with the RIC's datapath. The near RT RIC 1500 separates the control and datapath threads because the data IO operations need to be fast and should not be slowed down by control operations that can operate at a slower rate. In some embodiments, the control and datapath threads are two threads in a single process (i.e., run in the same shared memory address space).

In some embodiments, each of these threads uses non-blocking, lockless interfaces to communicate with other components in this architecture (e.g., with the RIC SDK, service Pod agent, SDL agent, and/or E2 nodes) to the extent that they communicate with these other components. Also, in some embodiments, both threads use minimal OS system calls and run as infinite loops. As further described below, the datapath thread and the control thread exchange data over two circular rings 1522 (called cbuf), with one ring handling messages from the datapath thread to the control thread and the other handling messages from the control thread to the datapath thread.

The control thread 1509 serves as the control interface to the E2 nodes 1518, the SMO 1530 (through the service Pod agent 1524), the xApps (e.g., through SCTP), and the SDL Layer (through the SDL agent 1526). In some embodiments, the control thread is the main thread to communicate with these external entities; however, as further described below, the datapath thread in some embodiments also communicates with the SDL 1515 through the SDL agent 1526.

The control thread 1509 in some embodiments handles all control functions. This thread sends various control parameters to other functions, and in some embodiments enforces admission controls. In other embodiments, the datapath thread 1507 enforces admission controls and the SMO through the service Pod specifies the admission controls. The control thread 1509 in some in some embodiments has control channel communications with the RIC SDK of an xApp Pod through SCTP. In other embodiments, the control thread communicates with the RIC SDK of an xApp Pod through gRPC. Also, in some embodiments, the control thread communicates with the RIC SDK through shared memory (shmem) when the xApp Pods and the datapath Pod execute on the same host computer The control thread 1509 also provides the transport mechanism to transport the statistics, logs and trace data generated by the datapath thread 1507. In some embodiments, some or all of this data is transported to the SDL Pod 1515 through the SDL agent 1526 and/or to the SMO 1530 through the service agent 1524. The control thread 1509 in some embodiments negotiates security keys with E2 node peers, and passes these keys to the datapath thread, which uses them to perform its encryption/decryption operations.

The datapath thread 1507 provides the high speed IO between E2 nodes and xApps. This thread handles the RIC SDK interface and the E2 termination operations, as well as the conflict mitigation and xApp subscription operations in some embodiments. This thread performs ASN.1 decoding of E2AP messages to extract the message data. In some embodiments, the datapath thread does not decode the E2SM payload of these messages. The datapath thread 1507 validates E2 and xApp messages and sequences. In some embodiments, the message types include E2 node setup and service update, E2 node indication reports, xApp initiated subscriptions for E2 node data and xApp initiated control requests.

The datapath thread 1507 in some embodiments runs E2 state machines in order to create and maintain state on behalf of xApps (e.g., state of E2 nodes, subscriptions to E2 nodes, etc.). Also, in some embodiments, the datapath thread performs table lookups to send messages to xApps that request data. This thread also handles control requests from xApps towards E2 nodes and forwards back responses to these requests from the E2 node to the xApps.

The datapath thread communicates with the xApps through SCTP when the xApps are on another host computer, or through shared memory when the xApps are on the same host computer. In some embodiments, the xApp messages have CRC bits to detect corruption. These messages also carry timestamps and can be compressed in some embodiment. The datapath thread 1507 performs data replication for multiple subscriptions. The datapath thread 1507 also performs datapath security operations, e.g., by signing, encrypting and decrypting data messages.

As mentioned above and further described below, the datapath thread 1507 communicates with the control thread 1509 in some embodiments via a pair of rings 1522. In some embodiments, the frequency of messages between the two threads can be tuned (e.g., can be configured) to be from sub milliseconds to seconds per ring pair. Through the control thread, the datapath thread 1507 receives configuration data updates and state changes. The datapath thread 1507 generates statistics, logs and traces and provides the generated statistics, logs and trace data to the control thread for storage in the SDL and/or to provide to the SMO.

The datapath thread 1507 also performs conflict management operations in case multiple xApps try to set the same parameters to the same E2 node at the same time. For instance, the conflict management operations ensure that two xApps do not try to change a cellular network setting (e.g., a direction of an antenna) differently within a short time period. In some embodiments, the datapath thread's conflict management employs different methodologies to address different types of conflicts, e.g., (1) for one set of requests, for a duration of time, it rejects a second request to modify a parameter after receiving a conflicting earlier first request, (2) for another set of requests, it rejects a request regarding a parameter from one xApp when another higher priority xApp makes a conflicting request for the same parameter, (3) for another set of requests regarding another set of parameters, it only accepts requests made by xApps that are allowed to make such requests during particular periods of time. The policies for handling these conflicts are provided by the SMO 1530 through the service Pod's agent 1524.

In FIG. 15, each xApp Pod 1520 can execute one or more xApps 1532, and interfaces with the datapath Pod 1505, the SDL Pod 1515 and the service Pod 1510 through the RIC SDK 1534 that executes on the xApp Pod. Each RIC SDK provides high-level interfaces for xApps to communicate with the RIC and the E2 nodes. This high level interface hides details of underlying implementation. The RIC SDK communicate with the RIC instances through fast data IO communication channels (such as shared memory or SCTP).

The RIC SDK also uses control communication channel with the service Pod 1510 and the control thread 1509 for xApp control operations such as xApp onboarding, registration, capabilities, subscription, FCAPS, etc. In some embodiments, the control channel communication between the SDK and the control thread 1509 is through shared memory when the xApp Pod (and its SDK) and the datapath Pod operate on the same host computer, and through SCTP when they operate on different computers. Also, in some embodiments, the control channel communication between the xApp Pod (and its SDK) and the service Pod is through shared memory when the SDK and the service Pod operate on the same host computer, and through gRPC when they operate on different computers. Other embodiments use SCTP for communications between the SDK and the service Pod when the xApp Pod (and its SDK) and the service Pod operate on different host computers.

Some of embodiments use proto bufs when the RIC SDK communicates with the service Pod through gRPC. Also, in some embodiments where the RIC SDK's communication with the datapath Pod is over shared memory, the shared memory communication uses proto bufs. The RIC SDK has APIs for data functions, e.g., E2 messages to and from E2 nodes. These APIs also include control function messaging, such as onboarding xApp (name, version, function), message subscription, keep alive messaging, and A1 and O1 interface communications with the SMO through the service Pod (e.g., communications to store stats, logs, and trace data in a time series database on the SMO or service Pod, such as Prometheus and ELK).

Some embodiments assign the datapath thread and control thread to one processor core, assign the SDL to another processor core (in order to isolate it from data and control threads), and assign the service Pod to yet another processor core. When one or more xApps execute on the same host computer as the RIC, the xApps are assigned to different cores than the RIC Pods, where multiple xApps can be assigned to the same core, or individual cores are assigned to individual xApps, as needed.

To improve the performance of the RIC and the xApps further, other embodiments perform other hardware assignment optimizations, such as particular memory allocations (e.g., larger RAM allocations) and particular IO allocations. Examples of special IO allocations for some of the Pods include (1) SRIOV allocations for an xApp Pod on one host computer to communicate with a datapath Pod on another host computer, (2) SRIOV allocations for a datapath Pod to communicate with E2 nodes, (3) SRIOV allocations for an xApp Pod on one host computer to communicate with a service Pod on another host computer, and (4) gRPC or SCTP communication over the SRIOV allocations, with the gRPC communications having lower bandwidth allocations and being lower priority than the SCTP communications.

In some embodiments, one RIC and several xApps are bundled together to operate on different Pods that operate on one VM. Multiple instances of the RIC can also be deployed in some embodiments with different sets of xApps. Also, in some embodiments, xApps that need to talk to each other are bundled on the same VM.

As mentioned above, some embodiments implement the RIC datapath not as one datapath thread but as one data IO thread along with multiple datapath processing threads. In some embodiments, each datapath processing thread (DPT) is responsible for performing the datapath processing for a different set of E2 nodes, with each E2 node assigned to just one datapath processing thread. In some embodiments, the data IO thread identifies the DPT associated with an E2 message or an xApp message by hashing the E2 node identifier contained in the message and using the hashed value (obtained through the hashing) as an index into a lookup table that provides the DPT identifier of the DPT that needs to process the data message.

Figure 16:
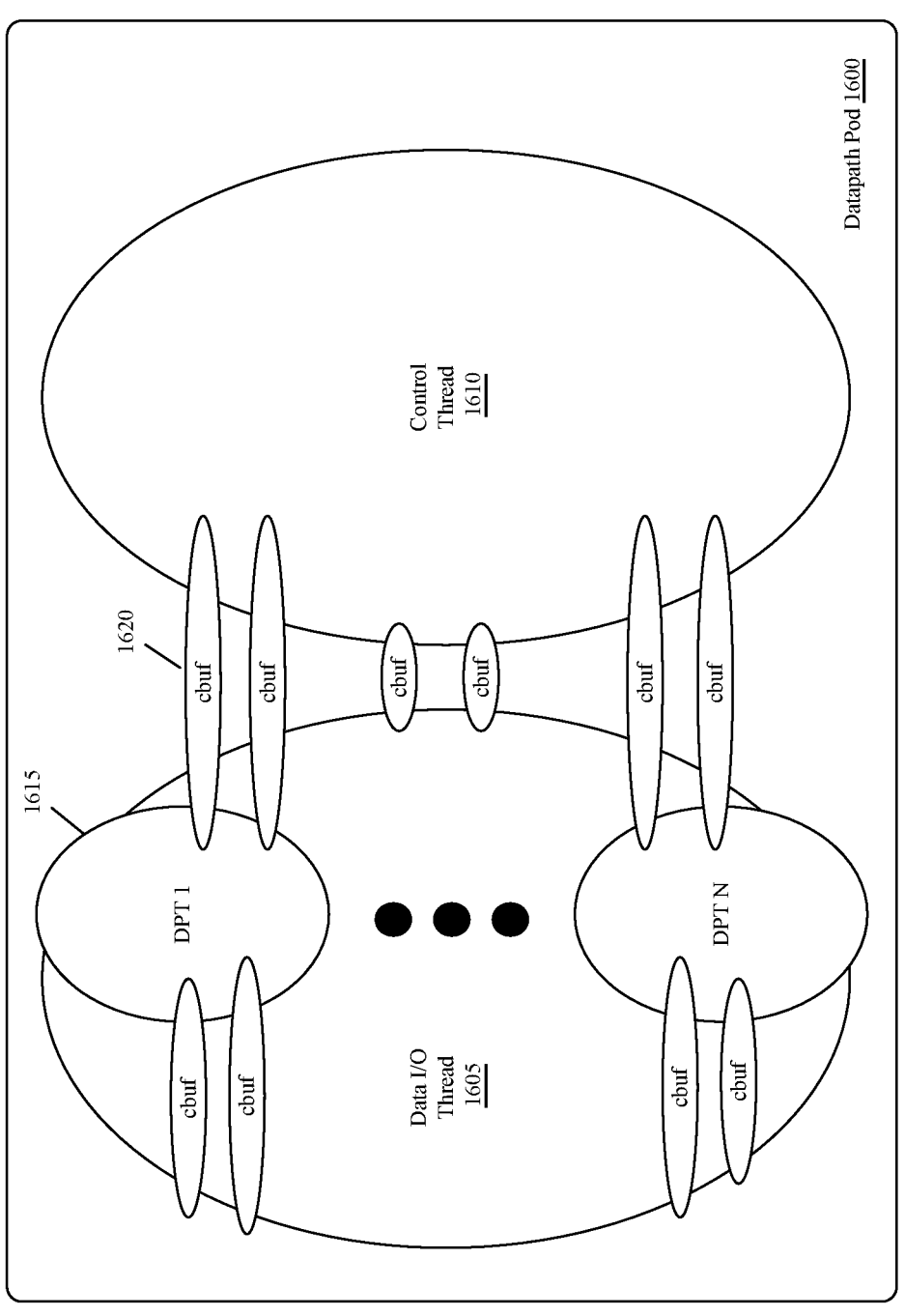
FIG. 16 illustrates an example of a RIC datapath Pod.

FIG. 16 illustrates an example of a RIC datapath Pod 1600 that has one data IO thread 1605, one control thread 1610, and multiple DPTs 1615. The DPTs share the datapath processing load of the datapath Pod 1600. As shown, there is a pair of cbuf rings 1620 between each DPT 1615 and the data IO thread 1605, each DPT 1615 and the control thread 1610, and the data IO thread 1605 and the control thread 1610. Each ring 1620 in a cbuf pair passes data messages in one direction from one of the two threads associated with the ring to the other thread, with one ring handling communication in one direction (e.g., from first thread to second thread) and the other ring handling communication in the other direction (e.g., from second thread to the first thread).

Separating the data IO thread 1605 from multiple DPTs 1615 optimizes the data IO of the datapath Pod 1600 by pushing the more computationally intensive operations into the DPTs, which then allows the less computationally intensive IO operations to run in the data IO thread 1605. This optimization ensures a fast datapath IO (one that does not experience unwanted latencies) so that the RIC can serve as a high speed interface between the E2 nodes and the xApps. Also, each E2 node is the responsibility of just one DPT thread 1615, which typically is responsible for several E2 nodes. Because each E2 node is handled by one particular DPT, no two DPTs will try to change one or more records associated with one E2 node. Hence, the datapath Pod 1600 does not need to lock any E2 node's records as there is clear demarcation of responsibilities vis-a-vis the communications with the E2 nodes.

The data IO thread 1605 performs the following operations (1) managing connections to the E2 nodes and the xApp Pods, (2) transmitting data messages through these connections to and from the E2 nodes and the xApp Pods, (3) performing security operations, (4) control ring communication with control thread 1610 and DPTs 1615, and (5) generating statistics, logs and trace data regarding messages that it processes.

Each DPT thread 1615 performs the following operations (1) message decode and encode operations (e.g., message encrypt and decrypt operations), (2) message validate operations, (3) sequence validate operations, (4) maintain state machine to keep track of state of the E2 node and the xApp requests and subscriptions, (5) perform conflict management, (6) control ring communication with control thread 1610 and DPTs 1615, and (7) generate statistics, logs and trace data regarding messages that it processes.

Figure 17:
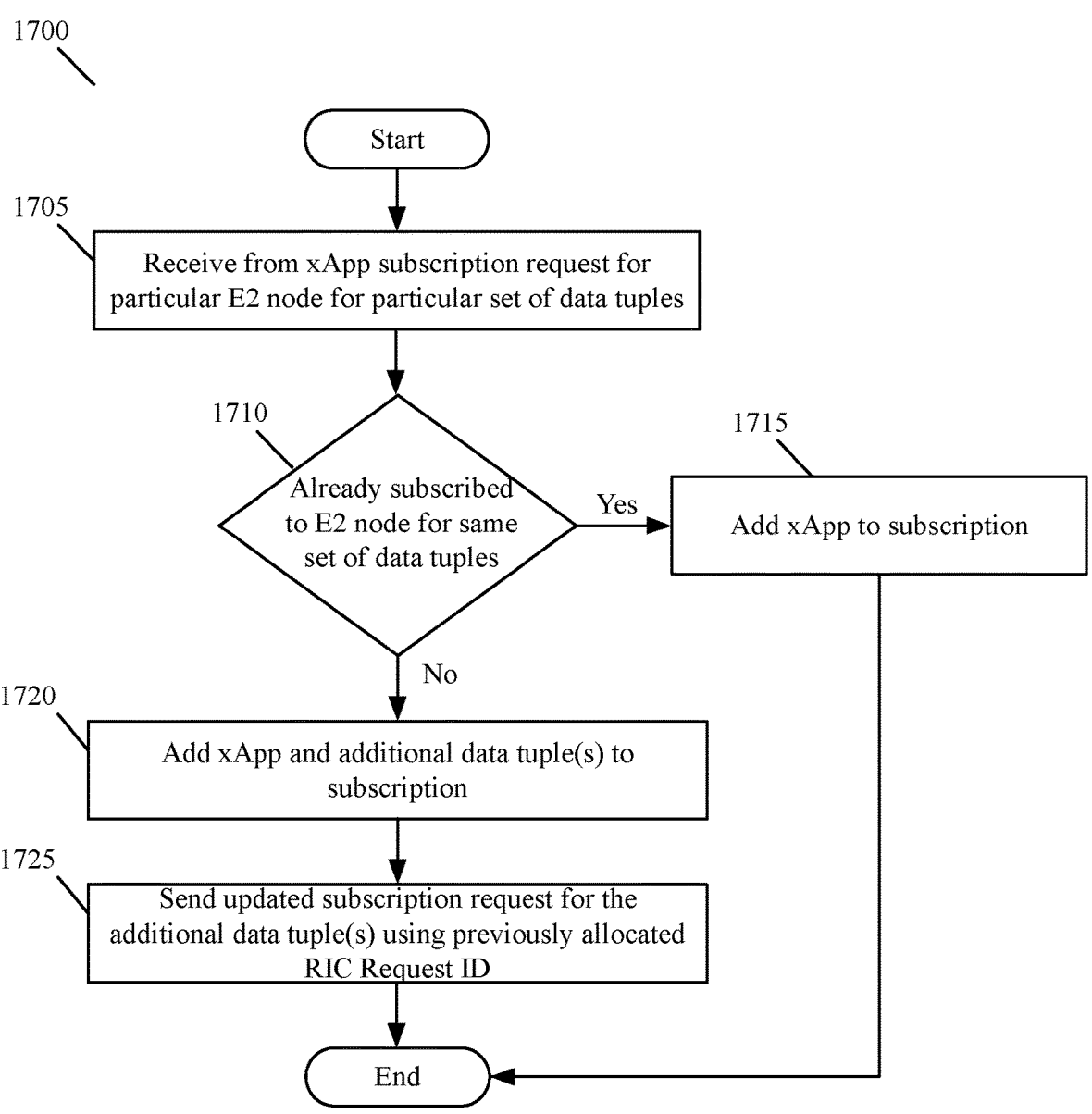
FIG. 17 illustrates a process that the datapath thread performs in some embodiments to process subscription requests from an xApp.

FIG. 17 illustrates a process 1700 that the datapath thread performs in some embodiments to process subscription requests from an xApp. As shown, the process starts when the DPT receives (at 1705) an xApp subscription request from the data IO thread. The subscription request is directed to a particular E2 node for a particular set of data tuples (e.g., a particular set of operational parameters or other parameters) that the particular E2 node maintains.

At 1710, the process 1700 determines whether it has already subscribed to the particular E2 node to receive the particular set of data tuples. This would be the case if the DPT previously sent the particular E2 node one or more subscription requests that individually or collectively requested the particular set of data tuples or a larger set of data tuples that includes the particular set of data tuples.

When the process 17100 determines (at 1710) that it has already subscribed to the particular E2 node to receive the particular set of data tuples, it (at 1715) adds a new record, or updates a record previously specified, for the xApp in this E2 node's subscription list and specifies in this record this particular set of data tuples that the xApp should receive. After 1715, the process ends.

On the other hand, when the process 17100 determines (at 1710) that it has not already subscribed to the particular E2 node to receive the particular set of data tuples, it has to either send a first subscription to the particular E2 node if it does not have an active subscription with this node, or has to send an updated subscription to the node if it has an active subscription but not one that includes all of the data tuples in the particular set of data tuples specified in the request received at 1705.

Hence, in such a case, the process 1700 (at 1720) adds a new record, or updates a record previously specified, for the xApp in this E2 node's subscription list and specifies in this record the particular set of data tuples that the xApp should receive. Next, it sends an updated subscription request to the particular E2 node using a previously allocated RIC Request ID. This updated subscription specifies all of the data tuples in the requested particular set of data tuples when none of these tuples were previously requested by an earlier subscription to the particular E2 node, or specifies some of these data tuples when other data tuples in the particular set were previously requested by one or more earlier subscriptions to the particular E2 node. After 1725, the process 1700 ends.

FIG. 18 illustrates a process 1800 that the data IO thread 1605 and a DPT 1615 perform in some embodiments to process a data message from the E2 node that one or more xApps should receive. As shown, the process 1800 starts when the data message is received (at 1805) by the datapath Pod through an SCTP connection with the E2 node. At 1810, the data IO thread 1605 generates a hash value from the E2 node's ID. It then uses (at 1815) the hash value as an index into a lookup table to identify the DPT that is assigned to processing messages associated with the E2 node.

At 1820, the data IO thread passes the received data message to the identified DPT (i.e., the DPT identified at 1815) along the cbuf ring 1620 that is for passing messages from the data IO thread to the identified DPT. Next, at 1825, the DPT uses its data structure records (e.g., the records maintained by its state machine) to identify the set of one or more xApps that should get the E2 message. In some embodiments, the identified set of xApps are the xApps that have subscribed to receive data (e.g., all the data or a subset of the data) from the E2 node.

At 1830, the DPT specifies a data message for the data IO thread 1605 to send to the identified set of xApps. This data message is in the encapsulated format described below by reference to Table 1. The DPT then passes (at 1835) the data message to the data IO thread 1605 along the cbuf ring 1620 that is for passing messages from the DPT 1615 to the data IO thread 1605. Next, at 1840, the data IO thread 1605 retrieves the data message from the cbuf ring 1620, identifies the xApps that need to receive the data message, and then sends each identified xApp the data message. After 1840, the process ends.

FIG. 19 illustrates a process 1900 that the data IO thread 1605 and a DPT 1615 perform in some embodiments to process a data message from an xApp that should be sent to an E2 node. As shown, the process 1900 starts when the data message is received (at 1905) by the datapath Pod through an SCTP connection or shared memory communication with the xApp RIC SDK. This message is in the encapsulated format that is described below by reference to Table 1. This message includes an E2 node identifier that identifies the E2 node that should receive this message.

At 1910, the data IO thread 1605 generates a hash value from the E2 node's ID. It then uses (at 1915) the hash value as an index into a lookup table to identify the DPT that is assigned to processing messages associated with the E2 node. At 1920, the data IO thread passes the received data message to the identified DPT (i.e., the DPT identified at 1915) along the cbuf ring 1620 that is for passing messages from the data IO thread to the identified DPT.

Next, at 1925, the DPT uses its data structure records (e.g., the records maintained by its state machine) to identify the E2 node that should receive the message. In some embodiments, the data message is a subscription request and the identified E2 node is an E2 node to which an xApp wants to subscribe. At 1930, the DPT specifies a data message for the data IO thread 1605 to send to the identified E2 node. This data message is in the E2AP message format required by a standard. The DPT then passes (at 1935) the data message to the data IO thread 1605 along the cbuf ring 1620 that is for passing messages from the DPT 1615 to the data IO thread 1605. Next, at 1940, the data IO thread 1605 retrieves the data message from the cbuf ring 1620, identifies the E2 node that needs to receive the data message, and then sends each identified E2 node the data message. After 1940, the process ends.

In some embodiments, the DPT 1615 might determine that no new subscription message needs to be sent to the E2 node that it identifies at 1925. For instance, before receiving (at 1905) from a first xApp the subscription request for a set of data tuples from an E2 node, the datapath Pod previously sent for a second xApp a subscription request to the same E2 node for the same set of data tuples or for a larger set of data tuples that includes the data tuples requested by the first xApp. In such a case, the DPT 1615 simply adds the first xApp to the subscription list of the E2 node, so that it can provide subsequently received values from the E2 node to the first xApp. In some embodiments, the DPT 1615 also supplies previously received values from the E2 node that are stored in the SDL to the first xApp or directs the xApp to obtain these values from the SDL.

In some cases, the first xApp asks for additional data tuples from the E2 node that the second xApps did not request previously. In such cases, the DPT 1615 would prepare an updated subscription message for the data IO thread to send to the E2 node to request the data tuples that are newly requested by the first xApp. The DPT would also prepare such a message when the second xApp requested additional data tuples from the E2 node after its initial subscription.

In some embodiments, a service Pod 1510 configures the datapath Pod 1600 to instantiate N DPTs when it starts up with N being an integer greater than one. For the datapath Pod 1600 of a near RT RIC, the number N is computed in some embodiments based on the expected number of E2 nodes and xApps that communicate with the E2 nodes through a near RT RIC. The data IO thread 1605 of the datapath Pod 1600 in some embodiments then assigns the E2 nodes to the DPTs based on the order of subscription requests that it receives and the load on the DPTs at the time of these requests.

Figure 20:
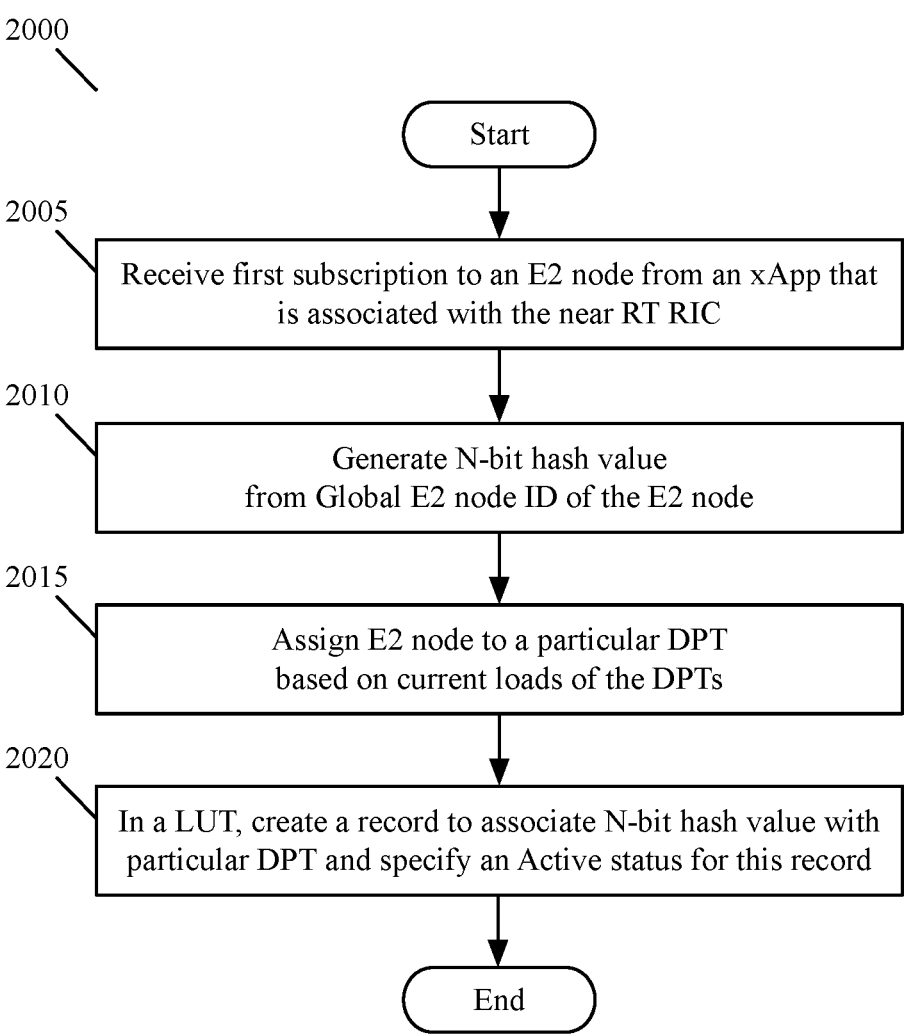
FIG. 20 illustrates an example of a process that the data IO thread uses in some embodiments to assign E2 nodes to DPTs.

FIG. 20 illustrates an example of a process 2000 that the data IO thread 1605 uses in some embodiments to assign E2 nodes to DPTs. As shown, the process 2000 starts when the data IO thread 1605 receives (3005) a first subscription request for a particular E2 node from an xApp that is associated with the near RT RIC of the data IO thread. A first subscription request for a particular E2 node means that no other subscription requests were previously received for this particular E2 node by the data IO thread.

Next, at 2010, the data IO thread 1605 generates an N-bit hash value from the Global E2 node ID of the particular E2 node, where N is an integer (e.g., is 6 or 8). This N-bit value is used to identify the particular E2 node in a hash LUT (lookup table) as further described below. At 2015, the process 2000 selects a particular DPT for the particular E2 node based on the current load on each of the DPTs of the datapath Pod 1600 (e.g., by selecting the DPT with the least amount of load). In some embodiments, the current load is just based on the number of E2 nodes assigned to each DPT, while in other embodiments the current load is based on the number of E2 nodes and the number of xApp subscriptions to these nodes. In still other embodiments, the current load is computed in other ways.

At 2020, the process 2000 then creates a record in a LUT and in this record associates the N-bit hash value with the identifier of the particular DPT selected at 2015 for the particular E2 node. In some embodiments, the N-bit hash value is an index into the LUT that identifies the record that specifies the particular E2 node's ID. At 2020, the process 2000 also specifies the state of this record as Active.

At a subsequent time, if the data IO thread encounters a situation where all xApps have canceled their subscriptions to the particular E2 node, the process 2000 maintains the LUT record created at 2020 but changes the status of this record to Inactive. The data IO thread maintains this Inactive status until the next time that an xApp submits a subscription request for the particular E2 node, at which time the status of this record is changed to Active again. This status value is used as a mechanism to ensure that the data IO thread does not have to continuously revisit the E2 node assignments to the DPTs.

Figure 21:
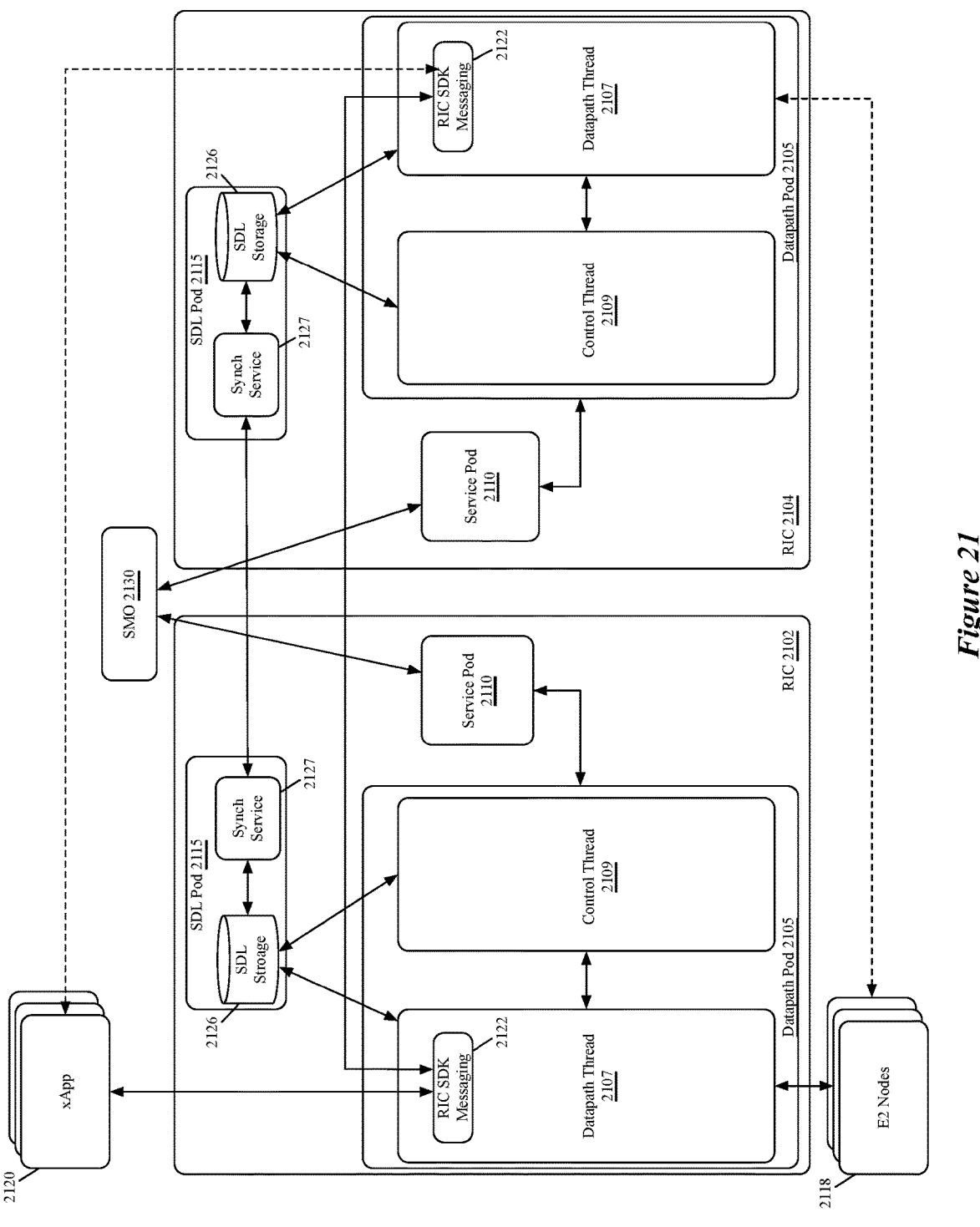
FIG. 21 illustrates a distributed near RT RIC that is implemented by an active RIC and a standby RIC.

FIG. 21 illustrates a distributed near RT RIC that is implemented by an active RIC 2102 and a standby RIC 2104. As shown, the E2 nodes 2118 and xApp Pods 2120 communicate with the active RIC 2102, until one or more components of this RIC fail. When the active RIC fails, the standby RIC 2104 becomes the active RIC, and the E2 nodes and xApp Pods continue their communications through the RIC 2104, which is now the active RIC.

Both of these RICs have the same components, which are a datapath Pod 2105, a service Pod 2110, and an SDL Pod 2115. The datapath Pod is shown to include a control thread 2109 and a datapath thread 2107. Instead of one datapath thread 2107, some embodiments employ one data IO thread and multiple DPTs as mentioned above. In some embodiments, the active RIC 2102 is implemented by a first set of one or more computers, while the standby RIC 2104 is implemented by a different second set of one or more computers.

As shown, each E2 node 2118 has a dual-homed SCTP connection with the datapath threads 2107 of the active and standby RICs 2102 and 2104. Similarly, each xApp Pod 2120 has a dual-homed SCTP connection with the datapath threads 2107 of the active and standby RICs 2102 and 2104. Dual-homing connections is a feature provided by SCTP. When a first component connects to an active/standby pair of components through a dual-home connection, the first component can automatically switch to using the standby component when the active component fails. Thus, using the dual-homed SCTP connections, each E2 node or xApp Pod can switch to the datapath thread 2107 of the standby RIC 2104 when the active RIC 2102 or its datapath Pod fails.

As shown, the RIC SDK interface 2122 of the datapath thread 2107 of the active RIC 2102 forwards messages that it receives from the xApp RIC SDKs, and messages that it sends to the xApp RIC SDKs, to the RIC SDK interface 2122 of the datapath 2107 of the standby RIC 2104. This is done in some embodiments so that the standby RIC's datapath thread 2107 can update its state machine to match the state of the active RIC's datapath thread 2107. Also, as shown, synchronizing agents 2127 of the active and standby RICs 2102 and 2104 synchronize the SDL storage 2126 of the standby RIC 2104 with the SDL storage 2126 of the active RIC 2102. All components of the active and standby RICs 2102 and 2104 are consistently managed by the SMO 2130.

Figure 22:
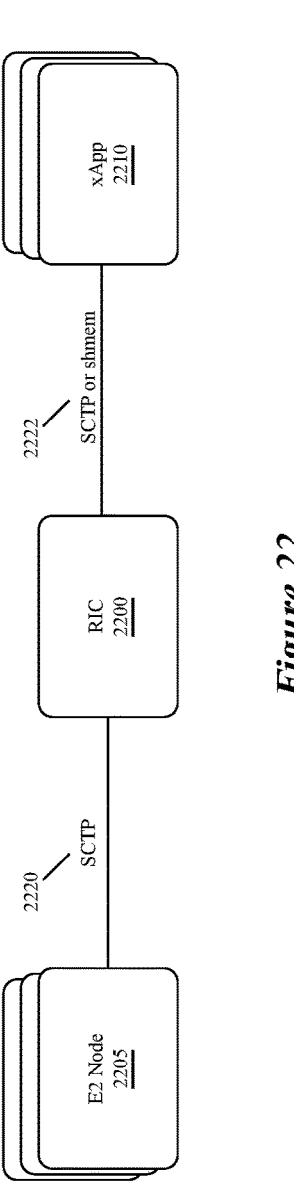
FIG. 22 illustrates the interfaces between a near RT RIC and E2 nodes, and between the near RT RIC and xApp Pods in some embodiments.

FIG. 22 illustrates the interfaces between a near RT RIC 2200 and E2 nodes 2205, and between the near RT RIC 2200 and xApp Pods 2210 in some embodiments. In some embodiments, the near RT RIC is one of the above-described near RT RICs. As mentioned above, and as shown in FIG. 22, the near RT RIC in some embodiments employs SCTP interface 2220 and 2222 with both the E2 nodes 2205 and the xApp Pods 2210. When the xApp Pod and the near RT RIC execute on the same host computer, some embodiments use a shared memory as the interface between the near RT RIC and the xApp Pod, as shown. These interfaces keep the message exchange fast, and minimize encoding and decoding overhead across all paths to minimize latency (e.g., perform one ASN decode and one ASN encode). In some embodiments, the interface 2220 between an E2 node and near RT RIC will follow the E2AP specifications, and all message exchange will conform to E2AP specifications.

Also, in some embodiments, the interface 2222 between the near RT RIC and an xApp Pod uses a novel encapsulating header that will be described below by reference to Table 1. The interface 2222 handles a mix of different types of messages. Examples of such messages in some embodiments include (1) the entire E2AP messages (e.g., E2 Setup Request) from an E2 node, (2) some fields of the E2AP header along with the entire E2SM content (i.e., the entire E2AP message payload), (3) internal messages between the near RT RIC and xApp Pod (e.g., a message from the near encapsulating header along with the ctrl_info field. The payload of the encapsulated packet can include any data. In the example shown in Table 1, the payload includes the original E2AP packet along with its E2SM payload.

All messages between RIC and RIC SDK are encapsulated with the header shown in Table 1. Control information and payload are optional. Some messages may have control information but no payload field, others might have payload without control information and some may have both control and payload fields. In some embodiments, the RIC SDK can be configured to trap these messages and reformat them for presentation to xApps. The format of the message is a raw byte stream. In some embodiments, a message CRC field is not used, while it is used in other embodiments.

TABLE 1

| Type | Length (bytes) | Description |
|---|---|---|
| msg_type | 4 | Message type identifying what type of message is being sent |
| msg_serial_num | 4 | Running serial number identifying a particular message |
| msg_len | 4 | Total message length: includes header, control and payload. Msg Len = 16 (header len) + control len + payload len |
| msg_flags | 2 | Message flags |
| ctrl_len | 2 | Control Info Len |
| ctrl_info | variable len | Control Info - Contents depend on message type |
| payload | variable len | Could include any portion of original data message-any portion of E2AP header or E2SM payload- ASN1 encoded or decoded |

RT RIC that an earlier message of an xApp caused an error), and (4) messages from xApp to near RT RIC or E2 Node. In some embodiments, the E2 content might not be ASN1 encoded (e.g., portion of a subscription request might not be encoded).

In some embodiments, the near RT RIC 2200 can be configured on a case by case basis to decode just the E2AP messages before it sends the message to an xApp, or to decode the entire E2AP header along with its E2SM payload. In some cases, the near RT RIC sends the entire E2AP header while in other cases it only sends a part of this header. In the RIC E2AP message handling of some embodiments, all fields are in network byte order, and the near RT RIC 2200 will work with that order as much as possible. For displaying fields, some embodiments can convert the data to host order. In some embodiments, the near RT RIC 2200 will not look into E2SM payload, while in other embodiments it will (e.g., in order to avoid duplicate subscription errors).

In some embodiments, the RAN function ID is E2 node specific. The xApps will not subscribe to RAN functions across E2 nodes, as every subscription will be to an individual E2 node. Also, in some embodiments, the RIC Request ID space is local to an E2 node. In some embodiments, the RIC Request ID number space is ephemeral component as well as a persistent component. For example, the RIC request IDs used for indication reports will persist while RIC request IDs used from subscription may be reused.

Table 1 below displays an exemplary message format used in some embodiments for the communication between the RIC and RIC SDK. This is the format of an encapsulating header that is used to encapsulate all messages from and to the RIC to and from the RIC SDK. In some embodiments, the encapsulating header stores data needed by the RIC SDK and the RIC for efficient processing of the data message. In the example illustrated in Table 1, the first sixteen bytes associated with the msg_type, msg_serial_num, msg_len, msg_flags, and ctrl_len are part of the The near RT RIC 2200 handles E2 node and xApp connect, disconnect, reset, and crashes as follows. For E2 nodes, the RIC in some embodiments handles a connect, disconnect, and crash similarly. Specifically, when the connection to the E2 node drops and comes back for any of these reasons, the E2 node will send a connection setup all over again as though it started for the first time, and the near RT RIC will clean all its state related to the E2 node and start over. In some embodiments, the near RT RIC informs all xApps when an E2 node connection drops and comes back up whether they had previously subscribed to the particular E2 node or not, as the E2 node might advertise new functionality in which a previously unsubscribed xApp may be interested. When an xApp connects, disconnects, or crashes, the near RT RIC again performs the same operations, in that it resets all the state of the xApp in the near RT RIC and deletes its subscriptions from all E2 nodes.

Figure 23:
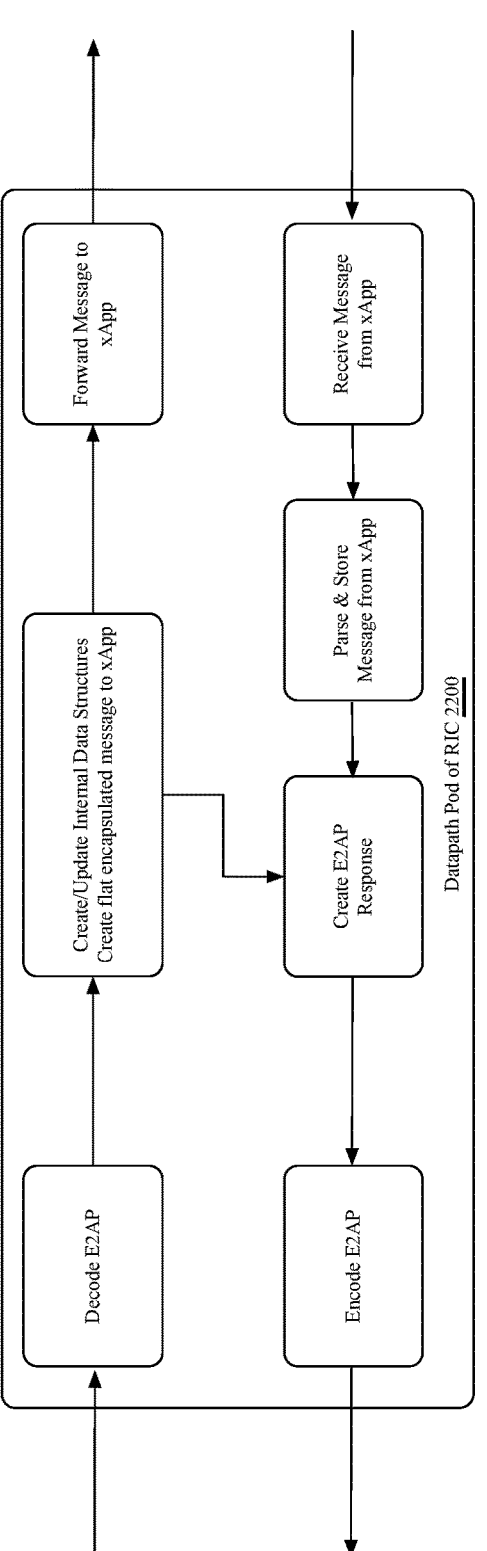
FIG. 23 illustrates the E2AP message handling of the datapath Pod of the near RT RIC.

FIG. 23 illustrates the E2AP message handling of the datapath Pod of the near RT RIC 2200. In the discussion below regarding the E2AP message handling and other message handling, this datapath Pod is simply referred to as the near RT RIC 2200 or the RIC 2200 for purposes of brevity. As shown, the near RT RIC 2200 initially decodes an E2AP message received from an E2 node. In some embodiments, this decoding involves the decoding of only the E2AP header, while in other embodiments, this decoding involves the decoding of the E2AP header and the E2SM payload. For some or all of this decoding (e.g., E2SM), the near RT RIC in some embodiments uses a hardware accelerator (e.g., a GPU accelerator) that it accesses through a bypass path, which is described above.

After decoding the E2AP message, the near RT RIC creates or updates its internal data structures to account for the received data message, and then creates a flat encapsulated message to the xApp in the format described above by reference to Table 1. As the near RT RIC and RIC SDK operate on different containers and reside on different Pods in some embodiments, they do not pass arbitrary data structures to each other but format their data exchange into an encapsulated message with a specific sequence of bytes in some embodiments. After encapsulating the data message, the near RT RIC forwards the data message to the xApp Pod for the RIC SDK on this Pod to forward to the appropriate xApp.

The internal data structure that the near RT RIC creates or updates while processing the E2AP message is used for processing of responsive messages from the xApp to the E2AP message and for processing of subsequent E2AP messages. Examples of data stored in the near RT RIC's internal data structure in some embodiments include (1) a subscription list of xApps that are interested in data from a particular E2 node, (2) particular data tuples that each xApp is interested from each E2 node, (3) records identifying network addresses and other location data relating to E2 nodes and xApps, (4) identifiers that are allocated and assigned (e.g., RIC Request IDs).

When the xApp sends a message, its RIC SDK processes the message and forwards it to the RIC along a shared memory or SCTP interface as described above. The near RT RIC then parses the message and stores the parsed components. Based on these components, and on one or more data tuples that it stored in its internal data structure for the associated E2 node message(s), the RIC creates an E2AP response, and then encodes and forwards this response to the E2 node to which it is directed.

For instance, after a first xApp sends a subscription request to receive M data tuples from an E2 node, the near RT RIC's datapath Pod creates a state to record the first xApp's desired subscription, requests a subscription with the E2 node for the M data tuples, and forwards these M data tuples to the xApp when it initially receives them and each subsequent time that it receives them. In some embodiments, the near RT RIC's datapath Pod can be configured to forward the M data tuples to its associated SDL each time that it receives them from the E2 node.

After the first xApp subscribes to receive the M data tuples from the E2 node, a second xApp can subscribe to receive N different data tuples from the E2 node, where N is larger than M. The near RT RIC then sends an updated subscription request to the E2 node. This update now requests the N data tuples. Each time that the near RT RIC receives the N data tuples, it sends M data tuples to the first xApp and all N data tuples to the second xApp.

Another example involves the near RT RIC removing and caching an RIC request ID from an E2AP message from an E2 node in response to a subscription request. After this ID is removed, the RIC provides a portion of the E2AP message and its E2SM payload (if applicable) to the xApp. Subsequently, when the xApp wants to delete the subscription, the RIC retrieves RIC request ID from its state, and inserts it into its E2AP message to the E2 node to request the deletion of the subscription.

In some embodiments, the near RT RIC's E2 Setup, Response Message, and Failure Message handling is as follows. The near RT RIC initially receives the setup request message from the E2 node. In response, the near RT RIC will decode the message and build internal data structures. The RIC will also cache the raw ASN1 payload. In some embodiments, the near RT RIC accepts all added RAN function identifiers. In some embodiments, the near RT RIC sends the setup message to xApps after decoding the E2AP header but nothing else (i.e., as a message with an ASN1 encoded E2SM payload). In some embodiments, a setup message that the near RT RIC sends to an xApp has a control length (ctrl_len) of 0 with its ASN1 encoded payload.

When an xApp connects later, the near RT RIC will send all setup requests from E2 nodes to the xApp so it has an inventory of connected E2 nodes. In some embodiments, the near RT RIC sends these messages one at a time. Also, as mentioned above, the near RT RIC in some embodiments constructs E2Setup response and send it to the E2 node. In some embodiments, the near RT RIC sends a failure message when a setup request is malformed (e.g., it is a duplicate of the RAN function list, or removes a record not added to a list).

After receiving a reset from E2 node, the near RT RIC performs the following actions after decoding the message. It sends a message regarding this reset to all xApps that have a subscription to this E2 node. In some embodiments, this is an internal message without any ASN1 content. The near RT RIC ends subscription deletion messages to the E2 node for all previous subscriptions that it sent to it. It also sends control, insert and policy deletions to this E2 node. It cleans up any outstanding requests, and sends reset response to the E2 node.

The near RT RIC also employs a Service Update, Acknowledge, and Failure message in some embodiments. This message updates the supported RAN function list, with additions, modifications and deletions. The near RT RIC inform all xApps about the new service configuration of an E2 node. In some embodiments, the near RT RIC sends the message to xApps after application of the configuration so it will reflect the final state of the configuration. In other embodiments, the near RT RIC sends the message as is for xApps to compute the delta between the previous and new state of supported RAN functions. In this latter approach, the near RT RIC does not need to ASN1 encode the resulting delta.

The handling of the E2AP subscription is as follows in some embodiments. An xApp formats the E2SM portion of the subscription and ASN1 encode it. Table 2 below details the control portion of the subscription message (i.e., the portion that is stored in the control field of a message from the xApp to the near RT RIC). The payload will be the ASN1 encoded E2SM content. Multiple subscription message types are defined in some embodiments to disambiguate optional information. Also, in some embodiments, message flags are used to specify the exact format. In some embodiments, each subscription message specifies one E2 node Global ID and one RAN Function ID.

In some embodiments, the E2 node sends an identifier that is 113 bytes and the RIC compresses that to a 40 byte ID. When sending the subscription message to the E2 node, the RIC converts the 40 byte to 113 byte ID. The subscription message control fields will be of fixed formats as far as possible. In some embodiments, the RIC caches all subscription requests and compares requests from multiple xApps in order to avoid sending out duplicate subscription messages. However, when a second subsequent xApp requests additional information from the same E2 node after a first initial xApp requests some information from the E2 node, the RIC resends the subscription (with the same RIC Request ID in some embodiments) but this time asks for the additional information. When sending out the subscription request to the E2 node, the RIC sends out as the E2AP message payload the entire payload received from xApp in some embodiments.

TABLE 2

| Field Name | Field Len |
|---|---|
| E2 Node Global Id | 40 bytes |
| RAN Function Id | 2 bytes |
| RIC Event Trigger Len | 2 bytes |
| RIC Action Admit Cnt | 2 bytes |
| RIC Action Not Admit Cnt | 2 bytes |
| RIC Subsequent Action Cnt | 2 bytes |
| RIC Action Type | 16 bytes - Only RIC Action Cnt Fields are valid |
| RIC Action Definition Length | 32 bytes - 2 bytes per - Only RIC Action Cnt Fields are valid |
| RIC Subsequent Action Type | 16 bytes - Only RIC Subsequent Action Cnt Fields are valid |
| RIC Subsequent Action Time to Wait | 16 bytes - Only RIC Subsequent Action Cnt Fields are valid |
| RIC Action Definition | x bytes each * Action Cnt |
| RIC Event Trigger Definition | x bytes |

The near RT RIC handles an E2AP RIC subscription response by storing the E2 node Global ID and RIC Request TD (generated by RIC) as control information and sending the exact ASN1 encoded message from E2 node back to xApps.

The E2AP RIC subscription delete request, response or failure message are sent from an xApp to the near RT RIC with message fields sent as control information (i.e., as part of the ctrl_info). The near RT RIC creates the encoded ASN1 message and sends it to the E2 node. The deletion request does not specify the E2 Node Global ID. Hence, this information is provided by the RIC for the xApp. The response message is sent as packed bytes (not ASN1 encoded) from near RT RIC to xApp in some embodiments.

An E2 node's E2AP indication report is handled as follows. The message is decoded by near RT RIC to determine the RIC Request ID field. This helps determine which xApp(s) subscribed to the indication. The near RT RIC in some embodiments sends the message as an ASN1 encoded to xApp(s). In some embodiments, the near RT RIC also sends the reduced E2 Global ID as control information along with the message.

The near RT RIC's processing of the E2AP control request is as follows in some embodiments. The xApp sends this request as packed byte information. The near RT RIC does not specify the E2 Global ID in the message, as this information is specified by the xApp. The near RT RIC's formatting of this message is illustrated in Table 3.

TABLE 3

| Field Name | Field Len |
|---|---|
| E2 Node Global Id | 40 bytes - fixed |
| RAN Function Id | 2 bytes - fixed |
| RIC Call Process Id len | 2 bytes |
| RIC Control Header len | 2 bytes |
| RIC Control Message len | 2 bytes |
| RIC Control Ack Request | 1 byte |
| RIC Call Process | byte string |
| RIC Header len | byte string |
| RIC Control Message | byte string |

The near RT RIC handles E2AP control response or failure message is as follows. The near RT RIC decodes the message to obtain the RIC Request ID. It then sends the ASN1 encoded message to xApp prepended with the Global E2 Node ID as control information In some embodiments, the SDL data store is an in memory database that runs in its own set of one or more Pods. It has its own compute and memory resources assigned. As mentioned above, multiple near RT RIC instances define a distributed near RT RIC. In some embodiments, each near RT RIC instance has its own instance of an SDL, which stores system wide information for the RIC instance. Examples of such information include a list of connected E2 nodes (i.e., base station nodes), xApps, subscriptions from each xApp and critical cell data returned by E2 nodes. Further, each SDL instance in some embodiments provides services to preprocess incoming data by running custom algorithms internally as the data arrives and by interfacing to hardware accelerators (e.g., GPUs), or post-process data retrieved from its storage.

The data IO Pod and xApp Pods of the RIC instance are connected to the SDL Pod of the RIC instance. In some embodiments, each SDL instance just operates with the data IO Pod and service Pod of its own RIC instance. Also, in some embodiments, the SDL Pod is managed by the SMO and configured via the service Pod. The dataflows to and from the SDL include (1) data IO to SDL data store, (2) xApps from SDL data store, (3) xApps to SDL data store, (4) data IO from SDL data access (e.g., retrieval of E2 node info, subscription info, etc.), and (5) service Pod to and from SDL communication to provide and retrieve configuration information.

Examples of SDL transaction in some embodiments include (1) data IO Pod (control or data IO thread) writing data to SDL, which is then read by an xApp, (2) an xApp reading data from another xApp that is written to the SDL, or the xApp writing data to the SDL for another xApp, (3) xApp writing to SDL so that a service container (e.g., a post processor) operating in the SDL Pod performs an operation (e.g., by using the GPU services or just using the general CPU) on the written data before the same xApp or another xApp retrieves the result of this operation from the SDL, (4) the non-RT RIC reading data from and writing data to the SDL as part of an A1 subscription, (5) SMO storing O1 configuration data in the SDL, and (6) non-RT RIC storing ML data in the SDL.

The ORAN guidelines followed by embodiments described below include ORAN Alliance WG10 OAM Architecture, which defines Configuration Provisioning for O1 interface with Netconf (Network Configuration Protocol) and Yang between an SMO (Service, Management, Orchestration) framework and a Managed Element (ME) for dynamic interactions. As per rev 5.0.0, a reference to communication and procedures is mentioned in RFC 6241. The following mechanisms are used: for transport layer, SSH/TLS; for encoding, XML; and for data modeling, Yang. It should be noted that while SSH is mandatory, TLC/HTTP, etc., are also allowed. Additionally, while many of the embodiments described below refer to a RAN or RAN system, these embodiments are applicable to O-RAN systems.

Netconf is a network management protocol defined by the IETF for installing, manipulating, and deleting configurations of network devices (e.g., RAN components). In some of the embodiments described herein, Netconf is referred to as a protocol defined by a telephony-based standards body, and the formats used are referred to as formats of telephony-based standards body communications. Netconf operations occur at the RPC (Remote Procedure Call) layer. Netconf uses XML-encoding and provides a basic set of operations to edit and query configurations on a network device. Netconf is commonly used for network automation. Features of Netconf include a distinction between configuration and state data, multiple configuration datastores, error checking and recovery, configuration change validations and transactions, selective data retrieval with filtering, event notification streaming and playback, and an extensible remote procedure call mechanism.

The multiple configuration datastores for Netconf include a running datastore that is a mandatory active datastore to hold current configurations of a device, a candidate datastore that can be manipulated without impacting a device's current configuration and that can be committed to the running datastore, and a startup datastore that is loaded at startup and copied to the running datastore at boot. Base capabilities of Netconf include operations such as <get> for fetching a running configuration and state information, <get-config> for fetching all or part of a specified configuration datastore, <edit-config> for loading all or part of a configuration to the specified configuration datastore, <copy-config> for replacing the whole configuration datastore with another configuration datastore, <delete-config> for deleting a configuration datastore, <discard-changes> for clearing all changes from the candidate datastore <candidate/> and making it match the running configuration datastore <running/>, <create-subscription> for creating a Netconf notification subscription, <commit> for copying a candidate datastore to the running datastore, <cancel-commit> for cancelling an ongoing confirmed commit, <lock> and <unlock> for locking the entire configuration datastore system so one session can write and unlocking the entire configuration datastore system so any session can write, <close-session> for gracefully terminating a Netconf session, and <kill-session> for forcefully terminating a Netconf session.

Yang is a protocol-independent data modeling language that is used to model configuration and state data manipulated by the Netconf. Yang models the hierarchical organization of data as a tree in which each node has a name and either a value or a set of child nodes. It structures data models into modules and submodules. Because Yang is protocol independent, it can be converted into any encoding format (e.g., XML or JSON). The Yang tree structure includes a module name and one or more containers. Each container within the Yang tree structure includes a list that includes a key and one or more leaves, with each leaf including a data type.

Netconf and Yang both have associated libraries. Libyang is a Yang parser that is implemented and provided as a library with API in C language, while libnetconf is a generic Netconf library in C language that is intended for building Netconf clients and servers. Sysrepo is a library that acts as a standalone datastore for storing configuration data. Netopeer2 uses each of these three libraries (i.e., libyang, libnetconf, and sysrepo) to expose command-line server and client executables.

Figure 24:
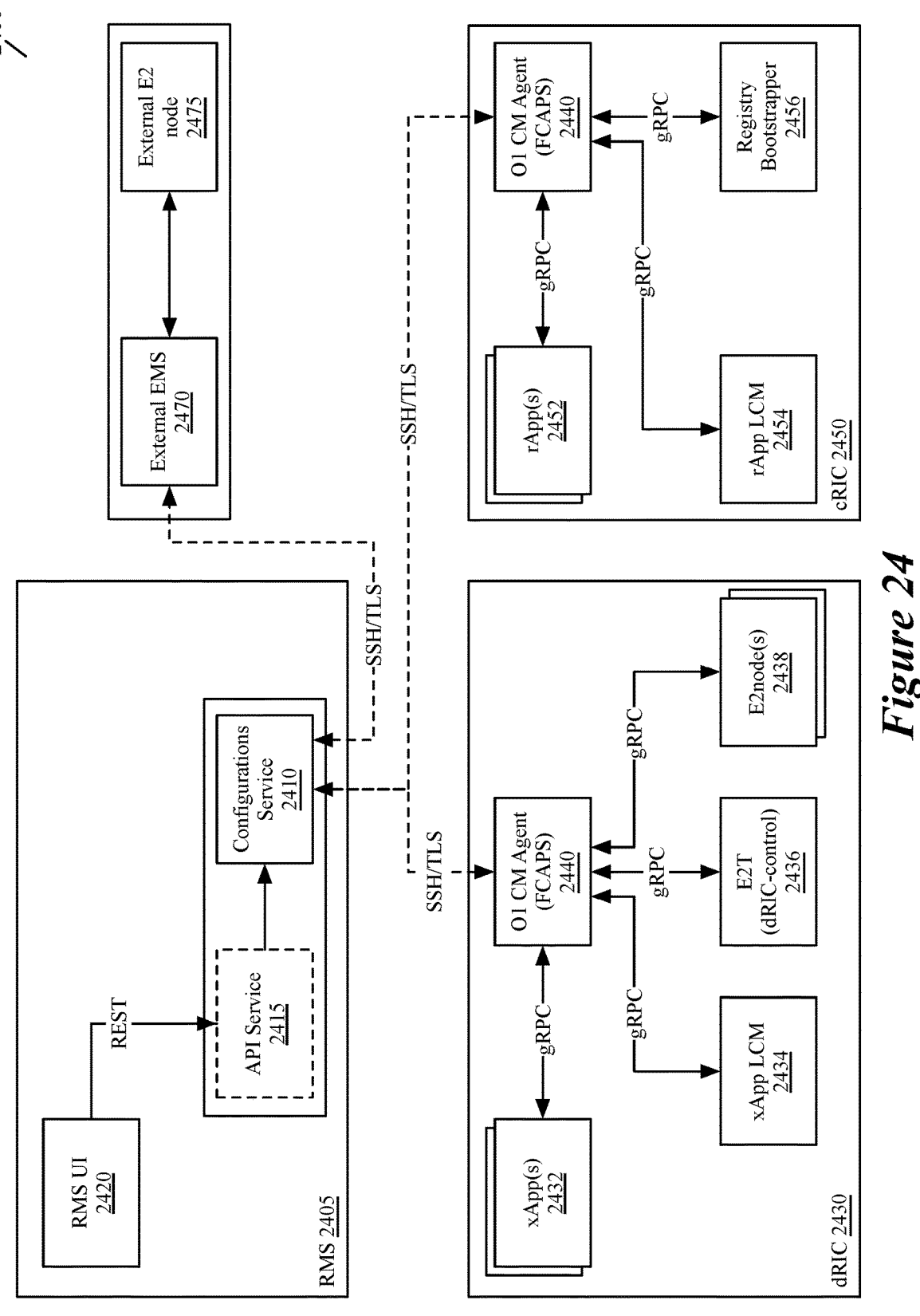
FIG. 24 conceptually illustrates a simplified top-level diagram of a RAN system of some embodiments that includes an RMS configurations service (i.e., Netconf client) and O1 CM agents (i.e., Netconf Servers) as the main components in Netconf-based communication.

FIG. 24 conceptually illustrates a simplified top-level diagram of a RAN system 2400 of some embodiments that includes an RMS configurations service 2410 (i.e., Netconf client) and O1 CM agents 2440 (i.e., Netconf Servers) as the main components in Netconf-based communication. The RMS configurations service 2410 is part of the RMS 2405, which also includes an API service 2415 and a UI 2420. An O1 CM agent 2440 is deployed to each of the dRIC 2430 and cRIC 2450, as shown. In addition to the O1 CM agent 2440, dRIC 2430 also includes one or more xApps 2432, an xApp LCM 2434, an E2 termination interface 2436, and one or more E2 nodes 2438, while the cRIC 2450 includes one or more rApps 2452, an rApp LCM 2454, and a registry bootstrapper 2456. In some embodiments, each RIC instance is deployed as one physical computer (i.e., one single box), or as multiple computers that execute the various modules that form the RIC. The xApp LCM 2434, in some embodiments, is an LCM pod or an LCM VM (virtual machine).

In some embodiments, the RAN system 2400 also includes external E2 nodes 2475 that are deployed by third-party vendors and are managed by an external EMS (element management system) 2470 that communicates with the configurations service 2410 of the RMS 2405. In some embodiments, the RICs (i.e., dRIC 2430 and cRIC 2450) are implemented in a set of one or more cloud datacenters. These cloud datacenters, in some embodiments, include one or more public cloud datacenters, or a combination of public and private cloud datacenters.

The RMS 2405, in some embodiments, is a RIC management system that uses the UI 2420 and the configurations service 2410 for configuration management and state storage for all of the O1 CM agents 2440. More specifically, the RMS 2405 uses the UI 2420 for configuration management to show the current state of configuration of a RIC component (e.g., the E2 termination interface (dric-control) 2436, E2 nodes 2438, xApps 2432, rApps 2452, etc.), in some embodiments, as well as to expose write/delete/modify operation procedures for operators to change configurations during runtime, according to some embodiments. The UI 2420 of some embodiments leverages REST APIs exposed by the API service 2415. In some embodiments, the UI 2420 also includes functionalities other than those specified.

In some embodiments, the RMS 2405 uses the configurations service 2410 for exposing REST APIs for northbound communication with API service 2415. The configurations service 2410 acts as a Netconf termination client for southbound communication, while the O1 CM agent 2440 acts as a Netconf server, in some embodiments. The configurations service 2410 configures the dRIC 2430 through a connection with the O1 CM agent 2440, in some embodiments. If a Netconf session has not yet been established, in some embodiments, the configurations service 2410 connects with the O1 CM agent 2440 using SSH/TLS transport. After a successful connection, a secured Netconf session is established between the configurations service 2410 and the O1 CM agent 2440, in some embodiments. The configurations service 2410 of some embodiments then locks the target datastore (e.g., a running/candidate datastore) (not shown) located at the dRIC 2430 to prevent other Netconf clients from operating on the datastore.

In order to configure the dRIC 2430, the configurations service 2410 reads configurations of the running datastore (not shown) of the dRIC 2430. In some embodiments, the configurations service 2410 reads the configurations using a Read Managed Object Instance (MOI) procedure to get the latest updates. If the changes are made in a candidate datastore using Write MOI or Delect MOI, the configurations service 2410 of some embodiments commits the changes to the running datastore (not shown) to make the changes effective. If the configurations service 2410 has subscribed to configuration manager notifications, an HTTPS CM notification is sent, and the O1 CM agent 2440 processes the configurations, in some embodiments. Multiple provisioning procedures are executed in sequence, in some embodiments, one at a time, under the same lock session. After performing all of the provisioning procedures, the configurations service 2410 unlocks the datastore (not shown) and terminates the Netconf session.

In some embodiments, ORAN specifies the provisioning workflow for the dRIC, and a similar workflow is assumed for the cRIC. This automated provisioning process, in some such embodiments, is triggered following the completion of a registration process. As such, the configurations service 2410 in some such embodiments is already aware of the topology of the cRIC and dRIC clusters, as well as the IP address and port to establish a Netconf connection with the O1 CM agent 2440 at each RIC instance. The O1 CM agent 2440, in some embodiments, is an FCAPS pods, as shown. In some embodiments, the configurations service 2410 is also aware of any RIC components (e.g., xApps 2432, rApps 2452, LCM 2434 and 2454, E2T 2436, etc.). In other embodiments, a UI to RMS configurations service interaction is implemented. The RMS configurations service 2410 can be implemented using a command-line interface, in some embodiments. This framework, in some embodiments, works with components that have been onboarded by the RMS configurations service provider, while other components are managed by a vendor's respective element management system (EMS) 2470.

In some embodiments, the UI 2420 of the RMS 2405 uses configurations service 2410 as a proxy layer to fetch configurations from the O1 CM agent 2440 data store (not shown), and/or to express write intent to it. A database/cache layer (not shown) is added near the configurations service 2410 in some embodiments to store recent configurations. In some embodiments, adding such a database/cache layer helps to avoid network calls to the O1 CM agent 2440 every time a configuration page is loaded on the UI 2420.

Also, in some embodiments, the O1 CM agent 2440 has two different connection mechanisms. As the first mechanism, the O1 CM agent 2440 acts as a Netconf server to terminate all the incoming requests from the RMS configuration backend, in some embodiments. After a basic authentication check, in some embodiments, the O1 CM agent 2440 then validates the incoming configurations against a Yang model. If the validation fails the entire configuration block is discarded and Netconf error code is relayed back to the sender, in some such embodiments, while a successful validation will generate a structured Yang tree for further processing and make an entry in the running datastore.

As the second mechanism, in some embodiments, all of the RIC (i.e., cRIC and/or dRIC) components that desire run-time configurations updates connect with the O1 CM agent 2440 over a gRPC connection using a service discovery model (e.g., Kubernetes service discovery model) and static defined port, according to some embodiments. It should be noted that as per ORAN, a near-real-time platform (e.g., dRIC) is considered a managed element. This functionality is implemented in some embodiments using the O1 CM agent 2440, which is a dedicated pod decoupled from the main E2 termination interface (dric-control) 2436 pod. The E2 termination interface 2436 acts as an intelligent proxy and adapter for managing interactions between components of the RAN system 2400 and e2 nodes (not shown), according to some embodiments.

In some embodiments, xApps are not considered managed elements, while in other embodiments, xApps are considered managed elements. To pass configurations internally, some embodiments use gRPC as the internal transport mechanism. In some embodiments, gRPC is more efficient in terms of resource utilization, faster, and simpler than other internal transport mechanisms. Also, in some embodiments, other internal transport mechanisms require opening other ports that pose security risks, and as such, gRPC is a safer internal transport mechanism, in some embodiments.

The structured Yang tree generated following the successful validation of the configuration is then decoded to find whether the configurations apply to a set of RIC components (i.e., broadcast) or just one RIC component (i.e., unicast), in some embodiments. This intent (i.e., whether the configurations apply to a set of RIC components or a single RIC component) is designed during the Yang model creation phase, according to some embodiments. Examples of a first type of configurations applied to a group of RIC components, in some embodiments, include changing the log level, log mode, debug mode, etc. Examples of a second type of configurations applied to one RIC component, in some embodiments, include changing component-level parameters, such as provisioning an E2 node, etc.

In some embodiments, a central collector is required to enable the first type approach. This central controller performs a sequence over gRPC, in some embodiments. As a first step of the sequence, in some embodiments, the central controller checks with the connected RIC components to determine whether they are willing and ready to accept new configurations. Then, if all the underlying components give a positive ACK (i.e., based on the connectivity, readiness to accept the configs), the central controller disseminates the configurations to the components, in some embodiments. If any component returns a negative ACK, the central controller of some embodiments rolls back the committed changes to the running datastore and returns a Netconf error back to the configurations service in the same Netconf session. This mechanism is called a two stage commit, in some embodiments.

Some embodiments have two approaches to implement gRPC servers and gRPC clients. In the first approach, in some embodiments, the RIC components act as a gRPC server, and the O1 CM agent acts as gRPC client. As soon as the RIC components and the O1 CM agent are bootstrapped, a channel is established between them, in some embodiments. The O1 CM agent, in some embodiments, needs to know the service endpoints of all the deployed RIC components, and needs to keep a track of added and/or removed RIC components in runtime. In some embodiments, this information is conveyed from the RMS configurations service when the user (e.g., operator) wants to provision one or more components. As such, the O1 CM agent 2440 does a bookkeeping operation of maintaining the connection endpoints and dissemination of configurations, in some embodiments.

The RIC components of some embodiments act as a gRPC server, while the O1 CM agent 2440 acts as gRPC client. In some embodiments, the RIC components need to know the service endpoint of the O1 CM agent 2440, which is easier to manage. A server push mechanism, where a client can establish a connection with the server, can be implemented in some embodiments. The server, in some embodiments, maintains a subscriber list that includes a list of connected clients. Whenever the server has any events for a particular client, it will stream the response, in some embodiments. Both approaches, in some embodiments, require validation when the system is scaled (i.e., scaled in reference to multiple xApps/E2 nodes provisioning).

In some embodiments, some vendors can bring their own CU/DU (E2 node) 2475 whose configurations are managed by their own Element Management System (EMS) 2470. The RMS Configuration Backend 2410 can connect with this EMS 2470 using standard Netconf procedure. To accomplish this, in some embodiments, the EMS 2470 acts as a Netconf Server and relays information to the external E2 node 2475. In some such embodiments, the vendor then provisions the E2 node 2475 using the RMS UI 2420 according to the workflow described above, and assuming both that RMS 2405 knows how to connect with the EMS 2470, and that the connection and message exchange complies with Netconf procedures (i.e., as described in WG10).

The O1 CM agent 2440 stores currently applied configurations for the entire RIC in the running datastore (not shown). If the O1 CM agent 2440 restarts, the configurations are lost, in some embodiments. As such, persistence is enabled in some embodiments. In some embodiments, there are two approaches to make sure RIC components have correct configurations. For the first approach, in some embodiments, if any connected RIC component restarts, the O1 CM agent 2440 sees that one of the subscription clients went inactive, and then relays the configurations for that RIC component whenever the client comes back again. In some embodiments, the O1 CM agent 2440 will only be allowed to push the configurations. For the second approach, if any connected RIC component restarts, the component will make a GET call to the O1 CM agent 2440 to obtain the desired configurations from the running datastore, according to some embodiments.

With respect to upgrades, the O1 CM agent 2440 of some embodiments needs to be updated first, prior to any RIC component being updated. The upgrade of the O1 CM agent 2440 needs to account for some downtime, in some embodiments. The O1 CM agent 2440 is upgraded, in some embodiments, with the new version of Yang modules, as well as a protobuf file. Protobuf (Protocol Buffers) is a data format that is open-source and cross-platform and is used to serialize structured data. As such, protobuf is useful for communications between processes (e.g., FCAPs processes, application processes, etc.) for storing data and for communications over the network (e.g., RAN, O-RAN, etc.). Protobuf works by utilizing both an interface description language that describes the data structure and a program that generates source code from that description. The source code is then used for generating or parsing a stream of bytes that represents the structured data. After the upgrade, in some embodiments, all the northbound and southbound communications are reinitiated. In some such embodiments, a version field is added in both Yang modules, as well as the protobuf file.

The process for upgrading RIC components is a two-fold process, in some embodiments. First, the new version of RIC is onboarded in some embodiments in a blue-green deployment model. In some embodiments, this is handled by a third party (e.g., Kubernetes). Second, registration is reinitiated with RMS service, and then the RMS backend pushes/updates new configurations into the O1 CM agent. It is then written to the RIC component. At boot time, each RIC component will follow the Restart Procedure described above.

In some embodiments, conflict management is required such as for overwriting static configuration files. For instance, consider a RIC component that was onboarded with a static file that contains log level set to INFO, and the dynamic provisioning changes the log level to DEBUG. After running for a few cycles, the RIC component crashes and then comes back. The RIC component of some such embodiments can use the log level from the static file since this is a part of the startup process, in some embodiments. In some embodiments, there are two approaches that help to get back the dynamically provisioned changes. In the first approach, in some embodiments, every time an update for log level comes from the O1 CM agent, the static configuration file is modified and saved. Accordingly, a GET network call to the O1 CM agent is avoided.

In order to model configuration and state data manipulated by the Netconf, some embodiments use a data modeling language. For instance, in some embodiments, the modeling language Yang is used for modeling configuration and state data manipulated by the Netconf. Yang model can be defined to either configure a group of RIC components or just one RIC component, and also allows high flexibility to define the actions to be performed on a given set of ME, according to some embodiments. For example, log level, timers, etc. affecting a set of components at RIC can be modeled into one single Yang file. Additionally, a RIC-specific provisioning feature can be modeled into a provisioning Yang file.

In some embodiments, gRPC interface is realized using protobuf. There is no one-to-one relation with Yang and protobuf file, according to some embodiments. In some embodiments, it depends on the implementation of the O1 CM agent. Versioning of both Yang and Protobuf is very crucial for compatibility, in some embodiments. If Yang and Protobuf go out of sync, in some embodiments, certain key operational configurations cannot be configured in run time.

Vendors, in some embodiments, are allowed to create their Yang models for specific use cases, such as for vendor xApp configuration. A programmable CM agent, in some embodiments, enables a vendor to write Yang data parsing logic as well as message transmission to the vendor xApp. The vendor, in some such embodiments, can bring their own protobuf and enable the xApp SDK to act on the commands sent by the CM agent.

Figure 25:
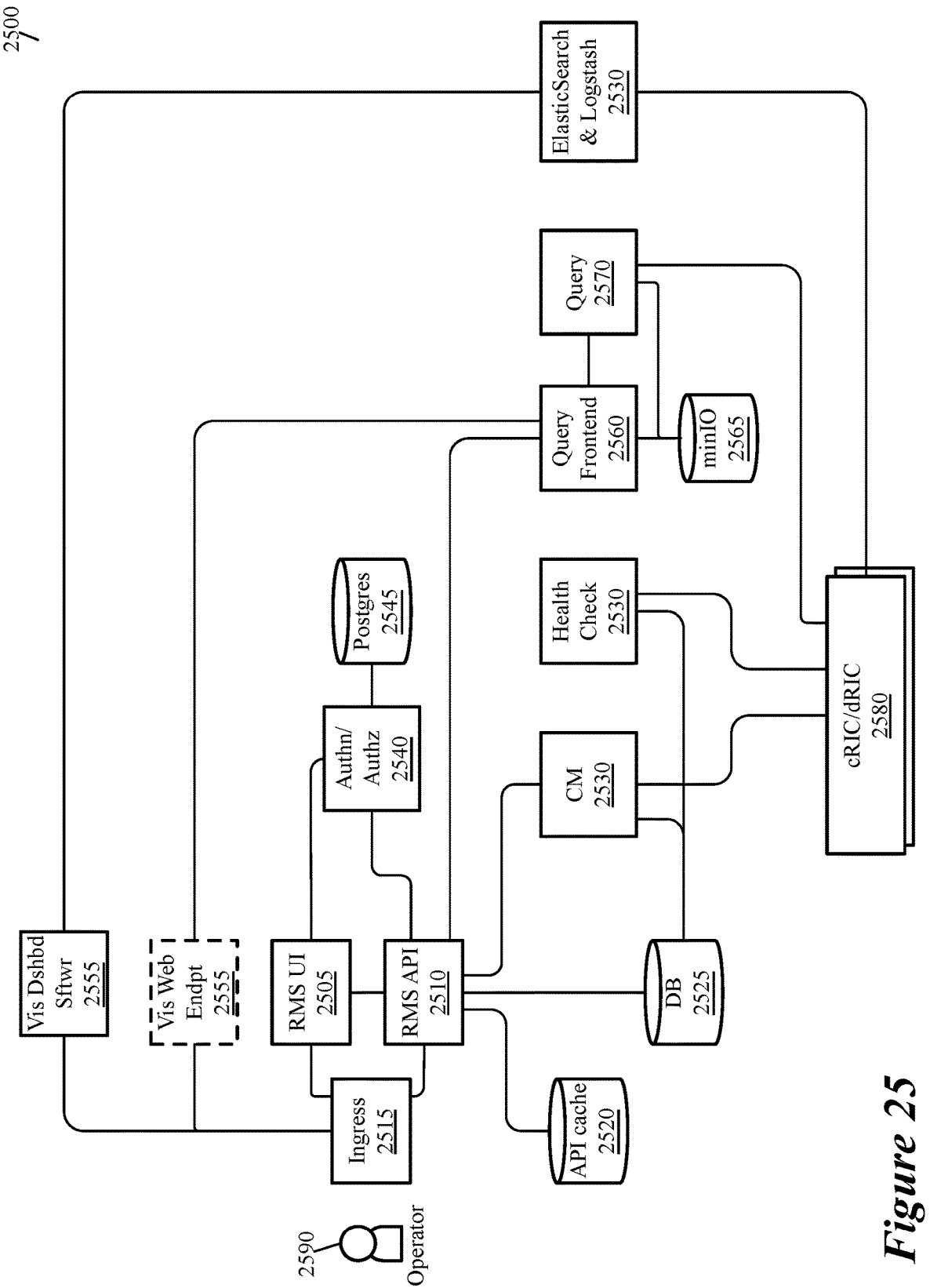
FIG. 25 conceptually illustrates a system diagram of the technical architecture of an RMS of some embodiments.

FIG. 25 conceptually illustrates a system diagram 2500 of the technical architecture of an RMS of some embodiments. As shown, the system diagram 2500 includes an ingress controller 2515, an RMS UI 2505, an RMS API server 2510, an API cache 2520, a database 2525, a configuration management service 2530, a health check service 2535, an authentication/authorization service 2540 that works with Postgres 2545, data visualization dashboard software (e.g., Kibana) 2550, an analytics and interactive visualization web application endpoint (e.g., Grafana) 2555, a metric collection and caching frontend service (e.g., a Thanos Query Frontend) 2560, a storage system 2565 (e.g., a minIO storage system), a metric collection query service (e.g., a Thanos Query) 2570, elasticsearch and logstash 2575, and a set of one or more cRICs/dRICs 2580.

An operator/user's 2590 access to the RMS UI 2505 and RMS API 2510 is terminated by the ingress controller 2515. In some embodiments, Istio is used for the ingress controller 2515 for managing ingress traffic flows between services. Istio, in some embodiments, exposes every endpoint (RMS UI 2505, RMS API 2510, Grafana 2555) using a unique host name (e.g., vmware-rms-dashboard.example.domain.com). Also, in some embodiments, HTTPS support is enabled by Istio. In some embodiments, Istio routes all traffic to corresponding services within the cluster. In other embodiments, additional services are provided by Istio, such as access policy enforcement, and telemetry data aggregation.

The RMS UI 2505 is a dashboard/web console for operators 2590 to visualize, operate, and manage multiple instances of RIC platforms. The RMS API server 2510 provides REST API access to the RMS backend. Operators 2590 can use RMS UI 2505 and/or RMS API 2510 to manage the RIC platforms. In some embodiments, the RMS API 2510 is implemented in Golang, leveraging common libraries from Go-based API in Uhana and R1 interface (not shown) in a cRIC 2580. The APIs, in some embodiments, follow OpenAPI specification. Similar to R1 APIs, Project Eve tools are leveraged for RMS API in some embodiments to generate API documentation from OpenAPI specifications. In some embodiments, the RMS UI 2505 interacts only with the RMS API 2510 and Keycloak 2540.

Because data is collected from multiple instances of RIC 2580 in the RMS, the API cache 2520 is an essential component for better performance of the RMS API 2510 and RMS UI 2505, in some embodiments. In some embodiments, the API caching developed in Uhana, which is built on top of Redis cluster, is leveraged.

In some embodiments, Thanos (e.g., Thanos query frontend 2560 and Thanos query 2570) is used for collecting metrics and events. Thanos works with multiple storage backends from public cloud such as Google Cloud Storage, AWS S3, Ceph, Swift etc., according to some embodiments. Thanos also supports minIO, in some embodiments, which is S3 compatible. In order for RMS to be portable across different cloud providers, in some embodiments, a storage system that works on all of the environments, such as minIO, is ideal.

Prometheus has its own time series database, in some embodiments, for storing all of the metrics and alerts. In some embodiments, all of the metrics and alerts from RIC instances are stored in Prometheus. A subset of this data can be collected and stored at Thanos/minIO 2565, in some embodiments. In some embodiments, elasticsearch 2575 is the database that is used for log analysis. Elasticsearch is already a part of the ELK stack, according to some embodiments. TCX supports elasticsearch, Prometheus, and minIO. The authentication and authorization service 2540 is Keycloak, in some embodiments. Keycloak works with Postgres 2545, which is also supported by TCX.

The main purpose of RMS, in some embodiments, is to provide a management plane that provides observability and configuration of multiple RIC instances and applications. The topology information, in some embodiments, includes relationships between cRIC, dRICs, xApps, rApps and cells. A cRIC can be associated with multiple dRIC instances using A1 interfaces, in some embodiments. cRIC and dRIC, in some embodiments, is used to observe and/or control multiple cells. In some embodiments, a set of xApps can be managed by a dRIC instance and a set of rApps can be managed by a cRIC instance.

In some embodiments, xApps and rApps can observe and/or control a subset of cells via the RIC platform. Each of the cells in the subset can be well described using a graph on a nationwide network, in some embodiments. As such, some embodiments use a graph database 2525. The graph database 2525, in some embodiments, is an ArangoDB, which assists in representing the topology without much overhead using a traditional relational database. TCX supports ArangoDB.

Configuration data for dRIC, cRIC, xApps, and rApps are documents, in some embodiment. A multi-model database 2525 (e.g., ArangoDB) is used to store documents, in some embodiments, such as the configuration data for dRIC, cRIC, xApps, and rApps when said configuration data is in document form. Additionally, in some embodiments, the multi-model database 2525 (e.g., ArangoDB) supports subscriptions to nodes and documents, which allows for changes in documents to be detected during CRUD operations, and for developing an intent-based configuration management system.

In some embodiments, the RMS backend together with the RMS UI use Keycloak for authentication and authorization. In some embodiments, Keycloak is used to provide local authentication. Also, in some embodiments, Keycloak is used to integrate with external authentication systems using identify protocols such as SAML/OpenID connect.

The health check service 2535 is responsible for registering cRIC, dRIC, xApps, and rApps, as well as monitoring health of these instances. The registration process, in some embodiments, is manual for cRIC and dRIC (i.e., the operator 2590 uses the RMS UI 2505 or RMS API 2510 to register after onboarding the RICs). In some embodiments, a RIC app LCM controller handles automatic registration for xApps and rApps.

The configuration management service 2530 is responsible for handling configuration of RIC instances and their applications. In some embodiments, the configuration management service will implement a Netconf client to interact with Netconf servers running on every instance of RIC 2580.

In some embodiments, metric collection and alert management services are provided by Thanos. Thanos is a CNCF (sandbox) incubated service which handles metrics collection and alert management from multiple instances of Prometheus. In some embodiments, every RIC instance 2580 will have a Prometheus running with Thanos sidecar. Each RIC instance, in some embodiments, will stream metrics to Thanos in the RMS backend, which can then expose to either Grafana (e.g., for internal purposes) or the RMS UI 2505 via the RMS API 2510. In some embodiments, this is used as a temporary solution for collecting PM data from the RICs, and O1 interfaces are utilized as long-term solution. A reverse proxy (e.g., https://thanos.io/tip/operating/reverse-proxy.md/) is used in front of Thanos, in some embodiments, to enable HTTPs and authentication.

RMS architecture designs other than the architecture diagram 2500 are implemented, in some embodiments. For example, in some embodiments, every instance of RIC includes an API service that directly interacts with the RMS UI (i.e., rather than the RMS API). In some such embodiments, additional configuration and state management in the UI is needed, which leads to a more complex UI. Additionally, for every user, API calls will be made repeatedly to RIC instance, in some such embodiments. With caching in the RMS backend, the complexity of the UI can be reduced and the UI's performance can be improved, according to some embodiments.

In some embodiments, configuration and topology are handled by Cassandra (i.e., rather than ArangoDB). Cassandra includes a long list of features, including time-series data and horizontal scaling. As Thanos and Prometheus handle time-series information about metrics and alerts using minIO and Prometheus time series database, in some embodiments, using Cassandra in the backend might be redundant. Additionally, there is no other information in the RMS backend that requires a time series database, and representing and updating topology information would require multiple joins in the application layer, which could be inefficient with Cassandra. The RMS backend itself can be lifecycle managed using Telco Cloud Automation (TCA) and/or TCX admin operator, according to some embodiments. In some embodiments, Cassandra schema migration is leveraged from Uhana.

The RMS of some embodiments is able to scale to handle multiple cRIC/dRIC instances, as well as to handle the load (i.e., streaming PM data from various instances). In some embodiments, the CM, PM (e.g., Thanos), and health check services are implemented to scale horizontally. Persistent connections are used, in some embodiments, so that traffic from an instance of RIC always goes to a specific replica of a pod in the RMS.

In some embodiments, because RMS is a centralized system, any downtime impacts management of several RIC instances. Every service in RMS will be deployed, in some embodiments, with high availability (HA) enabled (i.e., deployed with two or more replicas). The load is spread across multiple Kubernetes nodes, in some embodiments, which recommend to deploy with anti-affinity rules.

All North-South access is secured using TLS, in some embodiments. Internal service-to-service communication does not have TLS, in some embodiments. Customer certificates can be used, in some embodiments, and if these certificates are not provided, some embodiments autogenerate self-signed certificates that are used to secure the communication.

Some embodiments provide a feature that provides a mechanism to update xApp/SDK parameter values during run time using the dynamic configuration mechanism described above. These parameters can be common or unique for each xApp, in some embodiments. In some embodiments, the parameters can be clearly defined names or generic key-value pairs. Also, in some embodiments, the parameters are encapsulated in Yang/JSON schema, as will be described further below, and eventually the values are updated during runtime. The provided feature, in some embodiments, enhances customer experience from the RMS UI, keeps an interface open to be exposed to any SMO, provides a scalable and future-proof way for configuration, and minimizes or removes complex operator involvement to modify RIC parameters from the RMS UI.

Since ORAN WG-10 specifies Netconf-Yang as a heart of communication for Configuration Management, the RIC platform and SMO (e.g., RMS) adhere to the same protocol, in some embodiments, which is beneficial in some embodiments when exposing the Yang schemas to various SMOs.

In some embodiments, the configuration payload from the RMS UI is easy to operate and well-defined such that RMS APIs, as well as a bulk update feature, have the same data schema backing. The SDK APIs of some embodiments are also easy to use from the perspectives of xApp developers. The configuration management service of some embodiments reduces the number of data models/payloads used in RMS and RICs for development and debugging. In some embodiments, to do so, the configuration management service keeps Yang schema as a standard entity. Also, in some embodiments, the configuration management service uses a single type of configuration payload (e.g., JSON rather than XML) from RMS, and stores configurations in the JSON format in the database.

JSON schema is chosen for the RMS UI and RMS backend, in some embodiments, because JSON is a defacto model used for any REST application since the RMS UI operates on REST-based APIS, and because the JSON schema is a simple model to understand and operate for users irrespective of the user's RAN domain knowledge. The configuration input to the dRIC instance side, in some embodiments, is XML as per the standards. From FCAPS to RIC components, in some embodiments, keeping in mind the network API model on the xApp side, protobuf with well-defined structures are very important.

Figure 26:
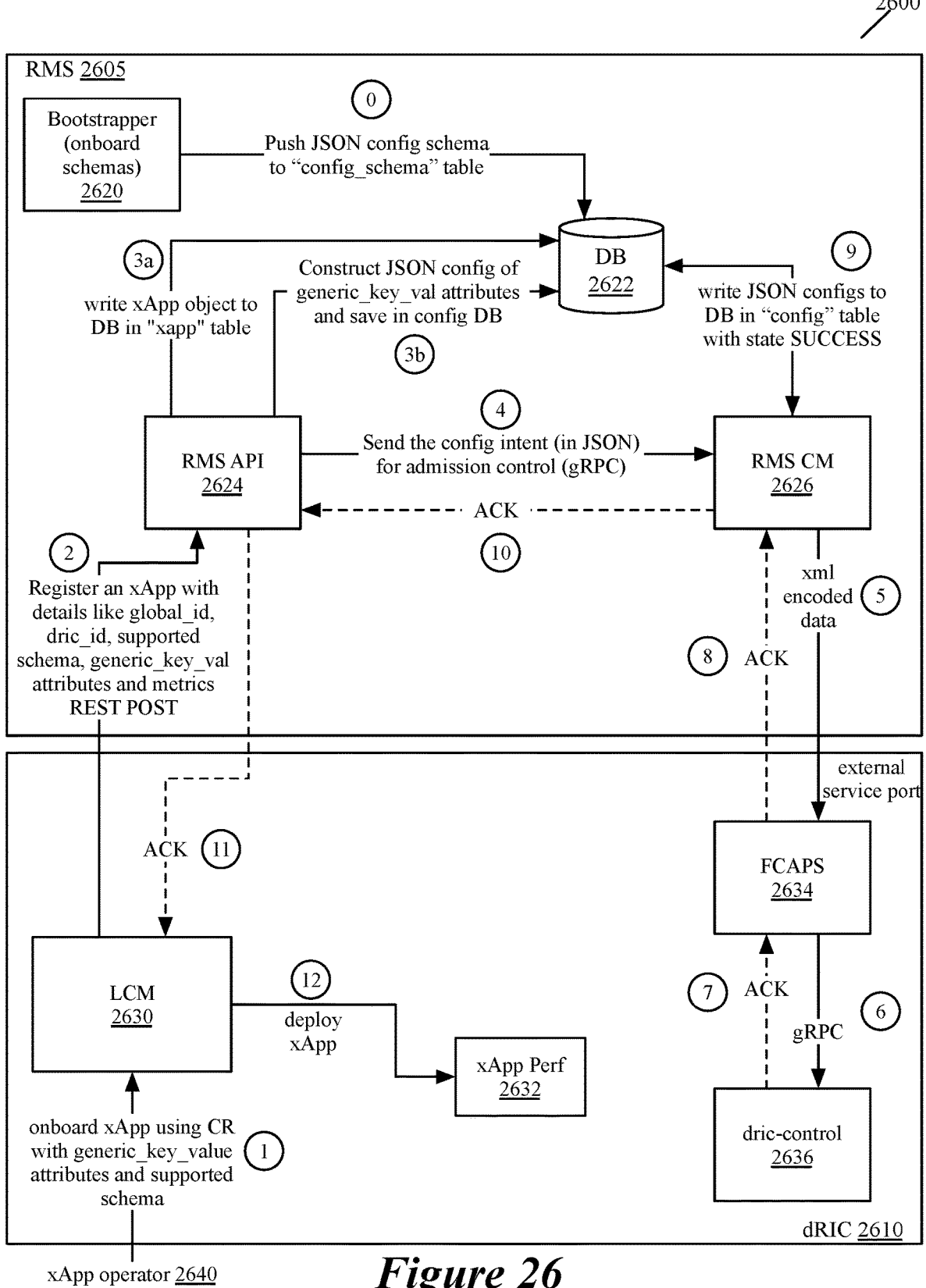
FIG. 26 conceptually illustrates a functional block diagram of the workflows in a RAN system during the deployment phase of some embodiments.

In the embodiments described below, DP refers to a deployment phase, OP refers to an operation phase, and CM refers to the configurations manager service on the RMS side that is responsible for sending configurations to southbound dRIC instances. Each RIC component, such as an xApp, datapath pod (e.g., E2 termination interface or dric-control), etc., in some embodiments, is uniquely identified using a global identifier (i.e., global id), as mentioned above. In some embodiments, the RMS accepts JSON configurations from an RMS UI and RMS API. After a strict validation, in some such embodiments, the RMS CM sends the configuration to the dRIC platform. In some embodiments, there is only one instance of LCM running for any dRIC. As such, when the LCM is deployed for the first time, it registers the dRIC platform with the RMS (i.e., via the RMS API) using REST API, according to some embodiments. FIG. 26 conceptually illustrates a functional block diagram 2600 of a RAN system during the deployment phase of some embodiments and will be further described below with regard to an admission-control use case. However, this can be generalized for any other features that require dynamic configuration, according to some embodiments.

RMS components like UI, API, CM, and a database (e.g., ArangoDB) are needed, in some embodiments, for the northbound implementation. In some embodiments, configurations are sent to only one xApp at a time from the RMS side. Fanned-out configuration support is also provided, in some embodiments. In some embodiments, vChi does not include any version control for configurations. An xApp, in some embodiments, has a single instance, and as such, it is identified using a unique global identifier. In some embodiments, in order to include xApps that are scaled to have multiple instances, each instance is assigned a global identifier by the LCM, and each instance has the same configuration, which is managed by RMS and FCAPS, according to some embodiments.

An xApp comes with configurable parameters that support the operational flexibility in deployment, in some embodiments. The xApp configuration parameters of some embodiments are on-line modified in the field (i.e., not requiring re-deployment of the xApp, which would result in service disruption). In some embodiments, for xApp dynamic configuration, the RMS UI displays the xApp parameters and the current settings (e.g., as a collection of key-value pairs). Each xApp descriptor, in some embodiments, includes attributes such as name (e.g., as a string), value type (e.g., as a string, int, real, or enum), range (e.g., as an int, real, or enum) or length limit (e.g., as a string), and update type (e.g., as display-only, or modifiable). Also, in some embodiments, the parameter values are on-line updatable in the RMS UI, as mentioned above. In some embodiments, certain modifications are not allowed via dynamic configuration such as parameter values of display-only parameters, parameter attributes, and parameters additions and removals.

The modification response time (i.e., from the time a parameter value modification is made in the RMS UI to the time that the updated value is received by the xApp), in some embodiments, is within five (5) seconds. In some embodiments, the modification response time is within two (2) seconds. A faster modification response time (i.e., within two (2) seconds) is ideal, according to some embodiments. The parameter modification response time is measure from the time of the parameter value modification in the RMS UI to the time the updated value is received by the xApp via SDK, according to some embodiments.

The RMS, in some embodiments, maintains an event log on the parameter modifications for the last 14 days and is able to display this event log upon request. Additionally, in some embodiments, the RMS maintains the xApp parameter setting snapshots before each parameter modification event for the last 14 days and is able to roll back when requested. In some embodiments, when a dynamic modification for an xApp parameter fails, the pre-modification value is continued to be used. Dynamic configuration is successful, in some embodiments, only if the RMS has received the positive acknowledgement from the dRIC on the modification request within the modification response time (e.g., a default time of 5 seconds). In some embodiments, the parameter name and value type are updated via a mechanism other than dynamic configuration. Similarly, in some embodiments, parameter additions and removals are not part of dynamic configuration.

In some embodiments, a generic pre-standard Yang schema is defined that enables configuration of dRIC platform parameters and xApp/SDK parameters. The implementation framework on the dRIC platform side is described above. In some embodiments, the generic pre-standard Yang schemas are a binding contract between VMware, Inc.'s RMS and VMware, Inc.'s RICs, and whereas for other (i.e., non-VMware, Inc.) SMO-based deployments, the contract defines the schema between itself and the RICs.

The two schemas provide flexibility to xApp vendors/ operators to configure parameters in the runtime, in some embodiments. On the xApp side, in some embodiments, vendors fetch these parameters using SDK APIs. The functional diagram or the component workflow can be divided into two phases, in some embodiments. In some embodiments, the first phase includes bootstrapping the system to the desired state with the correct deployment order and loading the schemas. In dRIC platform deployment, whenever an xApp is onboarded, the xApp is added in the admission control list of dric-control using a dynamic configuration framework, according to some embodiments. Additionally, generic_key_value attributes are configured. During runtime, the UI can configure each dRIC instance adhering to the above-mentioned schemas.

The O1 CM agent is a configuration agent present at every dRIC platform, in some embodiments, such as FCAPS 2634 on the dRIC 2610. This O1 CM agent is responsible, in some embodiments, for providing configuration information for all components of the platform. As also mentioned above, gRPC is chosen, in some embodiments, as the internal communications mechanism for the RMS and for RICs. In some embodiments, gRPC is chosen because it provides quick and easy way to send configurations to RIC components, it provides compression of data that saves critical bandwidth in a real-time environment, it provides a strong ACK-based mechanism which is ideal for multi-component configurations (i.e., one set of configurations that applies to multiple RIC components on a platform at the same time), it allows stream-based capabilities for speeding up ACK responses, and its footprint is smaller than other streaming buses.

In some embodiments, the functional block diagram 2600 provides an overall picture of the different components of the dynamic configuration of the RMS 2605 and dRIC platform 2610 of some embodiments. The RMS 2605 includes a bootstrapper 2620, a database 2622, an RMS API 2624, and an RMS CM 2626. The dRIC 2610 includes an LCM 2630, at least one xApp 2632, FCAPS 2634, and dric-control 2636. Different aspects of the deployment phase of some embodiments will be described below with references to the functional block diagram 2600.

Because the xApps are onboarded by a RIC component (i.e., an LCM) of the RAN system, the admission control for xApps is also handled by the RAN system, according to some embodiments. The configuration data transmission, in some embodiments, adheres to the standards mentioned in the O1 interface, including the Netconf client (e.g., the RMS CM 2626) on the RMS that acts as a management interface to send configurations to each dRIC platform site, the Netconf server (e.g., the FCAPS 2634) on the dRIC platform that is realized on a Yang model and accepts XML-encoded configurations as per the standards, a defined Yang model "dric-admission-control" that provides a schema to add a list of xApp and E2 node objects, and supported configuration operations ADD, MODIFY, and DELETE.

In some embodiments, the RMS bootstrapper 2620, an RMS UI (not shown), the LCM 2630, the RMS API 2624, and the RMS CM 2626 are northbound components. During the deployment phase, in some embodiments, the bootstrapper job loads all the pre-standard configuration schemas (in JSON) in the database 2622. Some embodiments include three configuration schemas. The schemas, in some embodiments, are specified by a vendor of the RMS. The bootstrapper job, in some embodiments, is a one-time job that is either triggered through fresh installation or through upgrade, according to some embodiments.

During the deployment phase of some embodiments, an operator 2640 (e.g., an xApp operator, or any user) onboards an xApp using xApp CR on a Kubernetes-enabled system. For instance, at the encircled 1, an xApp operator 2640 onboards an xApp using a CR with generic_key_value attributes and supported schema. Prior to this, in some embodiments, JSON configuration schemas are pushed by the bootstrapper 2620 to a configuration schema (config_schema) table in the database 2622. The database 2622, in some embodiments, is a multi-model database. Examples of multi-model databases include ArangoDB, as also mentioned above.

After the xApp has been onboarded on the dRIC platform 2610, the CR is picked by the LCM 2630, which parses the CR. More specifically, the CR is loaded into the LCM 2630 using a Kubernetes API, according to some embodiments, and then parsed by the LCM 2630. The CR is defined by reference to a RAN application CRD (custom resource definition), according to some embodiments. In some embodiments, in addition to parsing the CR, the LCM 2630 assigns a global identifier to the xApp that uniquely identifies the xApp in the RAN system.

After parsing the CR, the LCM 2630 posts an xApp object for the xApp to the RMS 2605 using an RMS REST API that includes data such as the identity of the xApp (i.e., the assigned global identifier) and an identifier for the dRIC 2610. Additionally, the LCM 2630 registers supported schemas for the xApp, according to some embodiments. For instance, at the encircled 2, the LCM 2630 registers the xApp with the RMS API 2624 with details such as a global identifier (i.e., global id), a dRIC identifier corresponding to the dRIC 2610 (i.e., dric_id), a supported schema, generic key-value attributes, and metrics. In some embodiments, all communications from the dRIC 2610 to the RMS 2605 are sent via the O1 interface (e.g., FCAPS 2634), and as such, the LCM 2630 provides the API to the RMS 2605 via FCAPS 2634.

The supported schemas, in some embodiments, are supported configuration schemas that specify supported capabilities/modules or functionalities of the xApp. The supported schemas are also schemas that are supported by the RMS 2605, according to some embodiments, and can be found in a configuration schema data store (e.g., configuration schema table) stored by the RMS 2605, in some embodiments. Each supported schema, in some embodiments, includes multiple supported key-value pairs that are used to define supported attributes of a RAN application (e.g., an xApp).

During the runtime operation phase, the LCM 2630 keeps a watch on any updates in the xApp CR. In some embodiments, modifications to the xApp that include additions or deletions are only performed by updating the CR, while other modifications that include updates to current parameters are made using the RMS UI (not shown).

The generic key-value attributes, in some embodiments, are custom attributes defined using custom key-value pairs based on a generic key-value schema. In some embodiments, the generic key-value schema is a data structure that is part of the supported schemas and used to extend the supported schemas to include additional attributes (i.e., custom attributes) to supplement the supported attributes defined using the supported key-value pairs. Also, in some embodiments, the generic key-value schema is a standalone schema that is separate from the supported configuration schema. The generic key-value schema or generic key-value data structure exposes simple key-value pairs for use in defining the custom attributes.

While hundreds of metrics can be extracted from each application (e.g., xApp, rApp, etc.) deployed in the RAN system, not all of the metrics are desired for publishing (e.g., for display through a UI). Accordingly, the metrics parsed from the CR and provided to the RMS include one or more metrics selected for extraction from the xApp during runtime and for publishing (e.g., for display through a UI), in some embodiments. For instance, an application can produce 100 metrics, while only 5 of those metrics are selected for publishing, and as such, the remaining 95 metrics will be ignored. In some embodiments, the metrics are used as part of a process to dynamically generate a UI. This process also includes defining the UI based on a UI visualization CR that is based on a UI visualization CRD, according to some embodiments. Dynamic generation of the UI based on the UI visualization CRD and the UI visualization CR in order to show this metric data is further described in U.S. patent application Ser. No. 18/084,466, filed on Dec. 19, 2022, and titled "Use of CRDs as Descriptors for Application UI in an O-RAN System". U.S. patent application Ser. No. 18/084,466 is incorporated herein by reference.

The LCM 2630 waits until certain mandatory configurations have occurred, such as automated admission control for the xApp, before deploying the xApp from the CR, according to some embodiments. In some embodiments, this ensures that xApp connectivity with dRIC-control is successfully completed (i.e., the xApp is successfully associated with a datapath in the dRIC), as will be described below.

The RMS API 2624, of some embodiments, onboards configuration schemas and handles xApp and rApp registration during the deployment phase. After the LCM 2630 provides the configuration data parsed from the CR to the RMS API 2624 (i.e., after the LCM 2630 posts the xApp object), the RMS API 2624 validates the xApp request and creates an xApp entry in the database 2622 (e.g., at the encircled 3a). Creating the xApp entry, in some embodiments, includes adding the identity (e.g., the global identifier) of the xApp to a RAN application datastore in the configuration database 2622 of the RMS. In some embodiments, the RMS 2605 creates a record of the xApp in the database 2622. During the runtime operation phase, the RMS API 2624 is also responsible for all RMS UI-related API calls, according to some embodiments.

In some embodiments, the RMS API 2624 also uses the received generic key-value attributes provided by the LCM 2630 to construct a JSON configuration of the generic key-value attributes and saves the generic key-value JSON configuration in the configuration database 2622. In some embodiments, the JSON configuration is constructed out of generic_key_value attributes that adhere to a generic key-value schema mentioned below. This JSON configuration is a configuration block, in some embodiments, that is saved in the database without being provided to southbound components due to a set of assumptions, according to some embodiments. For instance, in some embodiments, a first assumption is that an xApp (e.g., the xApp Perf 2632) sets generic_key_value attributes that are already configured using a static file during its deployment (i.e., the xApp is deployed with default values for the given attributes). As such, in some embodiments, the RMS does not provide the same configuration to the southbound components. A second assumption, in some embodiments, is that the attributes specified in the CR by an xApp operator or xApp developer are the only attributes supported through dynamic configuration. In some embodiments, if new attributes need to be configured, the operator or developer has to update the xApp CR and redeploy, as the RMS UI (not shown) cannot add more attributes on the fly, according to some embodiments.

After creating the xApp entry and saving the generic key-value JSON configuration in the configuration database 2622, the RMS API 2624 sends an admission control configuration request to the RMS CM 2626 for the xApp. As illustrated at the encircled 4, the RMS API 2624 sends the configuration intent (i.e., the admission control configuration request) in JSON to the RMS CM 2626 over gRPC. As described above, gRPC is used, in some embodiments, as the internal transport mechanism for passing configurations internally both for the RMS and for RICs.

After receiving the configuration intent from the RMS API 2624, the RMS CM 2626 converts the configuration from JSON to XML and sends the XML-encoded configuration to the dRIC platform 2610 that hosts the xApp. In some embodiments, the RMS CM 2626 does this by generating an XML configuration block for admission control and sending it to the dRIC platform 2610. The RMS CM 2626 uses the Netconf protocol to send the XML configuration block to the dRIC 2610. At the encircled 5, for example, the RMS CM 2626 sends the XML-encoded data to FCAPS 2634 of the dRIC 2610. The XML-encoded data, in some embodiments, is the parsed CR data provided to the RMS API 2624 by the LCM 2630, while in other embodiments, the XML-encoded data differs from the parsed CR data due to modifications made to the data through the RMS UI (not shown) before the RMS CM converts and sends the data to FCAPS 2634.

During both the deployment phase and the runtime operation phase, in some embodiments, the RMS CM 2626 is responsible for constructing XML-encoded configurations as per https://datatracker.ietf.org/doc/html/rfc624121ection-1.2, and sending these XML-encoded configurations downstream to Netconf servers at the RICs.

The southbound components, in some embodiments, include FCAPS 2634 and one or more xApps 2632. During the deployment phase and the runtime operation phase, FCAPS 2634 exposes an external service for Netconf communication over XML-encoded configurations and defines one or more Yang modules to configure SDK or xApp parameters, according to some embodiments. In some embodiments, one or more SDK API functions are defined to expose xApp-related parameters to the xApp vendors for their development. In some such embodiments, SDK does not parse xApp-related information.

After the RMS CM 2626 sends the XML-encoded configuration to FCAPS 2634, which acts as a configuration service for the dRIC 2610, according to some embodiments, FCAPS 2634 validates the incoming request against the dric-admission-control.yang schema, parses these configurations, and converts them into protobuf. The configurations, in some embodiments, include the global identifier assigned to the xApp by the LCM 2630 to enable FCAPS and other components in the RAN system to uniquely identify the xApp.

In some embodiments, the request includes a series of admission control instructions to instruct FCAPS to perform a set of admission control operations for the xApp. The set of admission control operations, in some embodiments, include validating the received configuration for the xApp, associating a datapath from a set of one or more datapaths of the dRIC 2610 with the xApp for processing and passing communications to and from the xApp from and to the base station components, and adding the xApp to an admission control list of the associated datapath (e.g., by adding the global identifier for the xApp to the admission control list).

Some embodiments also automatically configure the deployed xApp's SDK to interface with one or more datapath pods (i.e., E2T, dric-control, etc.) that are configured for the xApp (e.g., all the datapath Pods of the dRIC instance in the embodiments that add the xApp to the admission control allow list of all of the dRIC instance's datapath Pods, or a subset of these datapath Pods in the embodiments that add the xApp to the admission control allow list of only a subset of the instance's datapath Pods). In some embodiments, when additional datapath pods are instantiated on the dRIC, the SDK is informed of each new datapath pod in order to connect to each new datapath pod for communicating with E2 nodes via datapaths of the datapath pods.

The validation, in some embodiments, includes both standard and custom validations. The standard (i.e., system (library)) validations include standards validations as defined in WG10 for the O1 interface and are requirements of the Netconf server (e.g., FCAPS), schema validation for incoming configurations that determine whether the incoming configurations adhere to a given Yang model (i.e., Yang schema), and dependency validation between different kinds of configurations (e.g., access-control has dependency on admission-control, etc.). Custom validations, in some embodiments, include checking whether the RAN components (e.g., E2T and xApps) are connected to FCAPS before accepting any configuration from northbound components, additional data type validation in modification operations for a generic-key-value Yang module to ensure the user does not change the data type of an attribute, and checking for malformed configurations using a Yang module-specific parsing logic.

Each RIC deployed in the RAN system, in some embodiments, includes one or more datapath pods. Each such datapath pod, in some embodiments, includes one or more datapath threads and one or more control threads for managing the one or more datapath threads. FIG. 15 described above, for example, illustrates a RIC 1500 that includes a datapath pod 1505, which includes a datapath thread 1507 that provides a fast datapath IO of the near RT RIC between E2 nodes 1518 and xApps 1532 and a control thread 1509 that performs multiple control operations associated with the RIC's datapath, such as configuring the datapath thread(s).

The datapath thread 1507 and control thread 1509 exchange data over two circular rings 1522 (i.e., cbuf), with one ring handling messages from the datapath thread 1507 to the control thread 1509 and the other ring handling messages from the control thread 1509 to the datapath thread 1507. In some embodiments, a datapath pod 1505 includes a single control thread 1509 and multiple datapath threads 1507 that each exchange data with the single control thread 1509. Also, in some embodiments, a datapath pod 1505 includes multiple control threads 1509 and multiple datapath threads 1507, with each control thread 1509 having a corresponding datapath thread 1507.

Each control thread enforces admission controls according to an admission control list, according to some embodiments. The admission control list, in some embodiments, is propagated by each control thread of each datapath pod of a RIC (e.g., the dRIC 2610) to each other control thread of each datapath pod of the RIC. In some embodiments, propagating the admission control list in this manner provides more flexibility for which datapath pod an xApp can connect to such that if an xApp is allowed to connect to one datapath pod of the RIC (i.e., is associated with a datapath thread in one datapath pod), it can connect to all datapath pods of the RIC.

The control thread(s) passes the admission control list to the datapath thread(s) via cbuf, in some embodiments, to allow the datapath thread to perform admission control checks for incoming messages from xApps. In some embodiments, the process on the datapath thread is referred to as RAN application registration. For each incoming message from an xApp, the datapath thread determines whether the xApp is authorized to use the datapath thread based on the admission control list, according to some embodiments.

In some embodiments, the admission control list is part of an admission control feature that enables the datapath pod (e.g., dric-control 2636) to allow connections from a set of xApp objects and E2 node objects specified in the allow list, and effectively discards connections from any unknown entities (e.g., xApps and E2 nodes that are not included on the allow list). These xApps and E2 nodes have their own signature definition, in some embodiments, which facilitates their unique identity. As mentioned above, the global identifier assigned to an xApp (or E2 node) that uniquely identifies the xApp (or E2 node) within the RAN system is added to the allow list, in some embodiments. In some embodiments, as a first phase, static provisioning of xApps and E2 nodes is enabled using a YAML file. This YAML file is mounted on the dric-control 2636 at deployment time, according to some embodiments.

In some embodiments, a datapath pod can be horizontally scaled to add additional instances of that datapath pod. This horizontal scaling is done, in some embodiments, to increase the number of E2 nodes that can be handled by a single RIC instance. For example, in some embodiments, a single instance of a datapath pod can handle 20 E2 nodes. If the single instance of the datapath pod is horizontally scaled to 50 instances of the datapath pod, with each instance handling 20 E2 nodes, then 1000 E2 nodes will be able to connect.

An E2 node load distribution pod is instantiated to distribute traffic to the E2 nodes, in some embodiments, and a network address for the E2 node distribution pod is provided to each of the E2 nodes to enable these E2 nodes to connect to the RIC on which the E2 node distribution pod is instantiated. For xApps to connect to the E2 nodes, in some embodiments, the SDK logic connects to all of the datapath pod instances, and the traffic from the xApps to the E2 nodes is distributed by the E2 node load distribution pod.

In some embodiments, to limit the number of E2 nodes to which any one xApp can access (i.e., rather than allowing each xApp to connect to all 1000 E2 nodes, the traffic from which the xApp is unlikely to be able to handle), an access control function is configured on each datapath pod. The access control function enables the datapath pod to control which E2 nodes an xApp can access. Using the example above, for instance, each xApp in a set of 50 xApps can be assigned a respective set of 20 E2 nodes.

In addition to controlling which E2 nodes an xApp can connect to, the access control function is also used, in some embodiments, to limit which RAN functions of the E2 node the xApp is allowed to access, as well as what the xApp can do with those RAN functions (e.g., read or write). For example, an xApp can be allowed to connect to an E2 node that includes five (5) RAN functions, while only being allowed to access one (1) of those RAN functions, either to read the data (e.g., to generate graphs and charts for analysis) or write the data (e.g., to change the RAN function). By limiting an xApps access to E2 nodes, the RAN functions of those E2 nodes, and the interactions the xApp can have with those RAN functions, in some embodiments, a first level of conflict management can also be achieved (e.g., xApp 1 is given read permissions for a particular RAN function while xApp 2 is given write permissions for the particular RAN function, thereby avoiding conflicts where both xApps try to change the particular RAN function).

After converting the configurations into protobuf, FCAPS 2634 provides the configurations to the dric-control pod 2636 (i.e., a datapath pod of the dRIC 2610). For instance, FCAPS 2634 sends configurations over gRPC to dric-control 2636 at the encircled 6. The dric-control pod 2636 then validates the configurations and, if the configurations are accepted, adds the xApp to its allow list (i.e., an admission control list managed by a control thread of the dric-control pod). The validation performed by dric-control 2636, in some embodiments, includes validating for duplicate configurations with the same operation and validating for illegal entries or random configurations of which xApps are not aware. Also, in some embodiments, new configurations are not accepted when the RAN component has exhausted its resource quota. In some embodiments, xApps perform their own validations.

Next, the dric-control pod 2636 responds to FCAPS 2634 with either a positive acknowledgement or a negative acknowledgement (e.g., the ACK sent from dric-control 2636 to FCAPS 2634 at the encircled 7). The positive acknowledgement indicates that the configurations have been validated and accepted, and that the xApp has been successfully associated with a datapath and added to the allow list, while the negative acknowledgement indicates that the configurations have been determined to be invalid and/or rejected, and that the xApp has not been associated with a datapath or added to the allow list.

When the acknowledgement is positive, FCAPS 2634 stores the configurations in an FCAPS sysrepo running datastore (not shown) and provides the positive acknowledgement to the RMS CM 2626 (e.g., the ACK sent from FCAPS 2634 to the RMS CM 2626 at the encircled 8). In addition to the configurations, a state of the configurations is also stored to the sysrepo running datastore, according to some embodiments. The RMS CM 2626 then stores the configurations (in JSON) in the database 2622, and sends the positive acknowledgement to the RMS API 2624, which sends the positive acknowledgement to the LCM 2630 to cause the LCM 2630 to deploy the xApp. As illustrated, for instance, the RMS CM 2626 writes the JSON configurations to the database 2622 in a "config" table in the database 2622 with the state as SUCCESS at the encircled 9, and sends the ACK to the RMS API 2624 at the encircled 10, which then sends the ACK to the LCM 2630 at the encircled 11. In some embodiments, because JSON is easier to review by, e.g., a network operator, the configurations are stored in JSON for easy retrieval and display (i.e., without requiring the data to be converted before displaying).

The positive acknowledgement is a clear signal to the LCM 2630 to deploy the xApp. The LCM 2630, for example, is shown deploying the xApp Perf 2632 at the encircled 12. In some embodiments, the LCM 2630 deploys the xApp in the form of a deployment object (e.g., a Kubernetes deployment object). The deployment, in some embodiments, includes the LCM 2630 instantiating the xApp, at which point the xApp 2632 is realized. In some embodiments, the LCM 2630 does not provide an explicit acknowledgement to the RMS 2605 indicating the xApp has been successfully deployed. The RMS 2605 of some embodiments includes multiple modules that are dependent on the xApp running correctly, and as such, the RMS 2605 is able to detect that the xApp is deployed and running (or not deployed, or not running properly) based on data provided by these entities, according to some embodiments.

When the acknowledgement sent from dric-control 2636 to FCAPS 2634 is a negative acknowledgement, FCAPS 2634 does not store the configurations in its sysrepo running datastore (not shown), and the RMS CM 2626 does not store the configurations in the database 2622. Additionally, the receipt of the negative acknowledgement by the LCM 2630 is a clear signal to not deploy the xApp, and as such, the LCM 2630 does not deploy the xApp when the acknowledgement is a negative acknowledgement.

The admission control of xApp and E2 node objects is performed during runtime from the RMS 2605 or any third-party SMO using the O1 interface (e.g., FCAPS 2634) in WG10, in some embodiments. In some embodiments, admission control for E2 nodes is supported through UI upload configurations as well as through API, as will be further described below. The E2 nodes are base station components, such as DUs and CUs in a RAN system, or O-DUs and O-CUs in an O-RAN system.

Figure 27:
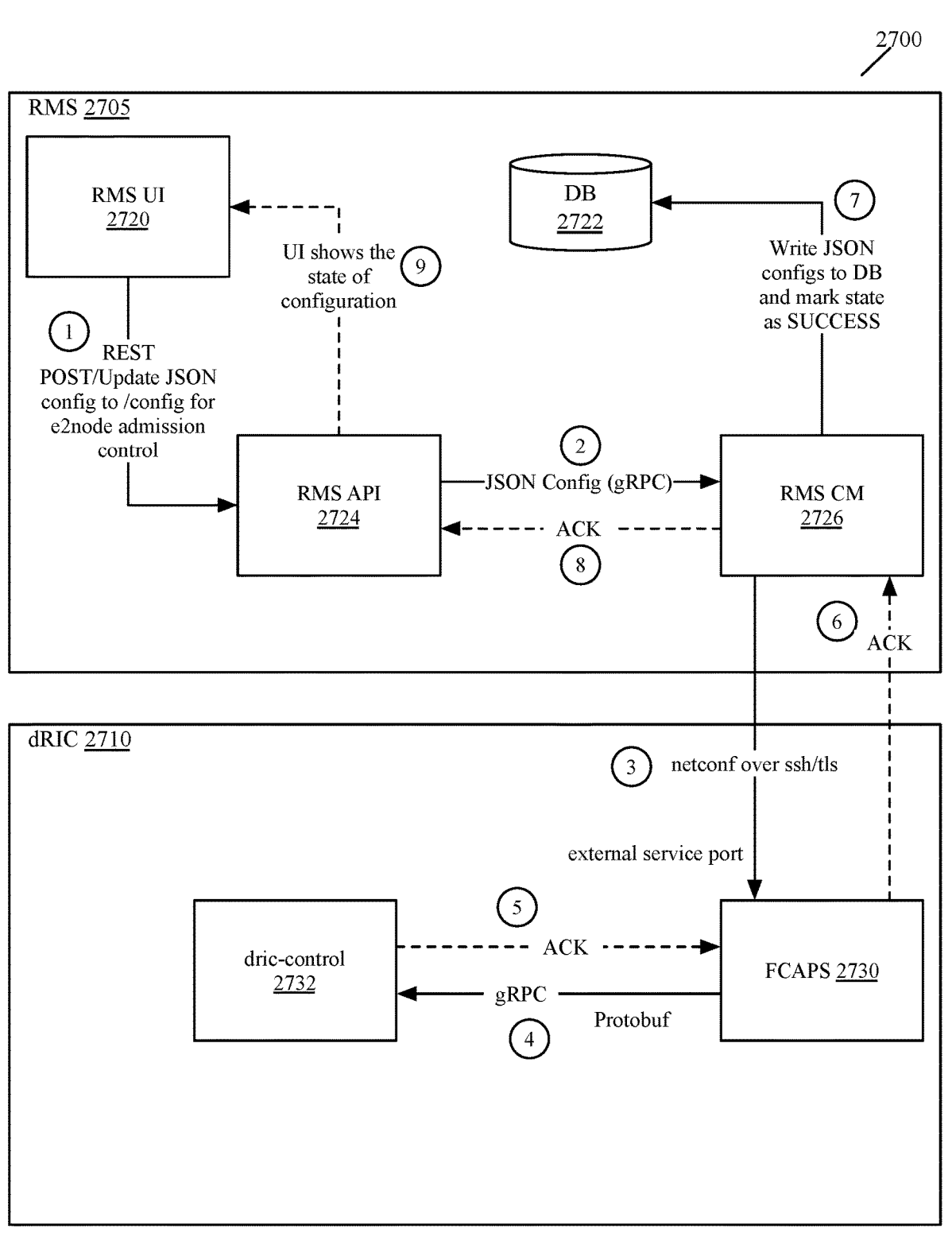
FIG. 27 conceptually illustrates a functional block diagram of some embodiments of the workflows in a RAN system for E2 node admission control using the RMS UI.

FIG. 27 conceptually illustrates a functional block diagram 2700 of a RAN system of some embodiments during an E2 node admission control use case using the RMS UI. As shown, the diagram 2700 includes an RMS 2705 and a dRIC 2710. The RMS 2705 includes an RMS UI 2720, a database 2722, an RMS API 2724, and an RMS CM 2726. The dRIC 2710 includes FCAPS 2730 and dric-control 2732.

During the deployment phase, the RMS UI 2720 is responsible for dynamically constructing the dashboard based on the configuration schema, in some embodiments. During the runtime operation phase of some embodiments, the RMS UI 2720 invokes REST API on the RMS API 2724 side to configure a RAN component instance (e.g., an xApp, SDK, E2T, etc.) with the required configurations. The configuration object's top-level keys match the "supported_schemas" name so that the RMS UI 2724 can render a SchemaTree on a side-menu displayed through the UI, in some embodiments, as will be described further below.

All "*-config" entities in the schema are an array with only one (1) item, in some embodiments. The schema, in some embodiments, enforces this expectation on the API as well as in the UI (e.g., when in-place property update is available). In some embodiments, the UI uses Type defn for each schema, and uses that to enforce TypeChecks. Schema Name is defined as Type so that mapping between name and Type of Schema can be easily applied, according to some embodiments. As such, any name change or addition of new schema, in some embodiments will need minor UI updates.

Admission control for E2 node objects, in some embodiments starts when a user uploads an E2 node admission control JSON configuration using RMS UI 2720. The RMS UI 2720 then makes a POST/UPDATE call to the RMS API 2724 with the JSON file. For instance, at the encircled 1, the RMS UI 2720 makes the POST/update call to the RMS API 2724 with the JSON configuration to "/config" for E2 node admission control. The RMS API 2724 performs a validation to check the structure of the configuration data, and sends the validated configuration data to the RMS CM 2726 through gRPC protobuf encoding (e.g., at the encircled 2).

Like the xApp admission control use case described above by reference to the diagram 2600, the RMS CM 2726 converts the configuration data from JSON to an XML-encoded format and sends the configuration using Netconf over SSH/TLS to the FCAPS 2730 on the dRIC 2710 (e.g., at the encircled 3). In some embodiments, the configuration is sent along with a request that includes a series of admission control instructions for the dRIC 2710 to perform a set of admission control operations for the E2 node. The admission control operations, in some embodiments, include validating the configuration, associating the E2 node with a datapath of the dRIC 2710, and adding the E2 node (e.g., a global identifier assigned to the E2 node) to an allow list of the associated datapath that is used for admission control to determine whether the E2 node is allowed to send data messages using the datapath.

FCAPS 2730 validates the incoming request from the RMS CM 2726 against the dric-admission-control.yang schema and parses these configurations into protobuf. FCAPS 2730 then sends these configurations to dric-control 2732 (i.e., E2 termination interface/datapath pod). The dric-control pod 2732 performs a validation operation to validate the configurations and, when it accepts the configurations, adds the E2 node to its allow list (i.e., associates the E2 node with a datapath and adds the E2 node to the allow list). The dric-control pod 2732 then responds to FCAPS 2730 with either a positive acknowledgement (i.e., when the configurations have been validated and accepted, and the E2 node has been added to the allow list of an associated datapath) or a negative acknowledgement (i.e., when the configurations have been determined to be invalid and/or have otherwise been rejected, and the E2 node has not been associated with a datapath or added to an allow list). For example, the dric-control pod 2732 sends an acknowledgement to FCAPS 2730 at the encircled 5.

When the acknowledgement is a positive acknowledgement, FCAPS 2730 stores the configurations to an FCAPS sysrepo running datastore (not shown) and returns success for the configuration request over Netconf to the RMS CM 2726 (e.g., the ACK at the encircled 6). The RMS CM 2726 then stores the configurations to the database 2722 by writing the JSON configurations to the database 2722 and marking the status as SUCCESS (e.g., at the encircled 7). The RMS CM 2726 also sends the positive acknowledgement to the RMS API 2724 (e.g., the ACK at the encircled 8), which then sends the positive acknowledgement to the RMS UI 2720 for the RMS UI 2720 to display the state of the configuration as SUCCESS (e.g., at the encircled 9).

When the acknowledgement is a negative acknowledgement, FCAPS 2730 sends the negative acknowledgement indicating the configurations have failed to the RMS CM 2726 without storing the configurations in its sysrepo running datastore. The RMS CM 2726 provides the negative acknowledgement to the RMS API 2724 without writing the JSON configurations to the database 2722, and the RMS API 2724 provides the negative acknowledgement to the RMS UI 2720 for display.

Figure 28:
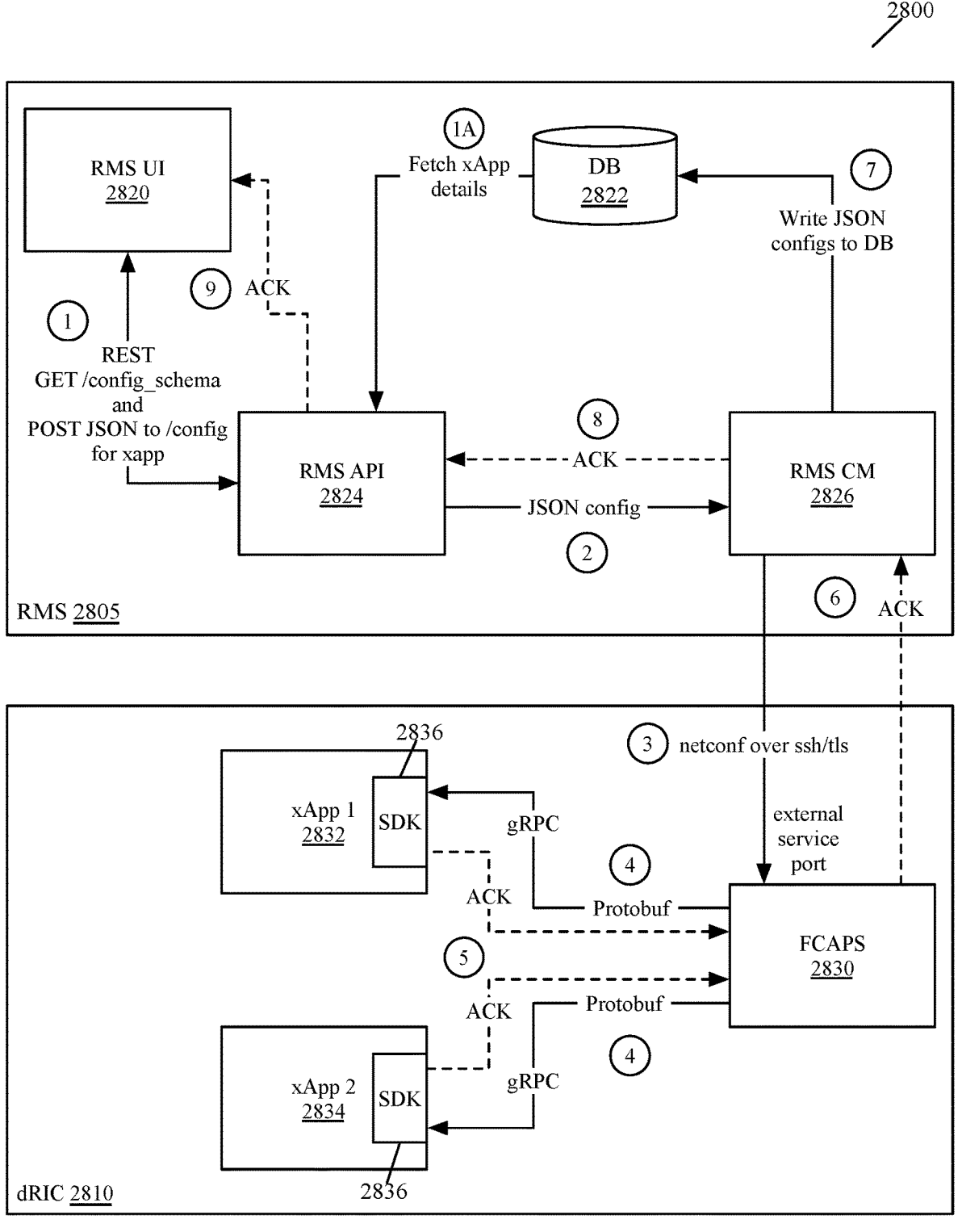
FIG. 28 conceptually illustrates another example of a functional diagram showing workflows during the runtime operation phase of some embodiments.

FIG. 28 conceptually illustrates a functional diagram 2800 for updating an xApp during the runtime operation phase of some embodiments. In some embodiments, the run-time operation phase enables the RMS to configure dRIC instances using the RMS UI, as also mentioned above. While the diagram 2800 is illustrated as an example for updating an xApp during runtime, other RAN components, such as E2 nodes, RICs (e.g., dRICs and cRICs), dric-control/E2T/datapath pods, SDKs, and other modules (e.g., schemas), can also be updated through the RMS UI, in some embodiments.

The diagram 2800 includes an RMS 2805 and a dRIC 2810. The RMS 2805 includes an RMS UI 2820, a database 2822, an RMS API server 2824, and an RMS CM 2826. The dRIC 2810 includes FCAPS 2830 and two xApps 2832 and 2834. Additionally, each xApp 2832-5734 has a respective SDK 2836 to serve as an interface between the xApp and one or more elements of the RAN.

The RMS UI 2820 enables users (e.g., network administrators, network operators, other users, etc.) to update xApps (and other RAN components as mentioned above) during runtime. To do so, a user makes a selection (e.g., a request to display) through the RMS UI 2820 to view data associated with the xApp (e.g., configuration data) and the RMS UI 2820 retrieves the current data via the RMS API 2824 accordingly and displays the current data. For example, at the encircled 1, a GET API is used to get the configuration schema (e.g., the current JSON configuration) for the xApp and the RMS API 2824 fetches (at the encircled 1A) the xApp details from the database 2822. The RMS API 2824 then passes the data to the RMS UI 2820 for display.

When the user makes a modification to the displayed data, the user input (e.g., updated configuration) is provided from the RMS UI 2820 to the RMS API 2824. For example, a POST API to "/config" for the xApp is posted to the RMS API 2824 as shown. The RMS UI 2820, in some embodiments, includes selectable UI items that enable network operators or any other user of the UI to make the modifications in-line. Additionally, the UI of some embodiments includes selectable UI items to enable network operators to import configuration files and/or export configuration files. In some embodiments, the UI also provides selectable UI items to allow network operators to view and, in some embodiments, modify configurations of, other RAN components and modules, such as RICs (i.e., dRIC and cRIC), LCMs, datapath pods, E2 nodes, SDK parameters, configuration schemas, etc.

In some embodiments, the updated configuration includes first and second sets of data tuples, with the first set of data tuples being an updated first set of data tuples and the second set of data tuples being a current second set of data tuples. Additionally, the updated configuration of some embodiments is structured according to the same configuration schema as the current configuration stored by the RMS database 2822 such that the structures of the updated and current configurations are the same, values specified by the updated first set of data tuples differ from values specified by a current third set of data tuples that correspond to the updated first set of data tuples, and values specified by the second set of data tuples are identical in the updated and current configurations.

The RMS API 2824 then passes the updated configuration to the RMS CM 2826 (e.g., at the encircled 2), which converts the updated configuration from JSON to an XML-encoded format and sends the XML-encoded updated configuration using Netconf over SSH/TLS (e.g., at the encircled 3) to FCAPS 2830 to request FCAPS 2830 to update the configuration for the xApp. In some embodiments, the modifications are to multiple components, such as both of the xApps 2832 and 2834. For example, a user of some embodiments selects to modify the log level of both xApps 2832 and 2834 (e.g., change the log level from INFO to DEBUG). The RMS CM 2826 of some embodiments sends the updated configuration to FCAPS 2830 with a command to instruct FCAPS 2830 to perform an update operation. In some embodiments, when the RMS CM 2826 sends the updated configuration (i.e., the entire configuration that includes both the updated data tuples and the current data tuples that have not been updated), the update operation specified is "replace" to instruct FCAPS 2830 to replace the current configuration stored by FCAPS sysrepo running datastore (not shown) with the updated configuration.

Also, before converting the updated configuration, in some embodiments, the RMS CM 2826 retrieves, from the database 2822, the current configuration and performs a differential operation as part of a differential management process to identify differences between the current and updated configurations (e.g., the first set of data tuples that are different from the third set of data tuples in the example above). For example, a current configuration for a particular parameter that is relevant for multiple xApps may only include xApp 2832 and not xApp 2834 and as such, a user may want to update that current configuration to add xApp 2834. In some such embodiments, the differential operation would return a result that includes the update adding xApp 2834. After converting the identified differences (i.e., the addition of xApp 2834) to the XML-encoded format, the RMS CM 2826 of some embodiments then sends the XML-encoded identified differences to FCAPS 2830 with the update operation set to merge. FCAPS 2830, in some such embodiments, would then append the identified differences to the current configuration stored in the FCAPS sysrepo datastore to update the configuration.

FCAPS 2830 validates the updated configuration (or identified changes) against the Yang schema stored by FCAPS 2830. FCAPS 2830 then parses the updated configuration, and converts the updated configuration to protobuf. The two-stage commit process described above is then performed. In some embodiments, the xApps 2832 and 2834 are first instances and updating the configurations of the xApps includes replacing the first instances that are configured based on the current configuration with second instances that are configured based on the updated configuration.

After FCAPS 2830 has received acknowledgements from both xApps 2832 and 2834 indicating the updated configuration has been successfully processed, FCAPS 2830 stores the updated configuration in its sysrepo running datastore (not shown) and sends an acknowledgement to the RMS CM 2826 indicating the update configuration has been successfully implemented for the xApps 2832 and 2834.

Next, the RMS CM 2826 writes the updated configuration to the database 2822 with the state marked as success. In some embodiments, the RMS CM 2826 uses the first set of configuration tuples (i.e., the updated configuration tuples) to update the current configuration stored in the database 2822, while in other embodiments, the RMS CM 2826 replaces the current configuration stored in the database 2822 with the updated configuration. In some embodiments, each configuration stored in the database 2822 is stored with a configuration version identifier. This configuration version identifier, in some embodiments, is a numerical date identifying the data on which the configuration was last updated. The RMS CM 2826 then sends the acknowledgement to the RMS API 2824, which provides the acknowledgement to the RMS UI 2820 for display to notify the user that the updated configuration has been successfully implemented. In some embodiments, while the updated configuration is being processed and implemented, the UI displays an indication that the configuration is in progress, as well as the date that the configuration was last updated. When the updated configuration has been successfully processed and implemented, in some embodiments, the RMS UI 2820 notifies the user by updating the last-updated date for the configuration. In some embodiments, this form of notification is used in lieu of any other notification to the user that the updated configuration has been successfully processed and implemented. Also, in some embodiments, when the updated configuration is not implemented, an error message to the user is displayed through the RMS UI 2820. In some embodiments, the UI also includes an option to reapply the changes (i.e., try again).

Schemas, such as the Yang schemas and JSON schemas mentioned above and further described below, are contracts between two entities, according to some embodiments. The Yang schema, in some embodiments, is a contract between the SMO (e.g., VMware, Inc.'s RMS) and dRIC FCAPS, and the data/configuration is modeled using XML as per WG10 specs. The JSON schema, in some embodiments, is a contract between a user and the RMS UI, and the data/configuration is modeled using JSON.

In some embodiments, two schemas are exposed and preserved for the same configuration file (e.g., generic-key-value@2022-11-04.yang and generic-key-value.json-.schema). An exact mapping of attributes defined in both schemas is maintained, in some embodiments, while in other embodiments, at least a similar mapping of the attributes defined in both schemas is maintained. In some embodiments, a versioning system is also maintained for the schemas in order to make the schemas future-proof.

Three pre-standard Yang schemas are defined, in some embodiments, including dric-admission-control@2022-10-30.yang, generic-key-value@2022-11-04.yang, and vmware-sdk-param@2022-07-23.yang. The dRIC admission control schema of some embodiments is used by dric-control to allow connectivity for xApps and E2 nodes. xApps configurations onboarding is automated from the LCM, in some embodiments, since xApps are managed entities. In some embodiments, information for E2 nodes is uploaded via a file upload method for vChi. The generic key-value schema is a generic configuration/module of some embodiments that exposes simple key-value pairs. In some embodiments, an xApp vendor can use these simple key-value pairs to configure any parameter they want to control. Moreover, the key-value pairs add value to control some of the E2T and SDK parameters, in some embodiments. The VMware SDK parameter schema sets internal SDK parameters, according to some embodiments. It is only accessed by SDK, in some embodiments, and not by xApps.

The generic key-value schema, in some embodiments, is a generic key-value data structure that is included as part of a configuration data schema that is defined by a vendor of the RMS and that also includes multiple schema keys (i.e., pre-defined keys for which the developers/operators only need to provide values for). In some such embodiments, the generic key-value data structure extends the configuration data schema.

Application developers and operators provide values for each schema key, and can also define one or more custom keys that are not available as part of the schema keys using the generic key-value data structure, in some embodiments.

Accordingly, in some embodiments, a configuration data schema defined for, e.g., an xApp, includes first and second sets of key-value pairs, with the first set being key-value pairs defined using the schema keys, and the second set of key-value pairs being custom key-value pairs defined by the developer/operator and not defined by reference to any schema keys. In some embodiments, the developer/operator generates a file storing the schema keys (and/or the custom keys). The file, in some embodiments, is a custom resource (CR) defined based on a CRD (custom resource definition). In some embodiments, the generic key-value pairs (i.e., the custom keys) can be updated through the RMS UI (e.g., to modify current values) or through updated CRs (e.g., to add new values) distributed to RAN operators.

In some embodiments, SDK Yang schemas have well-defined attribute and configuration values. The generic-key-value schema of some embodiments provides a model to add more attributes that were not covered previously in SDK schemas. In some embodiments, the UI rendering includes empty key values for generic-key-value CM. A simple uint64-based identifier is used, in some embodiments, to uniquely identify each RIC component at a dRIC instance. In other embodiments, other identifiers are used. Service-ids is used, in some embodiments, as a means to identify each component uniquely. In some embodiments, E2T (i.e., dric-control) and xApps are managed elements that each have their own global identifier.

The generic-key-value@2022-11-04.yang file provides generic structures for any RIC component parameters, in some embodiments. As also described above, acceptable configurable parameters of some embodiments include key, value, and description. The key parameter field is a string data type that includes programmatically syntax, the value parameter field can include any defined possible Yang types to hold a data, and the description parameter field provides additional information for the key for display purposes. In some embodiments, if any generic configurations belong to an xApp, these configurations are not parsed on the SDK side. For Yang, in some embodiments, member types are placed in a union from most selective to least selective and evaluated in order (i.e., in order from most selective to least selective). Plain "string" is a catch-all, in some embodiments, that will match anything, and as such is placed last.

Additional details regarding the embodiments described above and additional features of the RIC can be found in U.S. Pat. No. 11,540,287, titled "Separate IO and Control Threads on One Datapath Pod of a RIC", and issued Dec. 27, 2022, U.S. Patent Application Publication No. 2023-0069604, titled "Use of CRDs as Descriptors for Applications, Application Components, Deployments, Clouds, AI/ML Models, and RTE in an O-RAN System", and filed on Aug. 22, 2022, and U.S. patent application Ser. No. 18/101,544, titled "Provisioning and Deploying RAN Applications in a RAN System", and filed on Jan. 25, 2023. U.S. Pat. No. 11,540,287, U.S. Patent Application Publication No. 2023-0069604, and U.S. patent application Ser. No. 18/101,544 are incorporated herein by reference.

As mentioned above, some embodiments of the invention provide a method for increasing system capacity of a RIC (RAN intelligent controller) in a RAN (radio access network). The RIC, in some embodiments, is a dRIC. A first datapath pod of the RIC is used to forward communications between a first set of RAN applications (e.g., xApps or rApps) connected to the RIC and a first set of base station components (e.g., E2 nodes) connected to the RIC. When a second set of base station components establish connections to the RIC, the method determines that the first datapath pod has insufficient resources for forwarding traffic between both (1) the first set of base station components and the first set of RAN applications and (2) the second set of base station components and the first set of RAN applications. The method then determines that at least a second datapath pod is required for forwarding traffic between the second set of base station components and the first set of RAN applications, and instantiates the second datapath pod on the RIC for forwarding traffic between the second set of base station components and the first set of RAN applications. In some embodiments, a second set of RAN applications (e.g., additional instances of the first set of RAN applications) are also instantiated along with the second datapath pod.

As the number of base station components and datapath pods increases, some embodiments implement access control measures to limit the number of base station components accessible to each RAN application. Accordingly, some embodiments of the invention also provide a method for utilizing access controls to limit access to base station components (e.g., E2 nodes) of a RAN that are connected to a RIC by RAN applications (e.g., xApps or rApps) of the RIC.

For instance, at the RIC, the method of some embodiments receives a set of access control data that specifies which RAN applications are allowed to access which base station components. The set of access control data of some embodiments includes (1) a set of access control lists, each access control list specifying access rules for accessing a set of base station components and (2) a set of access maps that specify, for each access control list in the set, one or more RAN applications for which the access control list is applicable. Based on the set of access maps, the method provides each RAN application one or more access control lists from the set that are applicable to the RAN application. When a data message sent by a particular RAN application and destined to a particular base station component is received at the RIC, the method uses the set of access control lists to determine whether the particular RAN application is allowed to access the particular base station component.

As the number of datapath pods, base station components, and/or RAN applications associated with a RIC increases, a base station component load distributor is deployed on the RIC. In some embodiments, the base station component load distributer assigns each base station component that establishes a connection to the RIC to one of the datapath pods of the RIC, and forwards data messages between the datapath pods and the connected base station components. Additional details regarding scaling and access controls will be further described in the embodiments below.

Figure 29:
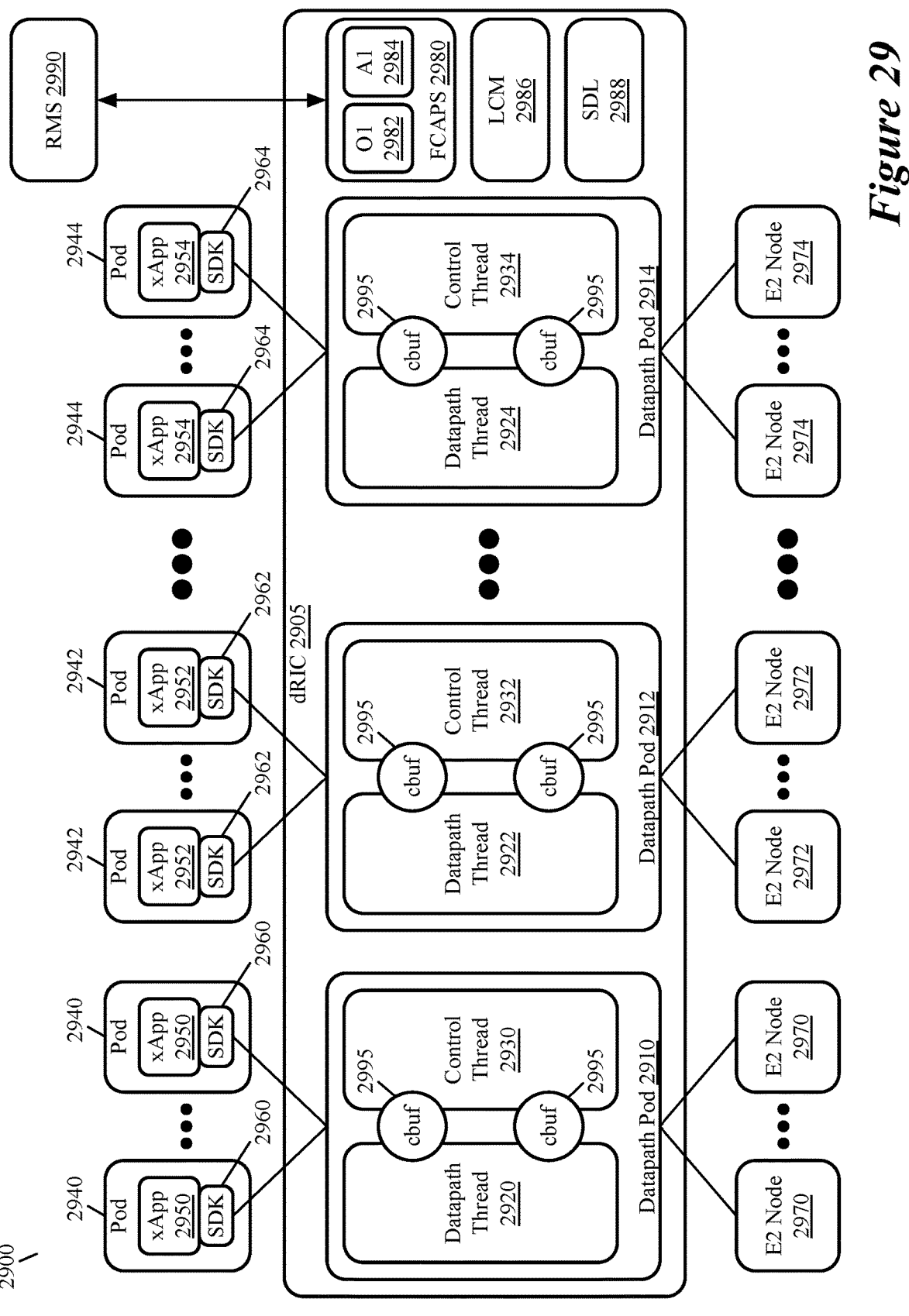
FIG. 29 conceptually illustrates an architecture diagram that includes horizontally scaled pod groups of a RIC of some embodiments.

FIG. 29 conceptually illustrates an architecture diagram 2900 that includes horizontally scaled pod groups of a RIC of some embodiments. As shown, the diagram 2900 includes a dRIC 2905, an RMS (RIC management system) 2990, and multiple E2 nodes 2970, 2972, and 2972 (e.g., DU and/or CU nodes). The RMS 2990, in some embodiments, executes on one or more host computers and manages multiple RICs (e.g., centralized RICs (cRICs) and dRICs) including the dRIC 2905.

The dRIC 2905 includes multiple datapath pods 2910, 2912, and 2914, an FCAPS (fault, configuration, accounting, performance, and security) management pod 2980, an LCM (lifecycle management) pod 2986, and an SDL (shared data layer) 2988. Additionally, multiple xApps 2950, 2952, and 2954 execute respectively on multiple pods 2940, 2942, and 2944 and communicate with the dRIC 2905 through their respective RIC SDKs 2960, 2962, and 2964 executing on the pods 2940-2944 with the multiple xApps 2950-2954. In some embodiments, the dRIC 2905 is implemented by multiple RICs executing on multiple host computers. Also, in some embodiments, one RIC and several xApps are bundled together to operate on different Pods that operate on one VM. Multiple instances of the RIC can also be deployed in some embodiments with different sets of xApps. Also, in some embodiments, xApps that need to talk to each other are bundled on the same VM.

In some embodiments, each datapath pod 2910-2914 and its respective connected xApps 2950, 2952, or 2954 is defined as a pod group. For example, in some embodiments, the datapath pod 2910 and pods 2940 that execute the xApps 2950 and SDKs 2960 constitute a first pod group, the datapath pod 2912 and pods 2942 that execute the xApps 2952 and SDKs 2962 constitute a second pod group, and the datapath pod 2914 and pods 2944 that execute xApps 2954 and SDKs 2964 constitute a third pod group.

While illustrated as executing one xApp each, the pods 2940-2944 of some embodiments can execute one or more xApps. Each of the pods 2940-2944, in some embodiments, interface with their respective datapath pod 2910-2914, the SDL 2988, and the FCAPS management pod 2980 through the respective SDKs 2960-2964 of the pods 2940-2944. The SDKs 2960-2964 provide high-level interfaces for the xApps 2950-2954 to communicate with the dRIC 2905 and E2 nodes 2970-2974. This high-level interface, in some embodiments, hides details of the underlying implementation. The SDKs 2960-2964 communicate with RIC instances through fast data IO communication channels (e.g., shared memory or SCTP).

The SDKs 2960-2964 also use control communication channels with the FCAPS management pod 2980 and with the respective control threads 2930-2934 of the datapath pods 2910-2914 to which the SDKs 2960-2964 connect for xApp control operations. Examples of such xApp control operations, in some embodiments, include xApp onboarding, registration, capabilities, subscription, FCAPS, etc. In some embodiments, the control channel communication between an SDK and a control thread is through shared memory when the xApp pod (and its SDK) and the datapath pod operate on the same host computer, and through SCTP when they operate on different host computers. Also, in some embodiments, the control channel communication between the xApp pod (and its SDK) and the FCAPS management pod is through shared memory when the SDK and the FCAPS management pod operate on the same host computer, and through gRPC when they operate on different host computers. Other embodiments use SCTP for communications between the SDK and the FCAPS management pod when the xApp pod (and its SDK) and the FCAPS management pod operate on different host computers.

Each datapath pod 2910-2914 includes several important dRIC components (not shown), such as an E2 termination (E2T) interface, a conflict mitigation component, an application subscription management component, and a RIC SDK interface. In some embodiments, some or all of these datapath services are embedded in a datapath thread (e.g., 2920, 2922, and 2924) and a control thread (e.g., 2930, 2932, and 2934) of the datapath pod (e.g., 2910-2914). In other embodiments, these datapath services are embedded in a data IO thread, multiple data processing threads, and a control thread.

A thread is a component of a process that executes on a computer, according to some embodiments. The process can be an application or part of a larger application. A thread is a sequence of programmed instructions that can be managed independently of other threads of the process. Multiple threads of a given process can execute concurrently (e.g., by using multithreading capabilities of a multi-core processor) while sharing the memory allocated to the process. Multithreading is a programming and execution model that allows multiple threads to exist within the context of one process. These threads share the process's resources while being able to execute independently.

In some embodiments, each control thread 2930-2934 is an interface with the FCAPS management pod 2980 and the SDL 2988 for the datapath threads 2920-2924, while in other embodiments, each control thread 2930-2934 is an interface to just the FCAPS management pod 2980 for the datapath threads 2920-2924 (i.e., as the datapath threads can communicate directly with the SDL 2988). In either approach, each control thread 2930-2934 performs slower, control-related operations of their datapath pod 2910-2914, while each datapath thread 2920-2924 performs faster IO operations of their datapath pod 2910-2914.

In some embodiments, each control thread 2930-2934 interfaces with the FCAPS management pod 2980 to receive configuration data for configuring its own operations as well as the operations of their respective datapath thread 2920-2924. As will be further described below, the configuration data of some embodiments includes access control data. The access control data of some embodiments includes access control lists that specify, for each of the xApps 2950-2954, one or more E2 nodes 2970-2974 to which the xApp 2950-2954 is allowed to communicate with. Because of the control properties and termination interface properties of the datapath pods 2910-2914, these datapath pods are also referred to as E2 termination (E2T) interfaces or dRIC control instances, in some embodiments.

Each datapath thread 2920-2924 provides a high speed IO between E2 nodes 2970-2974 and xApps 2950-2954. These threads handle the RIC SDK interface (not shown) and E2 termination operations, as well as conflict mitigation and xApp subscription operations, in some embodiments. These datapath threads 2920-2924, in some embodiments, performs ASN.1 decoding of E2AP messages to extract the message data. In some embodiments, the datapath threads do not decode the E2SM payload of these messages. Each datapath thread 2920-2924 validates E2 node and xApp messages and sequences. In some embodiments, the message types include E2 node setup and service update, E2 node indication reports, xApp initiated subscriptions for E2 node data and xApp initiated control requests.

Each datapath thread 2920-2924 in some embodiments runs one or more E2 state machines in order to create and maintain state on behalf of xApps (e.g., state of E2 nodes, subscriptions to E2 nodes, etc.). Also, in some embodiments, each datapath thread performs table lookups to send messages to xApps that request data. These threads also handle control requests from xApps towards E2 nodes and forwards back responses to these requests from the E2 node to the xApps.

Each of the datapath threads 2920-2924 communicates with their xApps (e.g., 2950, 2952, or 2954) through SCTP when the xApps are on another host computer, or through shared memory when the xApps are on the same host computer. In some embodiments, the xApp messages have CRC bits to detect corruption. These messages also carry timestamps and can be compressed in some embodiments. Each datapath thread 2920-2924 of some embodiments performs data replication for multiple subscriptions. Each datapath thread 2920-2924 also performs datapath security operations, e.g., by signing, encrypting, and decrypting data messages.

Each control thread 2930-2934 performs several control operations associated with the RIC's datapath as mentioned above. The dRIC 2905 separates the control and datapath threads because the data IO operations need to be fast and should not be slowed down by control operations that can operate at a slower rate. In some embodiments, the control and datapath threads are two threads in a single process (i.e., run in the same shared memory address space).

In some embodiments, each of these threads uses non-blocking, lockless interfaces to communicate with other components in this architecture (e.g., with the RIC SDKs 2960-2964, FCAPS management pod 2980, SDL 2988, and/or E2 nodes 2970-2974) to the extent that they communicate with these other components. Also, in some embodiments, both threads use minimal OS system calls and run as infinite loops.

Each datapath thread and corresponding control thread exchange data over two circular rings 2995 (called cbuf), with one ring handling messages from the datapath thread to the control thread and the other handling messages from the control thread to the datapath thread, according to some embodiments. In some embodiments, the frequency of messages between the two threads can be tuned (e.g., can be configured) to be from sub milliseconds to seconds per ring pair. Through each control thread 2930-2934, each corresponding datapath thread 2920-2924 receives configuration data updates and state changes. The datapath threads 2920-2924 generate statistics, logs, and traces and provide the generated statistics, logs and trace data to their corresponding control thread 2930-2934 for storage in the SDL 2988 and/or to provide to the RMS 2990.

The FCAPS management pod 2980 includes a set of termination interfaces, including an O1 termination interface 2982 connecting the RMS 2990 to the dRIC 2905, and an A1 termination interface 2984 for connecting non-real-time RICs (not shown) to the dRIC 2905. While illustrated as part of the FCAPS pod 2980, the O1 termination interface 2982 and the A1 termination interface 2984 of some embodiments execute in separate pods outside of the FCAPS pod 2980 on the dRIC 2905.

In some embodiments, it is expected that the number of datapath pods (or pod groups) will increase (e.g., as additional E2 nodes establish connections to the dRIC). While decreasing the number of datapath pods is supported in some embodiments, it is not expected that the number of datapath pods will collapse. Pod migration due to server refreshes and recommissioning are also supported, in some embodiments. In some embodiments, pod migration is supported by deleting existing pods and spinning new pods.

The E2 nodes 2970 are divided across the datapath pods 2910-2914. By definition, an E2 node can connect to a single datapath pod or pod group. When E2 nodes are provisioned, they are given the IP address and port information of the datapath pod they will connect to, according to some embodiments. The xApps 2950 of some embodiments are also provided with the IP address and port information of any datapath pod(s) 2910-2914, SDL 2988, and FCAPS pod 2980 they need to connect to. In some embodiments, as datapath pods are scaled out, it is not required to deploy the exact same set of xApps on all datapath pods, although it may be the case. Other functional pods, such as the FCAPS pod 2980, SDL 2988, and LCM 2986 will scale via alternative means (e.g., via a container network system, such as Kubernetes), in some embodiments, and there is no other special handling required.

In some embodiments, there is no inter-datapath pod communication (i.e., the datapath pods 2910-2914 do not communicate with each other). The only entity, in some embodiments, that is aware of all datapath pods and their constituent pods is the RMS 2990 and a deployment manager. In some embodiments, pods that do not require full CPU allocation are placed on the same CPU core. While this is applicable primarily to the LCM 2986 and the A1 interface 2984, pods across the datapath pods 2910-2914 reside on the same CPU, in some embodiments. As a result, the cost of replication is minimized, in some embodiments. However, for real-time pods (e.g., datapath pods, xApps, and SDLs) where latency must be guaranteed, in some embodiments, this is not the case. In some embodiments, pod groups are used to support deployments across datacenters, such as a dRIC in a central data server and other instances at DU locations.

The semantics of datapath pod creation is developed in RMS, in some embodiments, through a user interface (UI) of the RMS. For example, in some embodiments, the RMS UI is a GUI (graphical user interface) through which a user can select a service region/zone, define xApp services for the selected service region/zone, and assign all E2 nodes in the region/zone to a datapath pod for the selected region/zone. In some embodiments, xApp service templates are constructed to assist with assigning E2 nodes to datapath pods. For example, in some embodiments, a service template includes a group of xApps, their scale, and their configuration with regard to a datapath pod, and the service template is applied to a group of E2 nodes.

In some embodiments, the view is limited to one or a set of datapath pods or pod groups due to associated RBAC implications. Additionally, some embodiments provide system-level views where data for all E2 nodes and xApps is presented together. It is possible, in some embodiments, to configure individual pod groups and/or apply a configuration across all pod groups. In embodiments where blue/green deployments are supported, blue/green upgrades of pods is also supported. Also, deconstruction and reconstruction of pods is supported, in some embodiments, and done by adding or deleting pods.

Because it may be inadequate, in some embodiments, to identify pod groups by pod names from a pod management point of view, some embodiments use the same dRIC instance identifier across all datapath pod instances. In some embodiments, both the pod names and the dRIC instance identifier are used for all datapath pod instances to identify the individual datapath pod instances. In some embodiments, because of the increased scale of the datapath pods, the RMS is also scaled up to manage Nx the current scale.

In some embodiments, because horizontal scaling divides the E2 nodes connected to the dRIC 2905 and the xApps connected to the dRIC 2905 into separate pod groups (i.e., based on the datapath pod to which the E2 node or xApp is connected), the failure domain is reduced to a smaller instance. Additionally, horizontal scaling allows an operator to segment the datapath pod in accordance with their network topology, such as by assigning E2 nodes in a particular region to a single dRIC instance.

It should be noted that although several dRICs are described above and below as being implemented with pods, the dRICs in other embodiments employ VMs (virtual machines) to implement the RIC components. Moreover, even in the embodiments that implement the different RIC components with pods, some or all of the pods operate on VMs, such as lightweight VMs (e.g., Photon VMs provided by VMware, Inc.).

FIG. 30 conceptually illustrates a process 3000 performed in some embodiments to horizontally scale datapath pods of a dRIC. The process 3000 will be described with references to the diagram 2900. The process 3000 starts by using (at 3010) a first datapath pod of the dRIC to forward communications (e.g., data messages) between xApps of the dRIC and a first set of E2 nodes connected to the dRIC. For instance, the datapath pod 2910 forwards communications between the xApps 2950 and the E2 nodes 2970.

The process 3000 determines (at 3020) that a second set of E2 nodes have connected to the dRIC. For example, multiple sets of E2 nodes 2970-2974 are connected to the dRIC 2905. While the dRIC 2905 includes multiple datapath pods 2910-2914, other dRICs of other embodiments can include a single datapath pod that forwards communications between all connected xApps and E2 nodes.

The process 3000 determines (at 3030) whether the first datapath pod has sufficient capacity to forward communications between the xApps and both the first and second sets of E2 nodes. In some embodiments, each datapath pod has a limit on the number of E2 nodes for which the datapath pod can handle traffic. When the first datapath pod has sufficient capacity to forward communications between the xApps and both the first and second sets of E2 nodes, the process 3000 transitions to use (at 3040) the first datapath pod to forward communications between the xApps and both the first and second sets of E2 nodes.

As will be further described below, a datapath pod of some embodiments can be vertically scaled to increase the number of datapath threads of the datapath pod to handle increased amounts of traffic through the datapath pod. As such, in some embodiments, the first datapath pod is able to forward traffic for both sets of E2 nodes due to previously having been vertically scaled, or due to vertical scaling in response to the newly connected E2 nodes. Following 3040, the process 3000 ends.

When the first datapath pod does not have sufficient capacity to forward communications between the xApps and both the first and second sets of E2 nodes, the process 3000 transitions to instantiate (at 3050) at least a second datapath pod on the dRIC. The second datapath pod, in some embodiments, is a second instance of the first datapath pod. In some embodiments, instantiating the second datapath pod instance includes also instantiating additional instances of the xApps connected to the first datapath pod. In some embodiments, as will be further described below, the xApps are connected to a single datapath pod, while in other embodiments, each xApp is connected to each datapath pod such that the xApps and datapath pods of a dRIC are in a full mesh.

The process 3000 then assigns (at 3060) the second set of E2 nodes to the second datapath pod for communicating with the xApps of the dRIC. In some embodiments, the second set of E2 nodes are automatically assigned to the second datapath pod (e.g., based on configurations of the dRIC), while in other embodiments, the E2 nodes are manually assigned (e.g., by an operator). As described above, xApp service templates are constructed in some embodiments to assist with assigning E2 nodes to datapath pods. In some embodiments, an E2 node load distributor pod (e.g., a load balancer) is instantiated on the dRIC and used to assign connected E2 nodes to datapath pods of the dRIC. Additional details regarding such an E2 node load distributor pod will be further described below. Following 3060, the process 3000 ends.

In addition to horizontal scaling, some embodiments also use vertical scaling to increase the number of datapath threads per datapath pods such that each datapath pod includes N number of datapath threads and one control thread for configuring the N number of datapath threads. The multiple datapath threads of the datapath pod share the load for the datapath processing of the datapath. In some embodiments, horizontal scaling is performed after a datapath pod is vertically scaled such that each additional instance of the datapath pod includes the same N number of datapath threads as the initial datapath pod.

Figure 31:
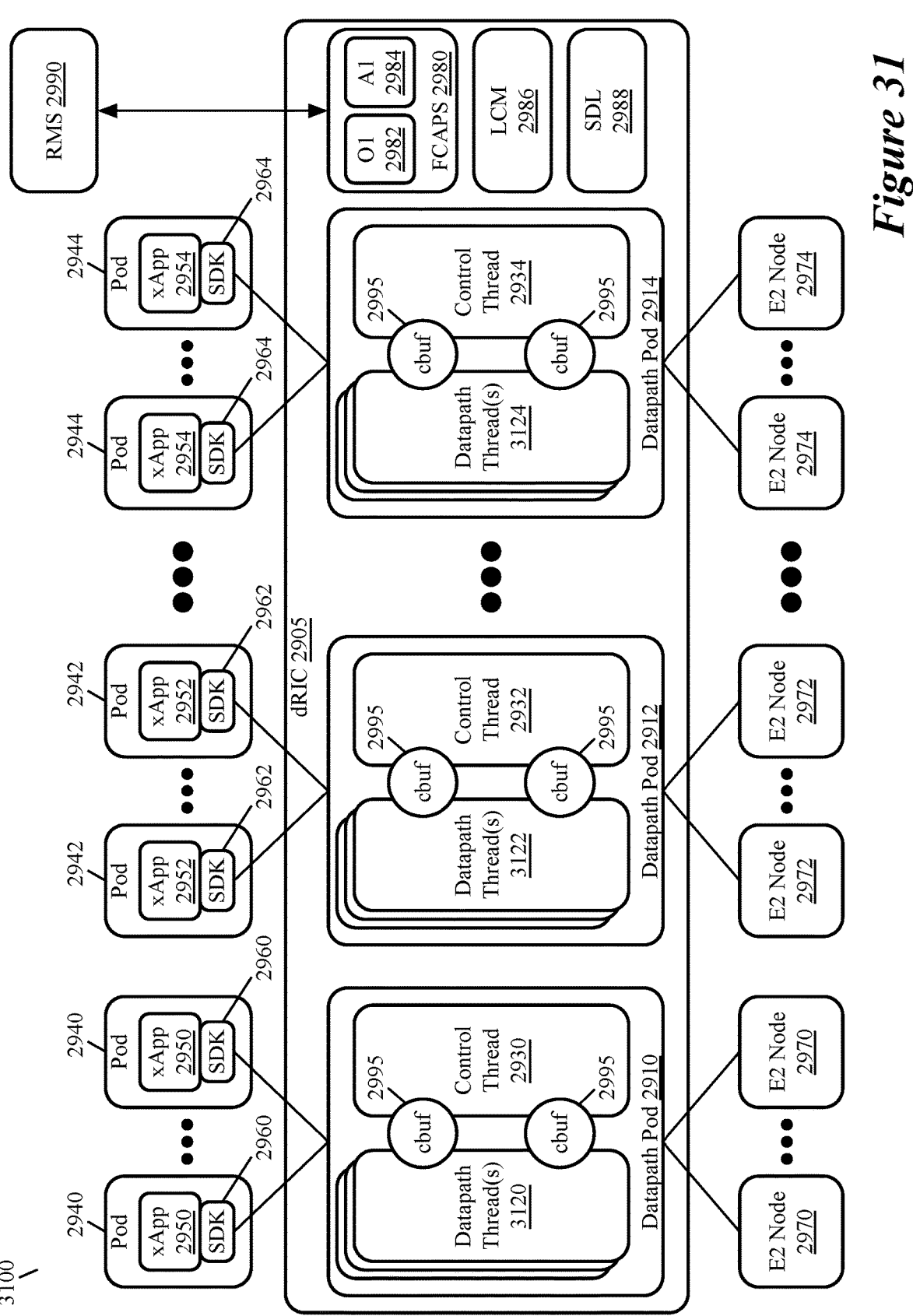
FIG. 31 conceptually illustrates an architecture diagram that includes the dRIC after vertical scaling of the datapath pods, in some embodiments.

FIG. 31 conceptually illustrates an architecture diagram 3100 that includes the dRIC 2905 after vertical scaling of the datapath pods, in some embodiments. The diagram 3100 includes the dRIC 2905, the RMS 2990, and multiple E2 nodes 2970-2974. The dRIC 2905 includes the datapath pods 2910-2914, the FCAPS management pod 2980, the LCM pod 2986, and the SDL 2988. The multiple xApps 2950-2954 execute respectively on the pods 2940-2944 and communicate with the dRIC 2905 through their respective RIC SDKs 2960-2964 executing on the pods 2940-2944.

Each of the datapath pods 2910-2914 in the diagram 3100 now include multiple datapath threads 3120, 3122, and 3124. In some embodiments, each datapath pod 2910-2914 includes the same number of datapath threads 3120-3124, while in other embodiments, the number of datapath threads 3120-3124 differs from datapath pod to datapath pod. The control threads 2930-2934 each configure their respective set of datapath threads 3120-3124. By increasing the number of datapath threads for each datapath pod while retaining a single control thread for each datapath pod, the dRIC 2905 is able to increase its data plane processing capacity while limiting the number of cores burned by the increased capacity (i.e., as additional cores for additional control threads are not needed).

More specifically, a vertically scaled dRIC datapath pod (e.g., 2910, 2912, or 2914) uses allocated cores more efficiently, in some embodiments, and common services, such as control, timer, and security services are instantiated once, rather than being replicated with every instance of the datapath thread. Also, in some embodiments, a vertically scaled datapath pod is able to handle a larger number of E2 nodes and xApps, by a factor of 4× to 5× in a single instance, thereby achieving consistent application of policies, such as conflict management policies.

As illustrated by the diagram 3100, the vertical and horizontal scaling strategies are not mutually exclusive. Using the best of both scaling mechanisms, a single instance of dRIC can be scaled vertically while also supporting horizontal scaling, in some embodiments. Depending on the deployment scenario, some embodiments flexibly allocate more cores to a single datapath pod instance to scale vertically, or to spin up more instances of datapath pods to scale horizontally. As mentioned above, it is not required that all datapath pods are scaled equally to the same vertical scale level, according to some embodiments.

Figure 32:
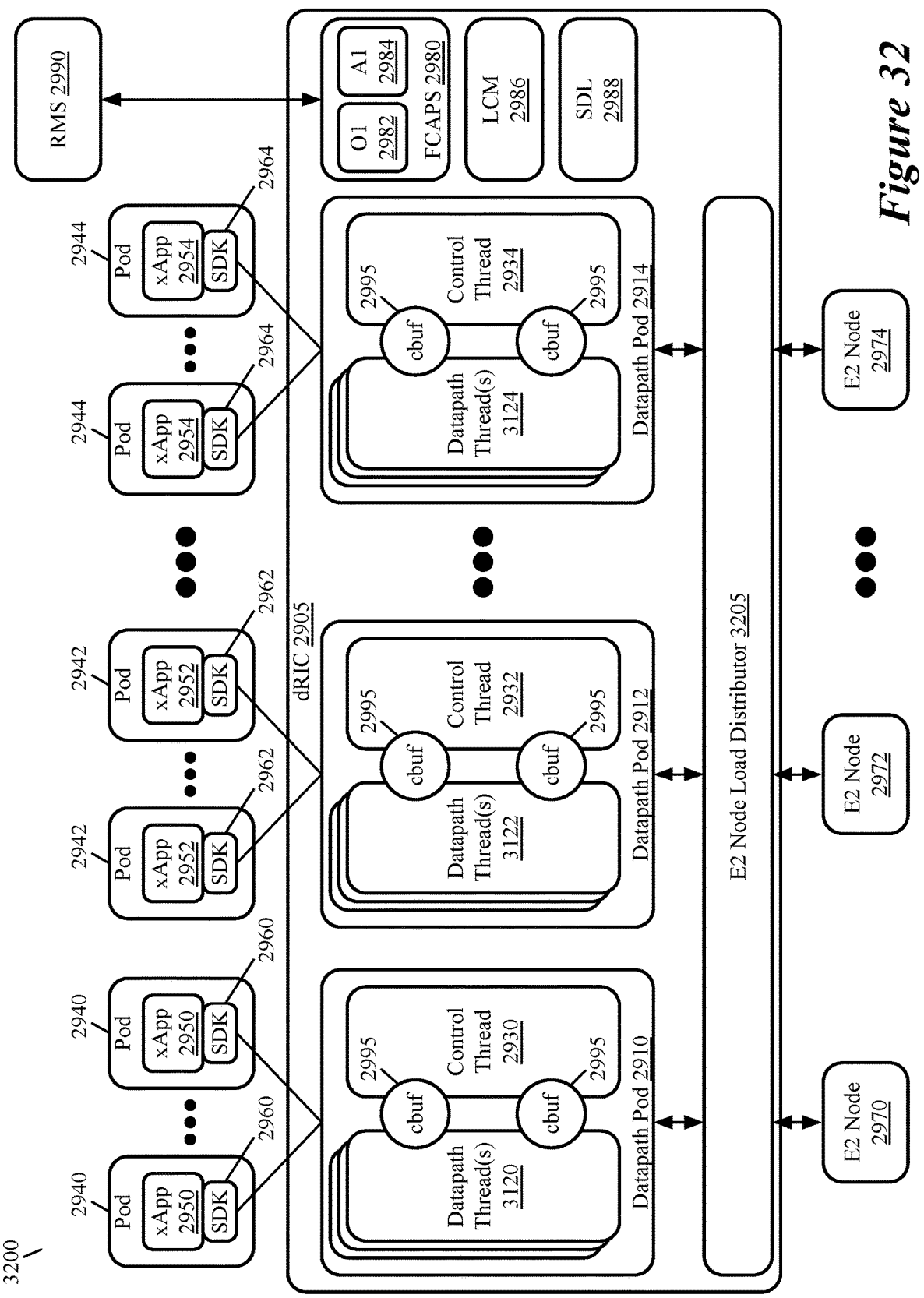
FIG. 32 conceptually illustrates an architecture diagram in which an E2 node load distributor has been instantiated on the dRIC as an interface endpoint for E2 nodes connecting to the dRIC.

As the datapath pods are vertically and/or horizontally scaled, some embodiments provide means such that a single dRIC interface endpoint is exposed for E2 nodes to connect to. For example, FIG. 32 conceptually illustrates an architecture diagram 3200 in which an E2 node load distributor has been instantiated on the dRIC 2905 as an interface endpoint for E2 nodes connecting to the dRIC. The diagram 3200 includes the dRIC 2905, the RMS 2990, and multiple E2 nodes 2970, 2972, and 2974.

In addition to the datapath pods 2910-2914, the FCAPS management pod 2980, the LCM pod 2986, and the SDL 2988, the dRIC 2905 also includes an E2 node load distributor 3205. In some embodiments, the E2 node load distributor 3205 is implemented by one or more pods. In other embodiments, VMs implement the E2 node load distributor 3205. By instantiating the E2 node load distributor 3205, some embodiments enable E2 nodes to be provisioned with one SCTP/IP address while the dRIC instance scales (e.g., horizontally and/or vertically). Associated CUs and DUs, however, still need to be placed together such that conflict management, SDL data, upgrades, etc., can be done together in one unit, in some embodiments.

The E2 node load distributor 3205 of some embodiments automatically assigns E2 nodes to the datapath pods 2910-2914. An operator, in some embodiments, can override the automatic assigning performed by the E2 node load distributor 3205 via explicit configuration or by downloading enough information that the load distributor 3205 can determine the sets of CUs and associated DUs. In some embodiments, because the E2 node load distributor 3205 adds an additional hop between the datapath pods 2910-2914 and the E2 nodes 2970-2974, the horizontal scale of pod groups is reduced. Vertical scaling is used, in some embodiments, to make up for the reduction in horizontal scaling.

Because the E2 node load distributor 3205 assigns E2 nodes to datapath pods, there is no information sharing between the datapath pods, according to some embodiments. In embodiments where a datapath pod is deployed close to a DU, the E2 node load distributor 3205 is not deployed. The baseline scale of the E2 node load distributor 3205 (i.e., 1 core for datapath thread, and 1 core for control thread and timer thread), in some embodiments, is two-to-three times that of a datapath pod. In other words, a single load distributor IO thread is able to handle two-to-three times the amount of traffic of datapath pods.

Depending on the number of xApps and their requested load, the amount of traffic handled by a single load distributor IO thread varies, in some embodiments. Each core addition, in some embodiments, adds another two-to-three times the capacity. Current scale of a datapath pod with one data processing core is 10 CUs plus 100 DUs, or 110 E2 nodes altogether, with a couple of xApps, energy savings, and VONR, according to some embodiments. Core allocation for the E2 node load distributor 3205, in some embodiments, is based on expected eventual load and is performed at the start (i.e., as opposed to a pay-as-you-grow model).

Figure 33:
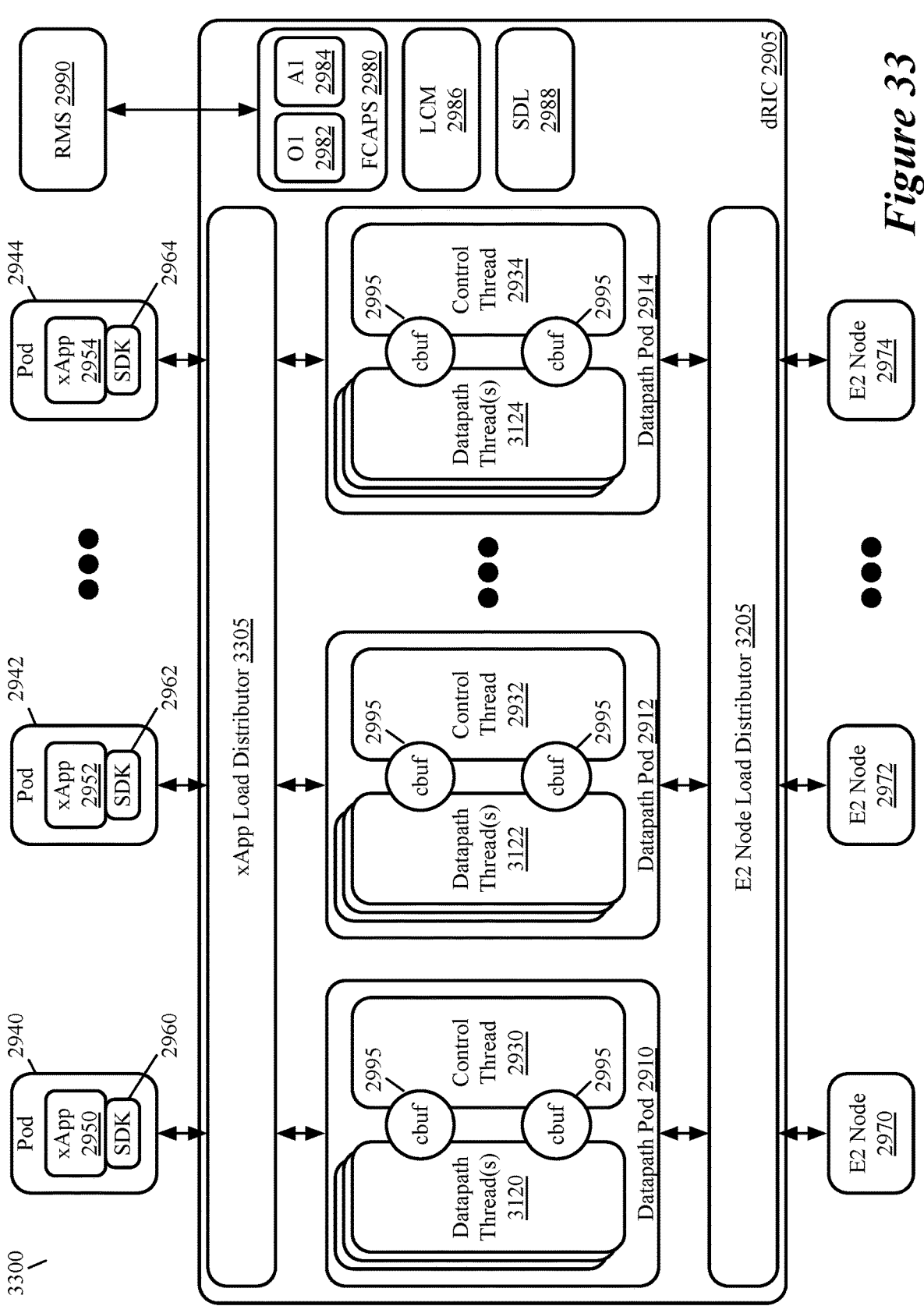
FIG. 33 conceptually illustrates an architecture diagram of some embodiments in which an xApp load distributor has been instantiated on the dRIC in addition to the E2 node load distributor.

In some embodiments, an xApp load distributor is instantiated on a dRIC along with the E2 node load distributor to enable each xApp to communicate with any of the E2 nodes through any of the datapath pods of the dRIC, regardless of the pod group to which the xApp belongs. FIG. 33 conceptually illustrates an architecture diagram 3300 of some embodiments in which an xApp load distributor has been instantiated on the dRIC 2905 in addition to the E2 node load distributor 3205.

In the diagram 3300, each of the pods 2940-2944 executing an xApp 2950-2954 connects to the xApp load distributor 3305 instantiated north of the datapath pods 2910-2914, as opposed to each pod 2940-2944 connecting directly to a datapath pod 2910-2914 belonging to the same pod group as the pod 2940-2944. As a result, a single instance of an xApp is able to interact with any E2 node or set of E2 nodes in the system that has established a connection with the E2 node load distributor 3205.

In some embodiments, a set of one or more E2 nodes 2970-2974 with which an xApp instance is allowed to interact is configured. As will be described further below, in some embodiments, access control lists are defined through the RMS 2990 and pushed to the datapath pods 2910-2914 (i.e., through the O1 interface 2982 and FCAPS 2980) for enforcement. The access control lists, in some embodiments, specify, for each xApp, one or more E2 nodes with which the xApp is allowed to communicate.

In some embodiments, access control lists are also defined to limit xApp access to the SDL 2988. For instance, in some embodiments, an access control list is defined such that data associated with a first xApp cannot be accessed by any other xApps. In another example, access control lists are used to limit access to a subset of data associated with a first xApp to a subset of xApps, while making all other data associated with the first xApp accessible to all other xApps. In some embodiments, access to data associated with E2 nodes and stored in the SDL 2988 is also limited through access control lists. For instance, an access control list can be defined to limit access to data associated with a particular subset of E2 nodes to xApps that are allowed to communicate with the particular subset of E2 nodes.

In addition to limiting which xApps can access which data stored in the SDL, the access control lists can be used to specify which xApps have read and/or write permissions for data stored in the SDL. The access control lists of some embodiments can allow a first xApp, for example, read and write permissions for data associated with a second xApp, while only allowing read permissions for the data associated with the second xApp for all other xApps. In another example, the access control lists can be defined to give read and write access permissions for data associated with a particular E2 node to xApps that are also allowed to communicate with the particular E2 node, while also only giving read access for the data associated with the particular E2 node to the xApps that are not allowed to communicate with the particular E2 node.

In some embodiments, if a single instance of an xApp is unable to scale to large numbers of E2 nodes, alternate xApp instances are deployed. These alternate xApp instances, in some embodiments, are duplicates of the single instance of the xApp, while in other embodiments, the alternate xApp instances are instances of a different xApp or xApps (i.e., have different configurations than the single instance of the xApp). Additionally, because the xApp load distributor 3305 adds another hop between the xApps 2950-2954 and E2 nodes 2970-2974, the horizontal scaling of the datapath pods 2910-2914 of some embodiments is reduced.

In some embodiments, the assignment of E2 nodes 2970-2974 to datapath pods 2910-2914 is automatic or manual (i.e., place associated CUs and DUs on the same datapath pod). As also mentioned above, there is no information sharing between different datapath pods 2910-2914 (e.g., datapath pod 2910 does not communicate with datapath pod 2912).

The xApp load distributor 3305 provides a single connection endpoint to all xApps 2950-2954 (i.e., through the SDKs 2960-2964). In some embodiments, the xApps 2950-2954 are unaware of the number of datapath pods 2910-2914 behind the xApp load distributor 3305. The xApp load distributor 3305 of some embodiments supports xApps built using an SDK (e.g., SDKs 2960-2964) as well as xApps built using other means, such as O-RAN enablement APIs.

Figure 34:
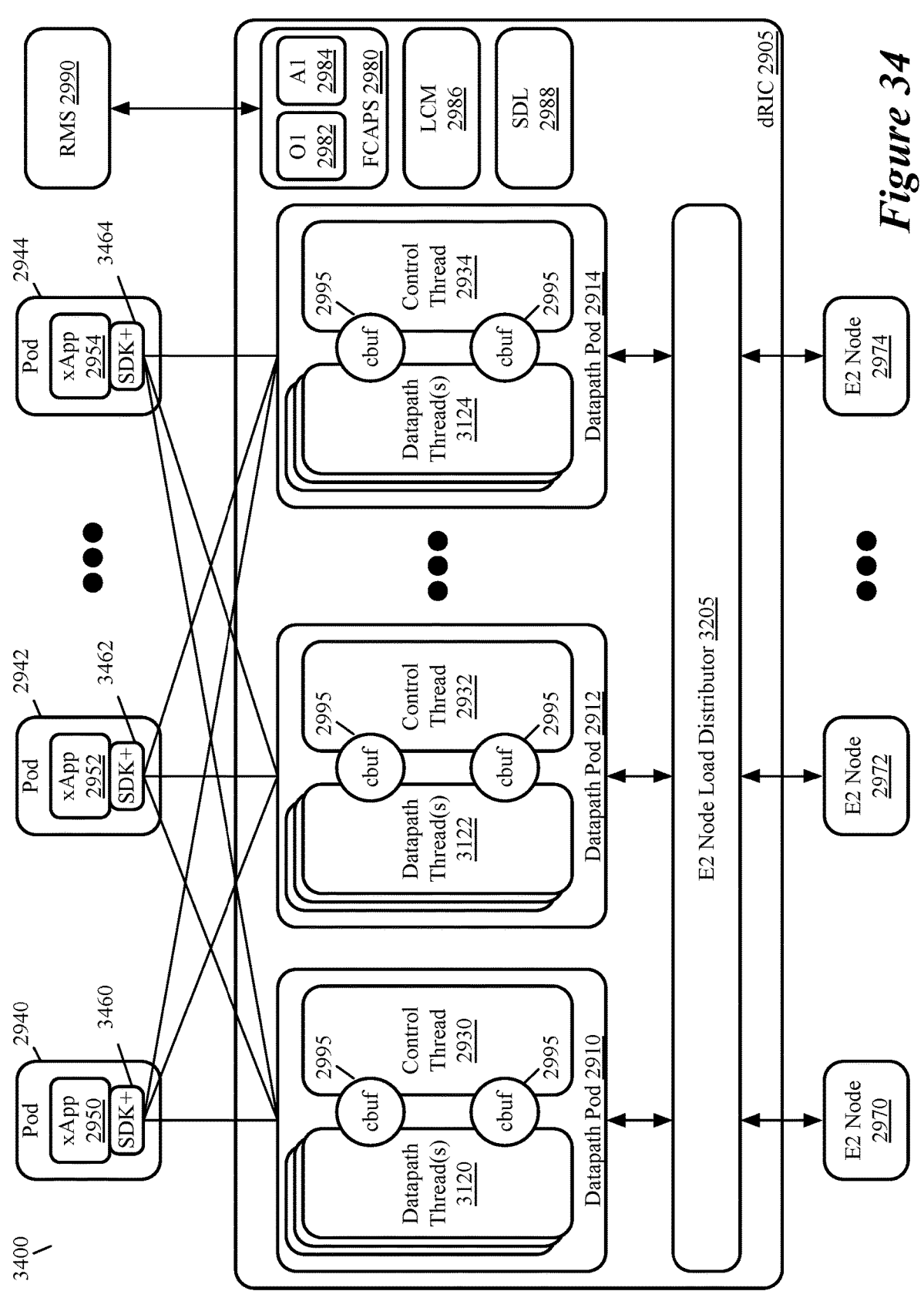
FIG. 34 conceptually illustrates an architecture diagram of some embodiments in which such enhanced SDKs are utilized in lieu of an xApp load distributor.

In some embodiments, as an alternative to the xApp load distributor 3305, xApps are integrated with enhanced SDKs that allow each xApp to connect to multiple datapath pods through the enhanced SDK. For example, FIG. 34 conceptually illustrates an architecture diagram 3400 of some embodiments in which such enhanced SDKs are utilized in lieu of an xApp load distributor. The diagram 3400 includes the dRIC 2905, RMS 2990, and multiple E2 nodes 2970-2974.

The SDKs 3460, 3462, and 3464 are enhanced SDKs (denoted in the diagram as "SDK+"). The enhancement to these SDKs allows each SDK 3460-3464 to handle multiple connections (e.g., SCTP connections) to each datapath pod 2910-2914. Accordingly, each of the pods 2940-2944 executing an xApp 2950-2954 is connected to each of the datapath pods 2910-2914 via the enhanced SDKs 3460-3464 such that the pods 2940-2944 are in a full mesh with the datapath pods 2910-2914.

Each enhanced SDK 3460-3464 learns which E2 nodes 2970-2974 are assigned to which datapath pods 2910-2914 via connection messages sent to the SDKs 3460-3464 by the datapath pods 2910-2914 (i.e., based on assignments by the E2 node load distributor 3205). Based on these connection messages, the SDKs 3460-3464 route xApp traffic on the appropriate datapath pods 2910-2914.

In some embodiments, there is no limit on xApp replication and as such, multiple replicas of the same xApp can be created. The number of xApps instantiated, in some embodiments, is determined based on the number of E2 nodes expected to connect to the dRIC to ensure there are enough xApps to handle all of the expected E2 nodes. When the datapath pods 2910-2914 are scaled, connection information is dynamically configured, according to some embodiments.

As mentioned above, when large numbers of E2 nodes and xApps are connected to the same dRIC, some embodiments implement access control measures to limit which E2 nodes are accessible to each xApp. For example, when a particular dRIC instance has a large number of E2 nodes connected, a single instance of an xApp may not be able to handle all the traffic from all of the connected E2 nodes. As such, it is desirable, in some embodiments, to have multiple instances of the same xApp, each having access to a subset of the E2 nodes.

In some embodiments, each E2 node connected to a dRIC performs a set of one or more RAN functions. As such, in addition to limiting the number of E2 nodes available to each xApp, some embodiments also limit RAN function access for each xApp, as well as xApp service access. That is, in some embodiments, an xApp is limited to receiving indications from a particular RAN function of an E2 node to which the xApp is allowed access, while being barred from accessing any control functions with regard to the particular RAN function.

By segregating the E2 nodes an xApp is allowed to access, a first level of conflict management can be achieved, in some embodiments. For example, a first xApp can be allowed to access control functions of a particular RAN function of a particular E2 node, while a second xApp is only allowed to receive indications from that same RAN function of the particular E2 node. In some embodiments, access profiles are generated that each include a set of rules that define access to E2 nodes and their RAN functions. Any number of access profiles can be defined in a system, according to some embodiments.

Each access profile, in some embodiments, includes a unique identifier associated with the access profile, a unique name associated with the access profile, and a set of access permissions. In some embodiments, the set of access permissions define operations an xApp is allowed to perform on RAN functions for which access by the xApp is allowed.

As mentioned above, some embodiments of the invention provide a method for performing trace operations based on trace specifications received as part of user-defined trace requests. The trace requests, in some embodiments, are used to collect state data associated with a dRIC that operates as an interface between an E2 node and xApp connected to the dRIC. The state data collected and learned from the trace operations of some embodiments includes state data such as the number of E2 nodes and/or xApps provisioned and connected to the dRIC, subscription information that details which xApps are subscribed to which E2 nodes, control request information that details, e.g., how many outstanding control requests are associated with a particular xApp and/or E2 node, etc. As illustrated in FIG. 15, the datapath pod of some embodiments performs a trace operation that is facilitated through the trace transport of the control thread 1509 and the trace generation of the datapath thread 1507. The trace operation of the datapath pod will now be described in further detail.

Figure 35:
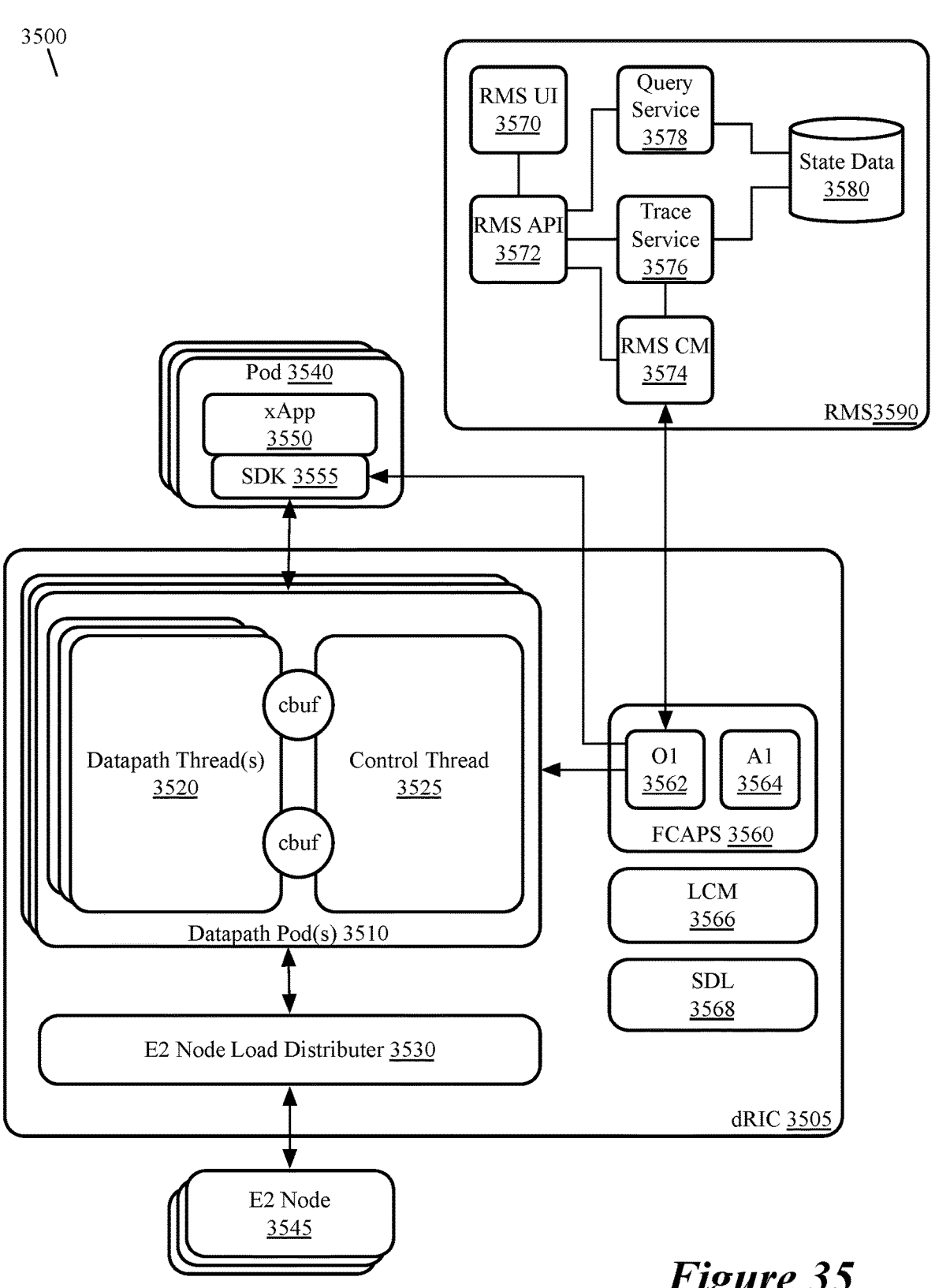
FIG. 35 conceptually illustrates a functional block diagram of a RAN system of some embodiments that accepts and performs trace requests associated with a dRIC operating in the RAN system.

FIG. 35 conceptually illustrates a functional block diagram 3500 of a RAN system of some embodiments that accepts and performs trace requests associated with a dRIC operating in the RAN system. As shown, the diagram 3500 includes an RMS 3590 and a dRIC 3505 that operates as a controller for communications exchanged between xApps 3550 and E2 nodes 3545 connected to the dRIC 3505. The xApps 3550 execute on pods 3540 along with SDKs 3555 that serve as interfaces between the xApps 3550 and elements of the RAN (e.g., the dRIC 3505).

The dRIC 3505 includes an FCAPS management pod 3560, LCM pod 3566, SDL 3568, multiple datapath pods 3510, and E2 node load distributer 3530. Each datapath pod 3510 includes one or more datapath threads 3520 as well as a control thread 3525 for managing the datapath threads. Additionally, the FCAPS management pod 3560 includes the O1 interface 3562 for communicating with the RMS 3590 and an A1 interface 3564, as shown. The RMS 3590 in this example includes an RMS UI 3570, RMS API 3572, RMS CM 3574, trace service 3576, query service 3578, and state data storage 3580.

The dRIC platform has long lived sessions between xApps and E2 nodes, and the state information between these continuously goes through state changes as transactions occur. The system loses older log files, in some embodiments, as new logs are started and the logfiles rotate. It is desirable, in some embodiments, to have the ability to glean the current state of the dRIC platform.

The state of the dRIC system has several components. Examples of these components, in some embodiments, include which E2 nodes are provisioned/connected, which xApps are provisioned/connected, xApp subscription information (e.g., subscription count and other related subscription information), control request information (e.g., details regarding control requests, and information regarding which control requests are outstanding), information regarding outstanding timers, the E2 nodes to which an xApp has outstanding transactions, the xApps to which each E2 node is serving indications, and horizontal scaling information (e.g., how E2 nodes and xApps are distributed across load distributor IO threads). In some embodiments, components are logically grouped to make it easier to specify typical paths of a transaction through multiple internal components.

In some embodiments, a dRIC encounters situations where detailed state machine transitions or trace packet sequences from E2 nodes and/or xApps need to be collected in the order they arrive. Also, in some embodiments, a dRIC encounters situations in which further details regarding a particular xApp or E2 node, or a conversation between an xApp and E2 node, are needed in order to determine how states are changing. Each of this situations are satisfied, in some embodiments, with more detailed information collected via tracing operations. Tracing functionality is used by any component in the dRIC platform, as will be further described below.

Because the dRIC is a repository of events, some or all of the state data that is collected during a trace operation includes event data, in some embodiments. For example, in some embodiments, some of the states that are traced as part of a trace operation are associated with events of the overall RAN (e.g., a state of events occurring in an O-RAN system), and thus the trace operation traces and collects this state-related event data. Each time an E2 node connects to the dRIC platform, for instance, an event is generated in some embodiments to indicate either a successful E2 node setup, or a failed E2 node setup, and the event information (e.g., a state of the event) is collected as part of the trace operation (e.g., in addition to other state information that is not included in the event information).

The RMS UI 3570 and/or RMS API 3572 receive user-defined trace requests, in some embodiments. Each trace request, in some embodiments, includes a tracing specification that defines E2AP messages of interest and/or components of interest. For instance, in some embodiments, a tracing specification is defined for a certain type of E2AP messages sent to and/or from a particular E2 node. In some embodiments, tracing specifications are also specified for other Pods and components on the dRIC, such as the O1, A1, and SDL pods, as well as E2 node and/or xApp load distributors to enable system-wide visibility across pods.

In some embodiments, because extracting and formatting state collected during tracing is compute intensive, enabling tracing impacts latency of all transactions. As such, in order to limit degradation of latency, tracing is limited in some embodiments to a single xApp and/or a single E2 node in a tracing configuration. However, users are able to specify multiple tracing configurations, one by one, in some embodiments. Users are also able to specify the duration of the trace (e.g., by specifying an amount of time in seconds for which tracing is enabled), according to some embodiments.

Users can define as many instances of a trace specification configuration snippet as desired, enabling traces for a set of components. The component name is exactly the string defined to create the component in logger.[h,c] (e.g., a logging library), in some embodiments. In the RMS UI 3570, components are aggregated to enable trace on an E2AP message basis, and a user does not have to specify components as defined in the code, in some embodiments. Rather, the RMS UI 3570 allows users to specify an intent of tracing particular E2AP messages. Within the RMS 3590, the user intent is translated to the set of components relevant for the E2AP message(s) specified in the request. For example, in some embodiments, a trace specification includes either only an E2 node identifier or only an xApp identifier. In some such embodiments, the traces are specified for E2T services, and are applied to any Pod in the system, as long as the components are specified.

After receiving a trace request, the RMS UI 3570 directs the RMS API 3572 to provide the trace request to the trace service 3576. The trace service 3576 processes the trace request and provides the processed trace request, which includes the tracing specification, to the RMS CM 3574 for the RMS CM 3574 to send to the dRIC 3505 in order to initiate a trace operation as per the tracing specification defined in the trace request. Specifically, the RMS CM 3574 sends the trace request to the FCAPS management pod 3560 via the O1 interface 3562 of the FCAPS management pod 3560.

The FCAPS management pod 3560 of some embodiments provides the tracing specification to the control thread 3525 of the datapath pod 3510, which initiates the tracing operation by directing datapath threads 3520 to generate trace data for the E2AP messages specified by the tracing specification (e.g., by injecting a trace message formatted according to the message type specified in the tracing specification), according to some embodiments. In some embodiments, sets of code are added to various places where state is manipulated as trace triggers. When a trace is initiated and one of the trace triggers is triggered, information relevant to the trace trigger is then collected. The information is collected, in some embodiments, in a human-readable format. In some embodiments, certain information that is relevant to the trace trigger and that is not in a human-readable format, such as raw packet dumps, is collected as a sequence of bytes. This sequence of bytes includes metadata that is attached to identify the data, in some embodiments.

The trace information collected during the tracing operation includes information associated with the E2 node 3545 specified in the tracing specification (e.g., a global identifier, timestamp(s), an E2AP message (i.e., sent to/from the E2 node), message data that is specific to the message, and E2AP state transitions), as well as information associated with an xApp specified in the tracing specification or determined to be an xApp of interest based on other information from the tracing specification (e.g., a global identifier, a timestamp, an E2AP message (i.e., sent to/from the E2 node), message data that is specific to the message, and E2AP state transitions).

In some embodiments, the trace information is collected in a human-readable format. Also, in some embodiments, certain information that is relevant to the trace trigger and that is not in a human-readable format is collected as a sequence of bytes, such as when the information includes raw packet dumps. This sequence of bytes includes metadata that is attached to identify the data, in some embodiments. Examples of this metadata in some embodiments includes such as an E2 node identifier, xApp identifier, timestamp, transaction type, error information (as applicable), and/or any other deep information. In some embodiments, the collected data also includes the state of internal data structures that hold stateful information.

In some embodiments, there are no limits to the information collected by a trace message. While log messages contain relatively specific information to a particular log message, trace messages typically contain much more context information to make the internals of state machine information visible, in some embodiments. For example, in some embodiments, certain information is never logged, such as the details of subscriptions active on an E2 node for an xApp, but is exposed in trace messages. Trace information of some embodiments also includes configuration and timer expirations, as these also trigger E2AP state transitions.

The trace data collected during the tracing operation is then provided back to the FCAPS management pod 3560, in some embodiments, which then provides the trace data to the RMS CM 3574 of the RMS 3590. The RMS CM 3574 of some embodiments provides the trace data to the trace service 3576. In some embodiments, the trace service 3576 processes the trace data to generate sets of state data associated with the dRIC 3505, and stores the sets of state data in the state data storage 3580. In addition to generating and storing the sets of state data, the trace service 3576 of some embodiments also generates a trace report that details the processed trace data, and provides this generated report to the RMS UI 3570 via the RMS API 3572 for display. The generated trace report, in some embodiments, is a snapshot file that includes configuration and current state data, metrics, other trace information, etc., that is displayed through the RMS UI 3570 or made available for offline review by a user.

The stored state data in the storage 3580 is retrieved, in some embodiments, by the query service 3578. More specifically, in some embodiments, the query service 3578 is invoked through query commands received from the RMS API 3572 or RMS UI 3570 (e.g., from a user that desires to view various states in the system). In response to the query commands, the query service 3578 retrieves the queried state data from the storage 3580, and provides the retrieved state data to the RMS UI 3570 via the RMS API 3572 for display (e.g., to be viewed by a user).

The query commands of some embodiments are constructed with an expandable and reusable lexical dictionary, and are constructed to limit information in usable and consumable chunks. Examples of query commands, in some embodiments, include "E2 node info [id][detail]" for obtaining information regarding a particular E2 node, "xapp info [id][detail]" for obtaining information regarding a particular xApp, "xapp subscription [subscription id][detail]" for obtaining subscription information for a particular xApp, "E2 node <id> component configuration" for obtaining configuration data for a particular E2 node, "E2 node <id> e2setup info" for obtaining setup data for a particular E2 node, "xapp <id> configuration" for obtaining configuration data for a particular xApp, and "E2 node <id> configuration". In some embodiments, the query commands are also used to query state information associated with the SDKs. Also, as tracing specifications are defined, in some embodiments, for other pods of the dRIC (e.g., O1, A1, and SDL pods), the query commands of some embodiments also include query commands for querying state data associated with these other pods, thus providing users with system-wide visibility across pods.

The query service, in some embodiments, services one outstanding query at a time. For instance, a user can invoke the query service 3578 through multiple query commands associated with multiple state components of the dRIC 3505, and the query service 3578 responds to the multiple query commands one at a time as the query commands are received. In some embodiments, the query service 3578 includes a buffer (not shown), and the RMS API 3572 adds query commands to the buffer as they are received, and the query service 3578 retrieves the query commands from the buffer in the order they are placed, and responds accordingly.

In some embodiments, the query commands mentioned above also specify tracing for E2T services. Such query commands can be applied to any Pod (e.g., datapath pod) in the system as long as the query commands specify the components of interest. It should be noted that query commands (e.g., to query the current state of the dRIC platform) are compute intensive and impact latency of regular transactions for the duration of the command, in some embodiments.

FIG. 36 illustrates a process 3600 performed in some embodiments to perform a tracing operation. The process 3600 will be described below with references to the diagram 3500 of FIG. 35. The process 3600 is performed, in some embodiments, by components of a dRIC, such as an FCAPS management pod and datapath pods of the dRIC. The process 3600 starts when the process receives (at 3610), from an RMS that manages the dRIC, a trace request that includes a tracing specification for performing a trace operation for a subset of messages exchanged between an E2 node and an xApp via the dRIC that operates as an interface between the E2 node and the xApp in order to collect state data associated with the dRIC.

For instance, as described above, when a user initiates a trace request through the RMS UI 3570 or RMS API 3572, the trace request is provided to the trace service 3576 of the RMS 3590. The trace service 3576 processes the trace request, in some embodiments, to identify the specific components of interest for the tracing operation based on the user's intent and E2AP message type(s) specified (i.e., when the tracing specification does not specify said component(s)) and provides the trace request with the tracing specification to the RMS CM 3574, which then sends the trace request to the FCAPS management pod 3560 of the dRIC 3505. The FCAPS management pod 3560 processes the trace request and directs a datapath pod 3510 to perform the trace operation as per the tracing specification.

Based on the tracing specification, the process 3600 performs (at 3620) the trace operation for the subset of messages. The subset of messages, in some embodiments, include a specific type of E2AP messages sent to or from an E2 node connected to the dRIC. For example, in some embodiments, a tracing specification is defined for tracing E2Setup messages sent to and from a particular E2 node. The trace operation is initiated by a datapath pod of the dRIC (e.g., the datapath and control threads of the datapath pod), in some embodiments.

The process 3600 collects (at 3630) trace information during the trace operation and provides (at 3640) the collected trace information to the RMS for processing. For example, the datapath pod 3510 of some embodiments collects trace information during the trace operation, and provides the collected trace information to the FCAPS management pod 3560. Once the trace operation has run to completion, the FCAPS management pod 3560 then provides the collected trace information to the RMS CM 3574 of the RMS 3590 for processing by components of the RMS 3590. Following 3640, the process 3600 ends.

FIG. 37 illustrates a process 3700 performed in some embodiments by an RMS that manages at least one dRIC in a RAN in response to a user-defined trace request received by the RMS. The process 3700 will also be described with references to the diagram 3500 of FIG. 35. The process 3700 starts when the process receives (at 3710) a user-defined trace request that includes a tracing specification that defines a trace operation to be performed to collect state data associated with a particular dRIC managed by the RMS. The trace request is received, in some embodiments, via the RMS UI or RMS API. For instance, the RMS 3590 includes both the RMS UI 3570 and RMS API 3572.

The process 3700 processes (at 3720) the trace request and provides (at 3730) the trace request to the dRIC to direct the dRIC to perform the trace operation as per the tracing specification included in the trace request. In some embodiments, the RMS processes the trace request to determine any components of interest for which trace information should be collected during the trace operation when such components are not specified in the tracing specification. For example, in some embodiments, the tracing specification specifies a particular E2 node and/or xApp and a type of E2AP message of interest (e.g., subscription requests). The RMS then provides the processed request to the dRIC to perform the trace operation.

For example, when the RMS UI 3570 of the RMS 3590 receives a trace request, the RMS UI 3570 provides the trace request to the RMS API 3572, which subsequently provides the trace request to the trace service 3576 for processing. The trace service 3576 processes the trace request and provides the processed trace request to the RMS CM 3574 for sending to the dRIC 3505. The RMS CM 3574 then sends the trace request to the dRIC 3505 to direct the dRIC to perform the trace operation as described above by process 3600.

The process 3700 receives (at 3740) trace information collected during the trace operation from the dRIC. For instance, the RMS CM 3574 receives trace information from the FCAPS management pod 3560 of the dRIC 3505. The trace information, in some embodiments, includes a global identifier associated with the E2 node associated with the trace operation, timestamp(s) of the traced messages, an E2AP message (i.e., sent to/from the E2 node), message data that is specific to the message (e.g., events triggered by the message), and E2AP state transitions.

The process 3700 processes (at 3750) the trace information to generate sets of state data associated with the dRIC and a trace report that includes the sets of state data associated with the dRIC. For instance, after receiving the trace information from the dRIC 3505, the RMS CM 3574 provides the trace information to the trace service 3576 for processing. In some embodiments, the trace report is an aggregation of the generated sets of state data. Each set of state data, in some embodiments, includes state data associated with a particular component (e.g., E2 node state data, xApp state data, etc.).

The process 3700 stores (at 3760) the sets of state data in a state data storage of the RMS for use in responding to queries for state data associated with the dRIC and displays (at 3770) the generated trace report via the RMS UI. The trace service 3576, for example, stores state data in the state data storage 3580 for retrieval by the query service 3578 in response to query commands received through the RMS UI 3570 or RMS API 3572. Additionally, the trace service 3576 provides the generated trace report to the RMS UI 3570 (e.g., via the RMS API 3572) for display by the RMS UI 3570. Following 3770, the process 3700 ends.

Figure 38:
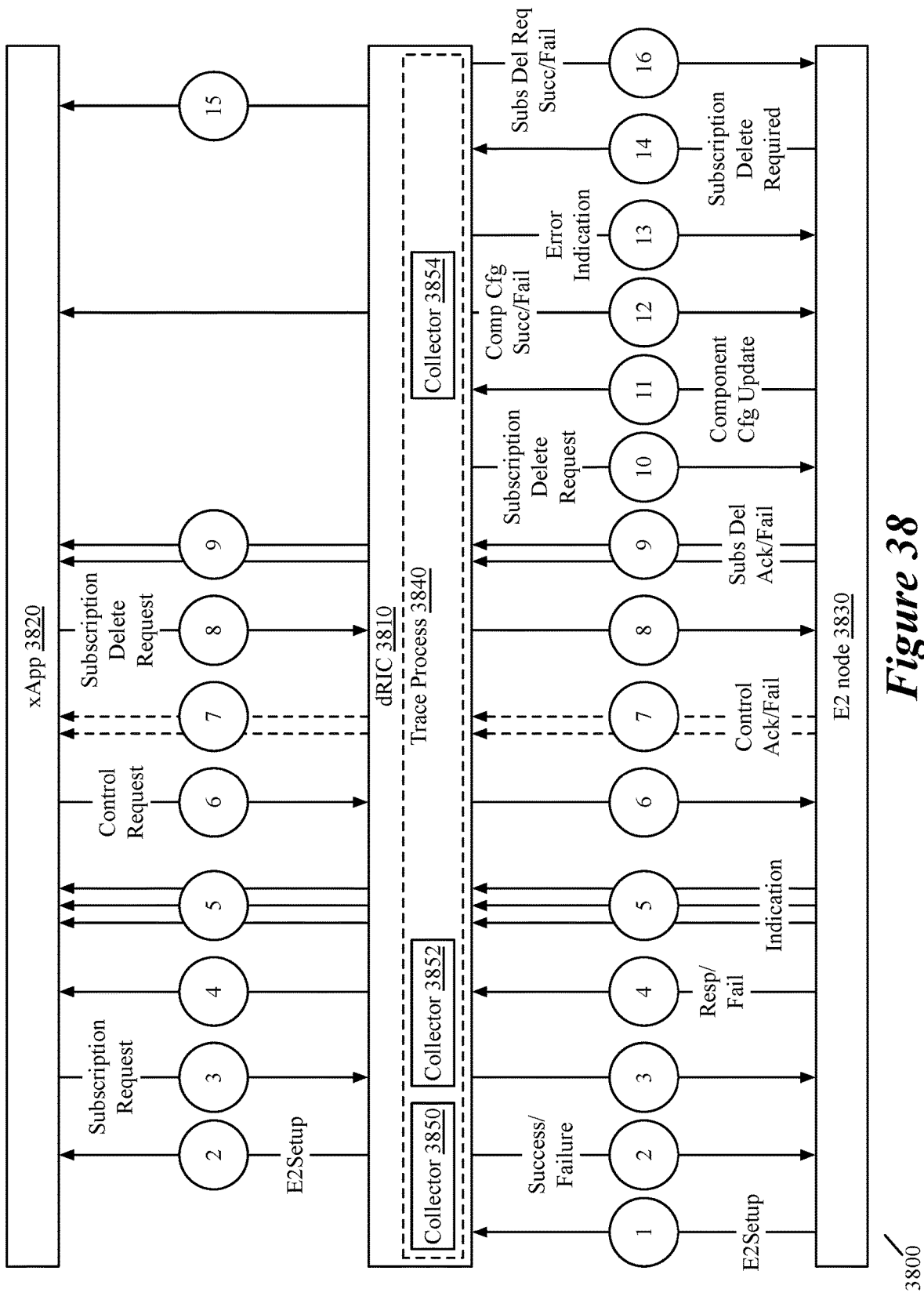
FIG. 38 conceptually illustrates E2AP protocol message exchange sequences for a subset of messages between an E2 node and an xApp, in some embodiments.

FIG. 38 conceptually illustrates E2AP protocol message exchange sequences 3800 for a subset of messages between an E2 node and an xApp, in some embodiments. The sequences 3800 include message sequences for E2 node setup, subscription requests and deletions, control requests, and component configuration updates. It should be noted that the sequences 3800 shown are not rigid sequences other than the first couple messages exchanged. Additionally, subscriptions can only be deleted after they have been created.

As described above, sets of code are added in some embodiments as trace triggers to various places of the dRIC where state is manipulated such that when a trace initiated and a trace trigger is triggered, information relevant to the trace trigger is then collected. In the diagram 3800, for instance, the dRIC 3810 includes a trace process 3840 that includes several collectors 3850, 3852, and 3854 for collecting information when trace triggers associated with the collectors 3850-3854 are triggered. In some embodiments, trace triggers are defined for each E2 node and/or xApp connected to a dRIC, for each E2AP message sequence (e.g., E2 setup, xApp subscription, control request, component configuration, etc.), and/or for one or more other components of the dRIC for which a trace operation can be specified.

The collector 3850, for example, collects information associated with E2 setup messages when a trace rigger associated with the collector 3850 is triggered by said E2 setup messages, according to some embodiments. The collector 3852, in some embodiments, collects information associated xApp subscription messages when a trace trigger associated with the collector 3852 is triggered by said xApp subscription messages. The collector 3854 collects information associated with component configuration messages when a trace trigger associated with the collector 3854 is triggered by said component configuration messages, in some embodiments. These collectors 3850-3854 are exemplary, and other embodiments include additional, fewer, and/or different collectors than those illustrated. For example, in some other embodiments, a single collector is utilized to collect the trace information when any trace trigger is triggered.

In some embodiments, the trace process 3840 and collectors 3850-3854 operate as part of a datapath thread (not shown) of the dRIC 3810 and provide information collected for a tracing operation to a trace transport program of a control thread (not shown) of the dRIC 3810. For example, the datapath pod 1505 of the RIC 1500 illustrated by FIG. 15 described above includes a datapath thread 1507 and a control thread 1509. The datapath thread 1507 includes a trace generation functionality, which corresponds to the trace process 3840, in some embodiments, while the control thread 1509 includes a trace transport functionality (e.g., to which the collectors 3850-3854 would send their collected trace information).

Figure 39:
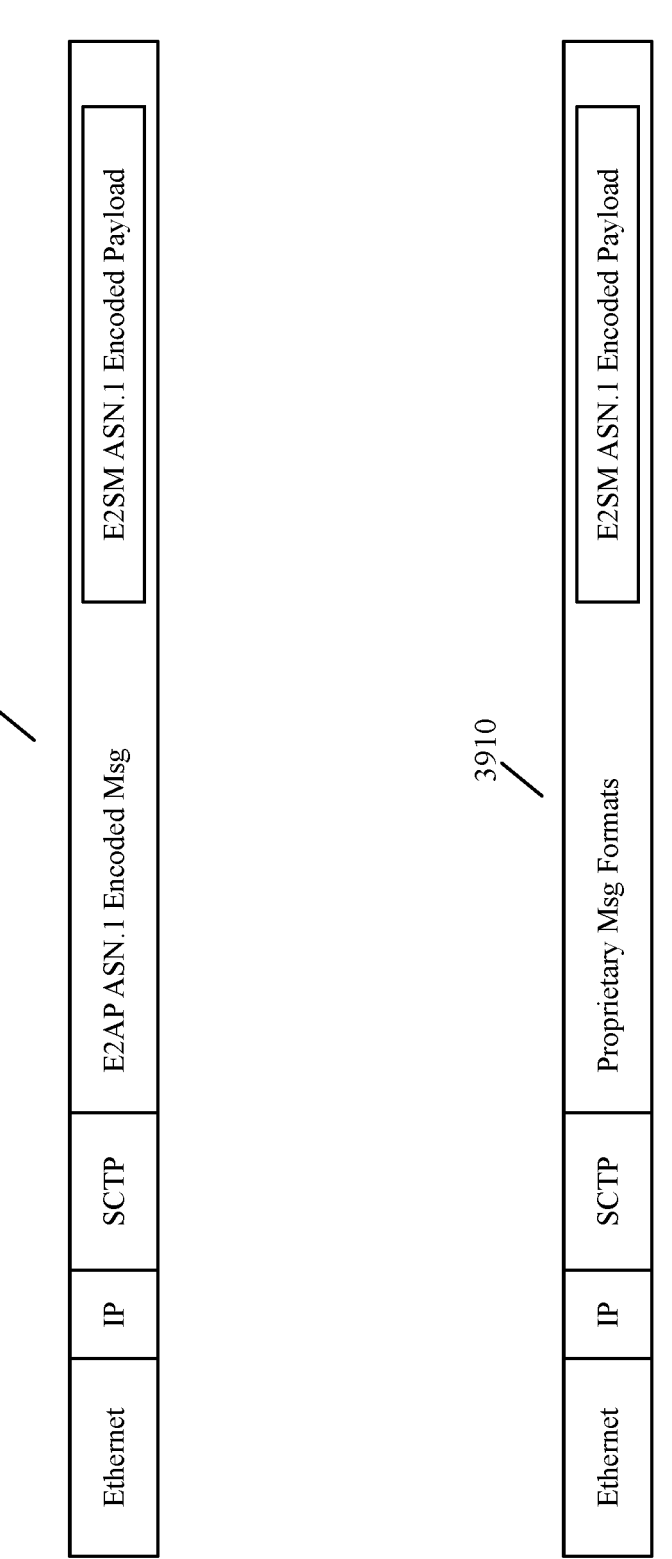
FIG. 39 illustrates examples of message formats used for communications between a dRIC and xApps and E2 nodes, in some embodiments.

As shown, the E2 node 3830 and the xApp 3820 communicate via a dRIC 3810 (e.g., a datapath pod of a dRIC) that acts as an interface between the E2 node 3830 and the xApp 3820. The xApp 3820 communicates with the dRIC 3810 using REST APIs, in some embodiments, while the E2 node 3830 communicates with the dRIC 3810 with E2AP messages. FIG. 39 illustrates examples of message formats used for communications between a dRIC and xApps and E2 nodes, in some embodiments. The first message format 3905 is an example of a message format used for communications between an E2 node and dRIC, while the second message format 3910 is an example of a message format used for communications between an xApp and dRIC.

The first E2AP protocol message exchange sequence is for E2 node setup. As shown, the E2 node 3830 sends, at the encircled 1, an E2Setup request to the dRIC 3810 (e.g., at the encircled 1). The goal of the E2Setup request is to establish a signal connection between the E2 node 3830 and the dRIC 3810 and transfer configuration information specific to the E2 node 3830 to the dRIC 3810. In some embodiments, performing the E2Setup sequence resets the E2 interface and erases any existing application-level configuration data in both the E2 node 3830 and dRIC 3810. At the encircled 2, the dRIC 3810 returns an indication of success or failure to the E2 node 3830 in response to the E2Setup request, and, when the E2Setup is successful, also sends an E2Setup message to the xApp 3820 to notify the xApp 3820 of the E2 node 3830. When the E2Setup is not successful, the dRIC 3810 does not send the E2Setup message to the xApp 3820. FIGS. 40A-40B illustrate an example of an E2 setup message 4001-4002 of some embodiments.

In the next sequence, the xApp 3820 sends a subscription request to the dRIC 3810, at the encircled 3, in order to subscribe to the E2 node 3830, which the dRIC 3810 relays to the E2 node 3830. In some embodiments, before the xApp 3820 requests to subscribe to the E2 node 3830, the dRIC 3810 sends a subscription request to the E2 node 3830 in order to establish E2 node subscriptions on the E2 node 3830. The E2 node 3830 sends a response or a notification of failure, at the encircled 4, to the dRIC 3810, which relays the response or notification of failure to the xApp 3820. At the encircled 5, the E2 node 3830 sends an indication message to the dRIC 3810 to transfer a message associated with a report and/or insert RIC service to the dRIC 3810 corresponding to the successful subscription by the xApp 3820 and an event triggered by the successful subscription, which the dRIC 3810 then relays to the xApp 3820.

In the next sequence, the xApp 3820 sends a control request for initiating or resuming a specification functionality in the E2 node 3830 to the dRIC 3810 at the encircled 6, which the dRIC 3810 relays to the E2 node 3830. The E2 node 3830 then identifies the target function and initiates the requested control function. The E2 node 3830 sends a control acknowledgement or a control failure message to the dRIC 3810 at the encircled 7 in response to the control request, and the dRIC 3810 relays the control acknowledgement/failure message to the xApp 3820.

In the next sequence, the xApp 3820 sends a subscription delete request at the encircled 8 to the dRIC 3810 in order to remove itself as a subscriber to the E2 node 3830, which relays the request to the E2 node 3830. The E2 node 3830 then responds at the encircled 9 by sending a subscription delete acknowledgement or failure to the dRIC 3810, which relays the subscription delete acknowledgement or failure to the xApp 3820. At the encircled 10, the dRIC 3810 also sends a subscription delete request to the E2 node 3830 in order to delete its subscription to the E2 node 3830 and cause the E2 node 3830 to release necessary resources and send a subscription delete response message (not yet shown) back to the dRIC 3810.

E2 node 3830 sends, at the encircled 11, a component configuration update to the dRIC 3810 to update application-level configuration data for the E2 node 3830. The component configuration updates are periodic, in some embodiments, and sent automatically from the E2 nodes as cell states change. In some embodiments, the E2 nodes manage a collection of cells (typically 12-15 cells), and these cells change state by, e.g., being powered down (e.g., to save energy costs), going offline, coming back online, etc., and it is beneficial, in some embodiments, to monitor these cell states. The dRIC 3810 then responds at the encircled 12 to the component configuration update from the E2 node 3830 with a component configuration success message or a component configuration failure message. In some embodiments, the dRIC 3810 also notifies the xApp 3820 of the E2 node component configuration update.

The next message is an error indication sent at the encircled 13 from the dRIC 3810 to the E2 node 3830. Such error indications are initiated to report detected errors in one or more incoming messages when the errors cannot be reported by an appropriate failure message. The E2 node 3830 then sends, at the encircled 14, a subscription delete required message to the dRIC 3810 to request removal of one or more existing RIC subscriptions. In some embodiments, the message is relayed to the xApp 3820 at the encircled 15. Lastly, the dRIC 3810 sends, at the encircled 16, a subscription delete required success or subscription delete required failure message to the E2 node 3830 in response to the subscription delete required message.

In some embodiments, typical issues that arise with sequences between xApps and E2 nodes include issues such as connections that are not established, malformed messages that cannot be decoded, messages with missing mandatory fields, unsupported messages, and E2SM codec inconsistencies. For example, to solve the issues of connections that are not established, for example, some embodiments start with one E2 node and one xApp, and ensure ports are configured correctly, and then check NAT configurations (e.g., to verify connectivity). As another example, for malformed messages that cannot be decoded, some embodiments request that the message be decoded before sending, request raw bytes of the message and the decoded output, and/or turn on DEBUG mode on the dRIC to log every message sent and received. As a final example, when messages are missing mandatory fields, some embodiments simply check to ensure all mandatory fields are populated. These typical issues, in some embodiments are solved using the trace service and/or query service in order to determine the exact sequence of messages that lead to issues or failures. Each customer site, in some embodiments, can include hundreds of E2 nodes and tens of xApps connected to a dRIC, and as such, the dRIC becomes the central observation point for identifying the goings-on in the RAN.

FIGS. 41-44 illustrate examples of E2AP protocol messages, such as those described above with reference to FIG. 38, and their mandatory fields. The example messages illustrated in FIGS. 41-44 and described below are messages defined in public O-RAN standards, which also specifies typical message exchanges. Different vendors implement functionalities in different ways, but still have to conform to the O-RAN standards, thereby creating inter-operability across xApps from different vendors and the overall workings of the network.

FIG. 41 illustrates an example 4100 of E2 setup E2AP protocol messages and their mandatory fields. As shown, E2 setup message types include E2 setup, E2 setup success, and E2 setup failure messages. Each E2 setup message requires the message to include message type and transaction identifier. Mandatory fields for E2 setup messages also include a global E2 node identifier of the E2 node sending the message; a RAN function added list that includes identifiers, definitions, revisions, and OIDs (object identifiers) for the RAN functions; and a component configuration that includes interface type and whether it is a request or response. For E2 setup success messages, the mandatory fields also include the global E2 node identifier of the E2 node; a component configuration acknowledgement that includes interface type, component identifier, and an acknowledgement; and a RAN function accept list that includes the RAN function identifiers and revisions for accepted RAN functions. Lastly, the mandatory fields for E2 setup failure messages also include the cause of the failure.

FIG. 42 illustrates an example 4200 of subscription-related E2AP protocol messages and their mandatory fields. As shown, message types for subscription-related E2AP protocol messages include subscription requests, subscription responses, subscription failures, subscription delete requests, subscription delete responses, subscription delete failures, and subscription delete required messages. Mandatory fields for all subscription-related message types include the message type of the message, the RAN function identifier for the associated RAN function being subscribed to, and a RIC request identifier.

The mandatory fields for subscription request messages also include a subscription details trigger event definition and a subscription details action list that specifies an identifier and type of each action. Subscription response messages also have a mandatory filed for action admit list that specifies action identifiers for actions that the requesting subscriber can perform for the specified RAN function (i.e., based on the RAN function identifier included in the message). Lastly, for subscription failure messages, subscription delete failure messages, and subscription delete required messages, the mandatory fields also include a cause of the failure or delete requirement.

Figure 43:
FIG. 43 illustrates examples of control E2AP protocol messages and their mandatory fields.

FIG. 43 illustrates an example 4300 of RIC control E2AP protocol messages and their mandatory fields. The RIC control message types include RIC indications, control requests, control acknowledgements, and control failures. The mandatory fields applicable to all RIC control message include message type, RAN function identifier, and RIC request identifier. The RIC indication messages also include mandatory fields such as action identifier, indication type, indication header, and indication message. Mandatory fields for control requests also include control header and control message. Lastly, the mandatory fields for control failure messages also include cause of the failure.

FIG. 44 illustrates an example 4400 of component configuration update and E2 error indication E2AP protocol messages and their mandatory fields. The message types in this example 4400 include component configuration update, component configuration update acknowledgement, and E2 error indication. The message types in the example 4400 share message type as a mandatory field.

The mandatory fields for component configuration update messages also include transaction identifier; a component configuration add list (if any) that includes interface type and request or response; a component configuration update list (if any) that also includes interface type and request or response; and a component configuration removal list (if any) that includes interface type. The mandatory fields for component configuration acknowledgement messages also include transaction identifier; component configuration add list acknowledgement that includes interface type, component identifier, and acknowledgement; component configuration update list acknowledgement that includes interface type and acknowledgement; and component configuration remove list acknowledgement that includes interface type, component identifier, and acknowledgement.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 45:
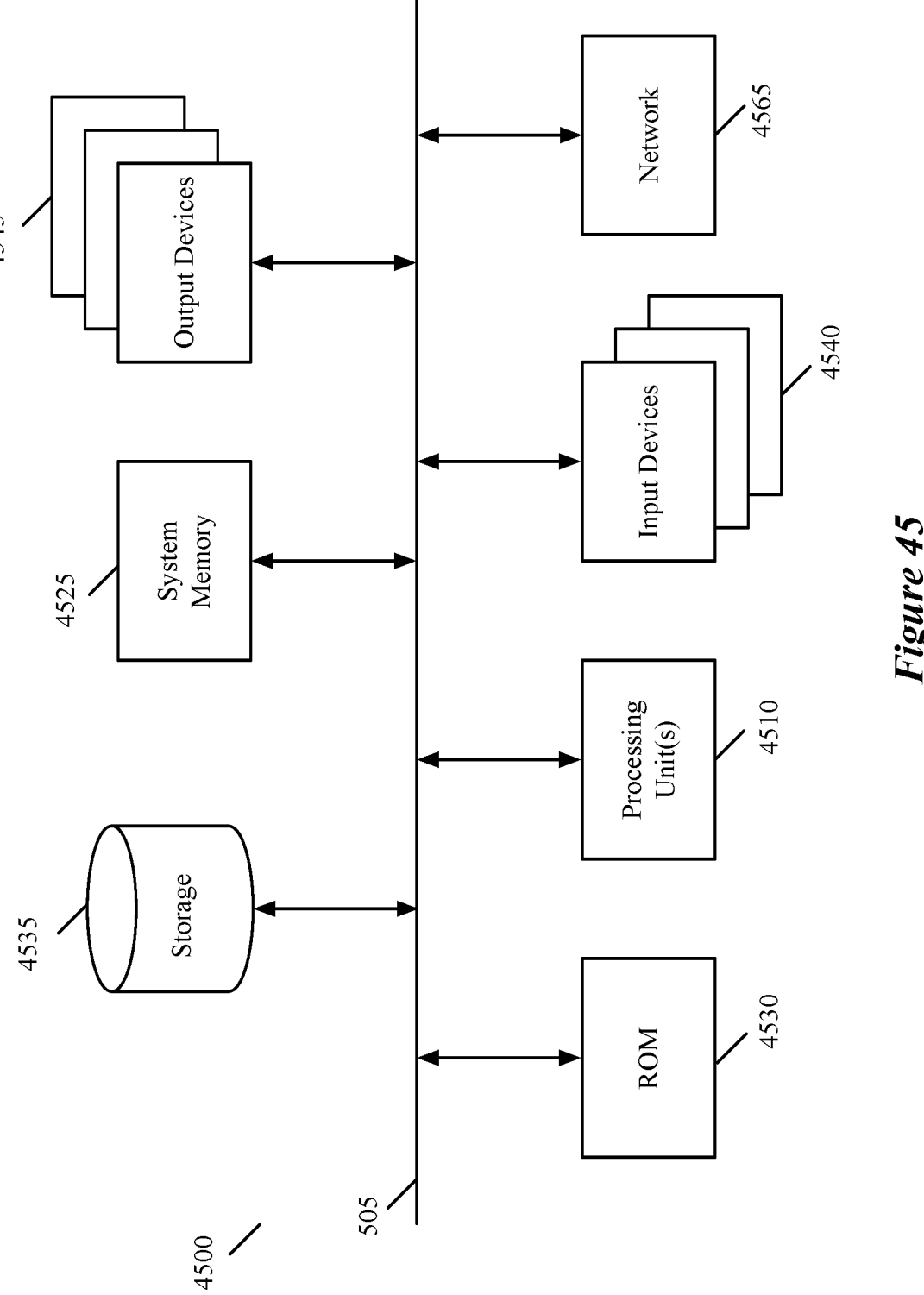
FIG. 45 conceptually illustrates a computer system with which some embodiments of the invention are implemented.

FIG. 45 conceptually illustrates a computer system 4500 with which some embodiments of the invention are implemented. The computer system 4500 can be used to implement any of the above-described computers and servers. As such, it can be used to execute any of the above described processes. This computer system includes various types of non-transitory machine readable media and interfaces for various other types of machine readable media. Computer system 4500 includes a bus 4505, processing unit(s) 4510, a system memory 4525, a read-only memory 4530, a permanent storage device 4535, input devices 4540, and output devices 4545.

The bus 4505 collectively represents all system, peripheral, and chipset buses that communicatively connect the numerous internal devices of the computer system 4500. For instance, the bus 4505 communicatively connects the processing unit(s) 4510 with the read-only memory 4530, the system memory 4525, and the permanent storage device 4535.

From these various memory units, the processing unit(s) 4510 retrieve instructions to execute and data to process in order to execute the processes of the invention. The processing unit(s) may be a single processor or a multi-core processor in different embodiments. The read-only-memory (ROM) 4530 stores static data and instructions that are needed by the processing unit(s) 4510 and other modules of the computer system. The permanent storage device 4535, on the other hand, is a read-and-write memory device. This device is a non-volatile memory unit that stores instructions and data even when the computer system 4500 is off. Some embodiments of the invention use a mass-storage device (such as a magnetic or optical disk and its corresponding disk drive) as the permanent storage device 4535.

Other embodiments use a removable storage device (such as a flash drive, etc.) as the permanent storage device. Like the permanent storage device 4535, the system memory 4525 is a read-and-write memory device. However, unlike storage device 4535, the system memory is a volatile read-and-write memory, such a random access memory. The system memory stores some of the instructions and data that the processor needs at runtime. In some embodiments, the invention's processes are stored in the system memory 4525, the permanent storage device 4535, and/or the read-only memory 4530. From these various memory units, the processing unit(s) 4510 retrieve instructions to execute and data to process in order to execute the processes of some embodiments.

The bus 4505 also connects to the input and output devices 4540 and 4545. The input devices enable the user to communicate information and select commands to the computer system. The input devices 4540 include alphanumeric keyboards and pointing devices (also called "cursor control devices"). The output devices 4545 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 45, bus 4505 also couples computer system 4500 to a network 4565 through a network adapter (not shown). In this manner, the computer can be a part of a network of computers (such as a local area network ("LAN"), a wide area network ("WAN"), or an Intranet, or a network of networks, such as the Internet. Any or all components of computer system 4500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing packet tracing in a RAN (radio access network), the method comprising:
   receiving a trace request comprising a tracing specification for performing a trace operation for a subset of messages exchanged between a particular base station component and a particular RAN application via a particular RIC (RAN intelligent controller) that operates as an interface between the particular base station component and the particular RAN application;
   based on the tracing specification, performing the trace operation for the subset of messages exchanged between the particular base station component and the particular RAN application;
   receiving a set of trace information collected during the trace operations for the subset of messages; and
   processing the set of trace information to generate a processed set of trace information for use in responding to queries for trace information in the processed set of trace information.

2. The method of claim 1, wherein the tracing specification comprises an identifier of the particular base station component, an identifier of the particular RAN application, and a specification of the subset of messages for which the trace operation should be performed.

3. The method of claim 2, wherein the trace operation is further performed for collecting state data associated with the particular RIC, wherein the tracing specification further comprises identifiers for a particular set of state components of the particular RIC for which state data should be collected as part of the trace operation.

4. The method of claim 3, wherein the particular set of state components are of a plurality of state components of the particular RIC.

5. The method of claim 4, wherein the plurality of state components comprise at least a list of base station components provisioned and connected to the particular RIC, a list of RAN applications provisioned and connected to the particular RIC, RAN application subscription information for each RAN application provisioned and connected to the particular RIC, sets of data associated with control requests associated with the particular RIC, horizontal scaling data that indicates how the base station components and RAN applications provisioned and connected to the RIC are distributed across load distributor IO threads of the particular RIC.

6. The method of claim 2, wherein the trace request specifies a duration of time for which the tracing operation should be performed.

7. The method of claim 1, wherein the tracing specification comprises an identifier of the particular base station component, and a specification of the subset of messages for which the trace operation should be performed.

8. The method of claim 1, wherein the tracing specification comprises an identifier of the particular RAN application, and a specification of the subset of messages for which the trace operation should be performed.

9. The method of claim 1, wherein the subset of messages comprise a subset of E2AP messages sent to and/or from the particular base station component.

10. The method of claim 9, wherein the subset of E2AP messages comprises a subset of a particular type of E2AP messages, wherein the particular type is one of a plurality of types of E2AP messages sent to and from the particular base station component.

11. The method of claim 10, wherein the plurality of types of E2AP messages comprise at least (i) a first subset of base station component setup messages for establishing a connection between the particular base station component and the particular RIC, (ii) a second subset of RAN application subscription messages for subscribing to the particular base station component, (iii) a third subset of control messages for modifying a functionality of the particular base station component, and (iv) a fourth subset of configuration messages associated with configurations of the particular base station component.

12. The method of claim 10 further comprising:
   receiving a second trace request comprising a second tracing specification for performing a second trace operation for a second subset of messages, the second subset of messages comprising a set of two or more E2AP message types sent to or from the particular base station component;
   based on the second tracing specification, performing the second trace operation for the second subset of messages;
   receiving a second set of trace information collected during the second trace operation; and
   processing the second set of trace information to generate a processed second set of trace information for use in responding to queries for trace information in the processed second set of trace information.

13. The method of claim 1, wherein the method is performed by a RIC management system (RMS) that manages the particular RIC.

14. The method of claim 13, wherein receiving the trace request comprises receiving the trace request through a UI (user interface) provided by the RMS.

15. The method of claim 14, wherein processing the set of trace information further comprises:

processing the set of trace information to generate a trace report comprising the processed set of trace information; and displaying the trace report through the RMS UI.

16. The method of claim 13, wherein receiving the trace request comprises receiving the trace request via an API (application programming interface) provided by the RMS.

17. The method of claim 13, wherein the processed set of trace information comprises state data associated with the particular RIC, wherein processing the set of trace information to generate the processed set of trace information further comprises processing the set of trace information to generate sets of state data associated with the particular RIC, and storing the sets of state data in a state data storage of the RMS.

18. The method of claim 17, wherein the RMS includes a query service that is invoked when the RMS receives a particular query command for a particular set of state data from the sets of state data associated with the particular RIC and stored in the state data storage.

19. The method of claim 18, wherein the RIC comprises a plurality of state components, wherein the particular query command is one of a plurality of query commands, wherein each query command of the plurality of query commands is defined for querying state data associated with a particular state component in the plurality of state components.

20. The method of claim 19 further comprising:

receiving a first query command for a first set of state data associated with a first state component in the plurality of state components;

retrieving the first set of state data from the state data storage of the RMS; and responding to the query command with the retrieved first set of state data.

21. The method of claim 1, wherein the particular RIC comprises a dRIC (distributed RIC), the particular RAN application comprises an xApp, and the particular base station component comprises an E2 node.

22. The method of claim 1, wherein the trace operation is further performed for tracing events between the particular base station component and the particular RAN application.

23. The method of claim 1, wherein the trace operation is further performed for tracing a state of the particular RIC.

24. The method of claim 23, wherein the state of the particular RIC is associated with events between the particular base station component and the particular RAN application.

* * * * *